US011689911B2

(12) United States Patent
Lee et al.

(10) Patent No.: US 11,689,911 B2
(45) Date of Patent: Jun. 27, 2023

(54) METHOD FOR TRANSMITTING AND RECEIVING D2D SIGNAL IN WIRELESS COMMUNICATION SYSTEM, AND APPARATUS THEREFOR

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 17/092,835

(22) Filed: Nov. 9, 2020

(65) Prior Publication Data

US 2021/0160681 A1    May 27, 2021

Related U.S. Application Data

(63) Continuation of application No. 15/573,811, filed as application No. PCT/KR2016/005155 on May 16, 2016, now abandoned.
(Continued)

(51) Int. Cl.
*H04W 8/00* (2009.01)
*H04W 4/06* (2009.01)
(Continued)

(52) U.S. Cl.
CPC .............. *H04W 8/005* (2013.01); *H04J 11/00* (2013.01); *H04L 1/1812* (2013.01);
(Continued)

(58) Field of Classification Search
CPC ......... H04W 8/005; H04W 4/70; H04W 4/06; H04W 76/28; H04W 76/27; H04W 48/12;
(Continued)

(56) References Cited

U.S. PATENT DOCUMENTS

2012/0213143 A1*  8/2012  Zhang ..................... H04L 5/001
                                                                370/312
2013/0329689 A1* 12/2013  Choi ..................... H04L 5/0055
                                                                370/329

(Continued)

FOREIGN PATENT DOCUMENTS

WO      2015018239      2/2015
WO      2015065768      5/2015

OTHER PUBLICATIONS

PCT International Application No. PCT/KR2016/005155, Written Opinion of the International Searching Authority dated Aug. 19, 2016, 20 pages.

(Continued)

*Primary Examiner* — Jasper Kwoh
(74) *Attorney, Agent, or Firm* — Lee, Hong, Degerman, Kang & Waimey PC

(57) ABSTRACT

The method for a D2D terminal for receiving a D2D discovery signal including a plurality of radio frequency chains in a wireless communication system. Specifically, the method includes the steps of: configuring discontinuous reception (DRX) cycle based on a higher layer signal, receiving physical downlink control channel (PDCCH) in a duration based on the configured DRX cycle from a base station using a first carrier, wherein a timer for the duration is counted based on consecutive PDCCH subframes, and the PDCCH is monitored in the consecutive PDCCH subframes, communicating with the base station using the first carrier based on the configured DRX cycle, and communicating with a second D2D UE using a second carrier, wherein the first UE includes a D2D dedicated radio frequency chain.

12 Claims, 28 Drawing Sheets

Related U.S. Application Data

(60) Provisional application No. 62/161,853, filed on May 14, 2015.

(51) Int. Cl.

| | | |
|---|---|---|
| *H04L 5/00* | (2006.01) | |
| *H04W 48/12* | (2009.01) | |
| *H04J 11/00* | (2006.01) | |
| *H04W 72/23* | (2023.01) | |
| *H04W 48/16* | (2009.01) | |
| *H04W 4/70* | (2018.01) | |
| *H04W 76/28* | (2018.01) | |
| *H04W 76/27* | (2018.01) | |
| *H04L 1/1812* | (2023.01) | |
| *H04L 5/14* | (2006.01) | |
| *H04W 56/00* | (2009.01) | |
| *H04W 72/0446* | (2023.01) | |
| *H04W 72/0453* | (2023.01) | |
| *H04W 80/02* | (2009.01) | |

(52) U.S. Cl.
CPC .......... *H04L 5/0048* (2013.01); *H04L 5/0053* (2013.01); *H04L 5/0055* (2013.01); *H04L 5/14* (2013.01); *H04W 4/06* (2013.01); *H04W 4/70* (2018.02); *H04W 48/12* (2013.01); *H04W 48/16* (2013.01); *H04W 56/001* (2013.01); *H04W 72/0446* (2013.01); *H04W 72/0453* (2013.01); *H04W 72/23* (2023.01); *H04W 76/27* (2018.02); *H04W 76/28* (2018.02); *H04W 80/02* (2013.01)

(58) Field of Classification Search
CPC ................ H04W 48/16; H04W 56/001; H04W 72/0446; H04W 72/0453; H04W 72/14; H04W 72/23; H04W 80/02; H04J 11/00; H04L 1/1812; H04L 5/0048; H04L 5/0053; H04L 5/0055; H04L 5/14
See application file for complete search history.

(56) References Cited

U.S. PATENT DOCUMENTS

| | | | |
|---|---|---|---|
| 2014/0029459 A1* | 1/2014 | Kwon | H04W 76/28 |
| | | | 370/252 |
| 2014/0112243 A1* | 4/2014 | Suzuki | H04W 56/00 |
| | | | 370/328 |
| 2014/0254538 A1* | 9/2014 | Park | H04L 1/1874 |
| | | | 370/329 |
| 2015/0043446 A1 | 2/2015 | Tsirtsis et al. | |
| 2015/0078466 A1 | 3/2015 | Zhou et al. | |
| 2015/0282108 A1 | 10/2015 | Kiss | |
| 2016/0119969 A1* | 4/2016 | Vajapeyam | H04W 72/1289 |
| | | | 370/329 |
| 2016/0295620 A1 | 10/2016 | Lindoff et al. | |
| 2016/0323870 A1 | 11/2016 | Wei et al. | |
| 2016/0366677 A1 | 12/2016 | Fujishiro et al. | |
| 2017/0142703 A1 | 5/2017 | Xue et al. | |
| 2017/0150480 A1 | 5/2017 | Kim et al. | |
| 2017/0230815 A1* | 8/2017 | Yasukawa | H04W 52/02 |
| 2018/0070219 A1 | 3/2018 | Khoryaev et al. | |
| 2018/0167820 A1 | 6/2018 | Belleschi et al. | |
| 2018/0206252 A1* | 7/2018 | Thangarasa | H04W 76/28 |
| 2018/0270714 A1* | 9/2018 | Martin | H04W 36/14 |
| 2019/0045345 A1 | 2/2019 | Lee et al. | |

OTHER PUBLICATIONS

Huawei et al., "Discovery transmission timing", 3GPP TSG RAN WG1 Meeting #79, R1-145094, Nov. 2014, 1 page.

Qualcomm, "Draft LS on prioritization of WAN Rx over ProSe discovery Rx", 3GPP TSG RAN WG2 Meeting #88, R2-145389, Nov. 2014, 2 pages.

U.S. Appl. No. 15/573,811, Office Action dated Dec. 14, 2018, 17 pages.

U.S. Appl. No. 15/573,811, Final Office Action dated Jul. 11, 2019, 12 pages.

U.S. Appl. No. 15/573,811, Final Office Action dated Aug. 7, 2020, 10 pages.

\* cited by examiner

FIG. 2
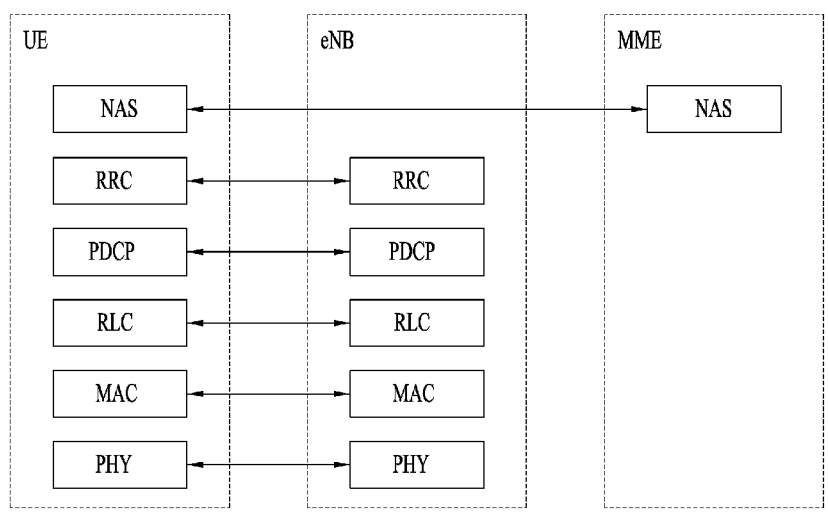
(A) Control-plane protocol stack
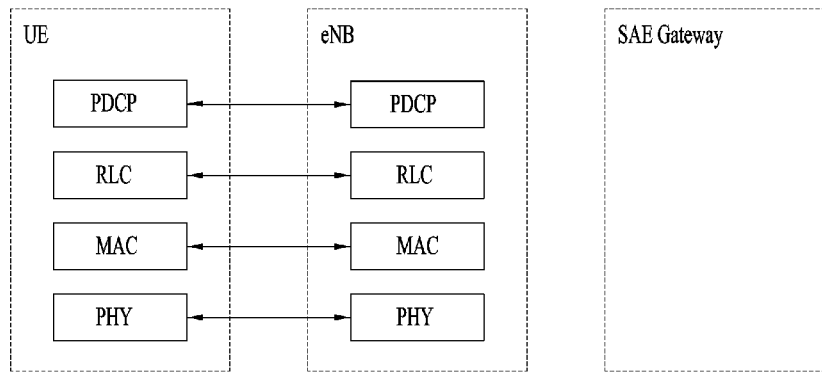
(B) User-plane protocol stack FIG. 8
(a)
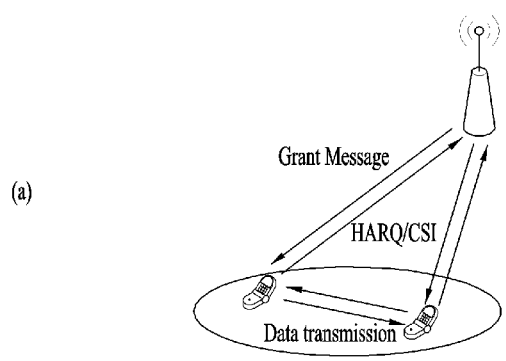
(b)
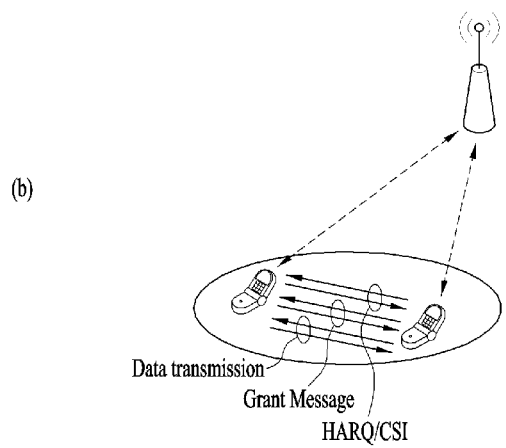

FIG. 13
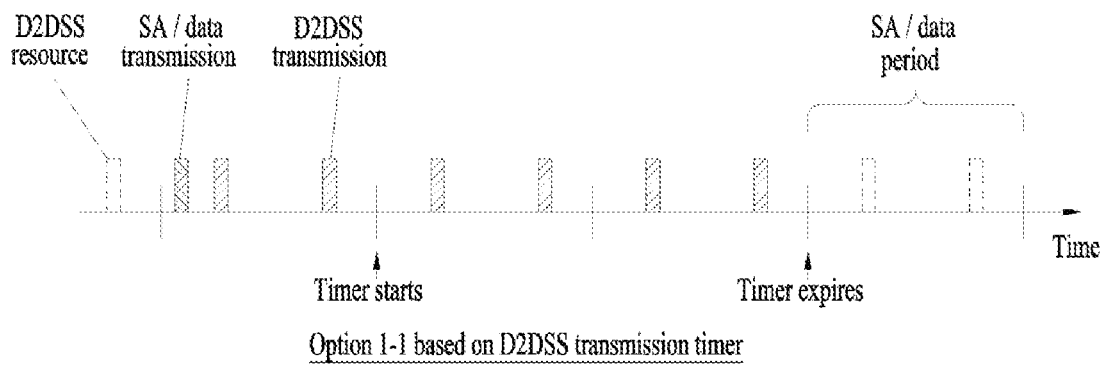
Option 1-1 based on D2DSS transmission timer
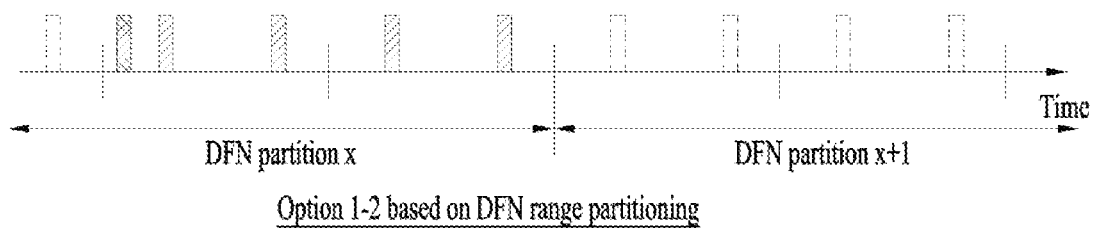
Option 1-2 based on DFN range partitioning
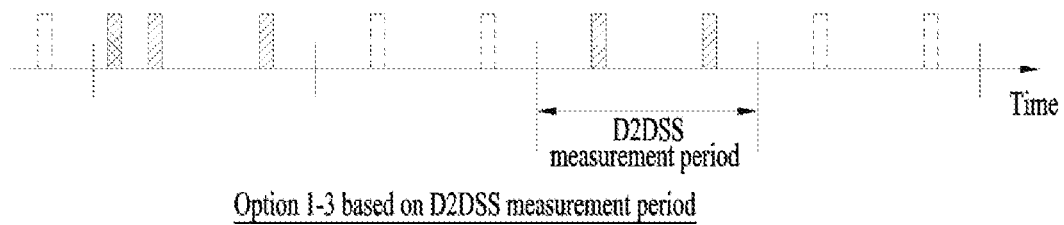
Option 1-3 based on D2DSS measurement period

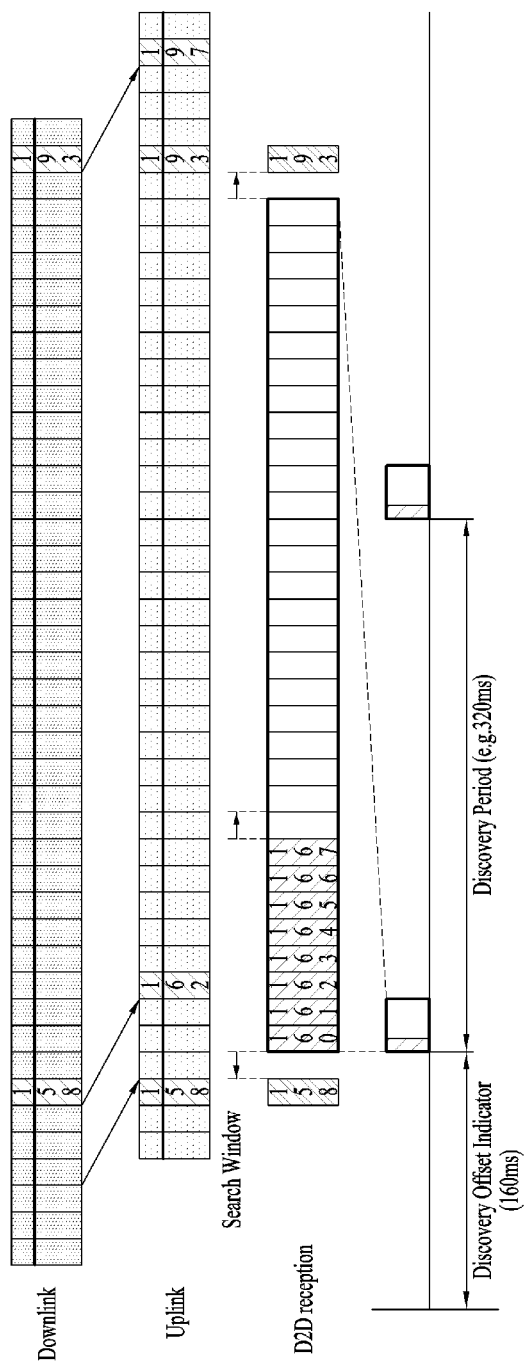

METHOD FOR TRANSMITTING AND RECEIVING D2D SIGNAL IN WIRELESS COMMUNICATION SYSTEM, AND APPARATUS THEREFOR

CROSS-REFERENCE TO RELATED APPLICATIONS

This application is a continuation of U.S. patent application Ser. No. 15/573,811, filed on Nov. 13, 2017, which is the National Stage filing under 35 U.S.C. 371 of International Application No. PCT/KR2016/005155, filed on May 16, 2016, which claims the benefit of U.S. Provisional Application No. 62/161,853, filed on May 14, 2015, the contents of which are all hereby incorporated by reference herein in their entirety.

TECHNICAL FIELD

The present invention relates to a wireless communication system, and more particularly, to a method of transmitting/receiving a D2D signal in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an evolved universal mobile telecommunications system (E-UMTS) which is an example of a wireless communication system. The E-UMTS is an evolved version of the conventional UMTS, and its basic standardization is in progress under the 3rd generation partnership project (3GPP). The E-UMTS may be referred to as a long term evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a user equipment (UE), base stations (eNode B; eNB), and an access gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.25, 2.5, 5, 10, 15 and 20 MHz to provide a downlink or uplink transport service to several user equipments (UEs). Different cells may be set to provide different bandwidths. Also, one base station controls data transmission and reception for a plurality of UEs. The base station transmits downlink (DL) scheduling information of downlink data to the corresponding UE to notify the corresponding UE of time and frequency domains to which data will be transmitted and information related to encoding, data size, and hybrid automatic repeat and request (HARQ). Also, the base station transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the base stations. A core network (CN) may include the AG and a network node or the like for user registration of the UE. The AG manages mobility of the UE on a tracking area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the UE, etc. are required.

DISCLOSURE OF THE INVENTION

Technical Task

Based on the above discussion, the technical task of the present invention is to provide a method of transmitting/receiving a D2D signal in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of receiving a D2D discovery signal of a D2D user equipment configured with a multitude of radio frequency chains in a wireless communication system, the method including receiving a pool configuration indicating resources for the D2D user equipment to perform a D2D discovery and switching On-Off of a D2D receiver spare chain, wherein an interruption timing according to the switching of the D2D receiver spare chain On-Off is determined depending on a window size associated with a resource for performing the D2D discovery.

Preferably, the D2D receiver spare chain may include a receiver chain configured to receive the D2D discovery signal in a dedicated manner.

Preferably, the window size may be defined to indicate the On-Off of the switching of the D2D receiver spare chain before and after a radio resource candidate section for the D2D discovery indicated in the pool configuration.

Preferably, the window size may be defined to indicate the On-Off of the switching of the D2D receiver spare chain before and after a section to which a radio resource for the D2D discovery indicated in the pool configuration is assigned.

Preferably, the window size may be defined to indicate the On-Off of the switching of the D2D receiver spare chain before and after SLSS (sidelink synchronization signal) and the On-Off of the switching of the D2D receiver spare chain before and after a radio resource candidate section for the D2D discovery indicated in the pool configuration.

Preferably, the window size may be defined to indicate the On-Off of the switching of the D2D receiver spare chain before and after SLSS (sidelink synchronization signal) and the On-Off of the switching of the D2D receiver spare chain before and after a section to which a radio resource for the D2D discovery indicated in the pool configuration is assigned.

Preferably, the window size may be defined to indicate the On-Off of the switching of the D2D receiver spare chain before SLSS (sidelink synchronization signal) and after a radio resource candidate section for the D2D discovery indicated in the pool configuration.

Preferably, the window size may be defined to indicate the On-Off of the switching of the D2D receiver spare chain before SLSS (sidelink synchronization signal) and after a section to which a radio resource for the D2D discovery indicated in the pool configuration is assigned.

In another technical aspect of the present invention, provided herein is a D2D user equipment configured with a multitude of radio frequency chains in a wireless communication system, the D2D user equipment including a radio frequency unit and a processor configured to receive a pool configuration indicating resources for the D2D user equipment to perform a D2D discovery and switch On-Off of a D2D receiver spare chain, wherein an interruption timing according to the switching of the D2D receiver spare chain On-Off is determined depending on a window size associated with a resource for performing the D2D discovery.

Advantageous Effects

According to an embodiment of the present invention, D2D signal transmission/reception can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram of structures of control and user planes of a radio interface protocol between a user equipment and E-UTRAN based on 3GPP radio access network specification.

FIG. 8 is a reference diagram to described D2D communication.

FIG. 13 is a reference diagram to describe options related to the present invention.

FIG. 18a shows the relations among eNB WAN DL, UE WAN UL and UE D2D RX according to one embodiment of the present invention.

BEST MODE FOR INVENTION

Figure 1:
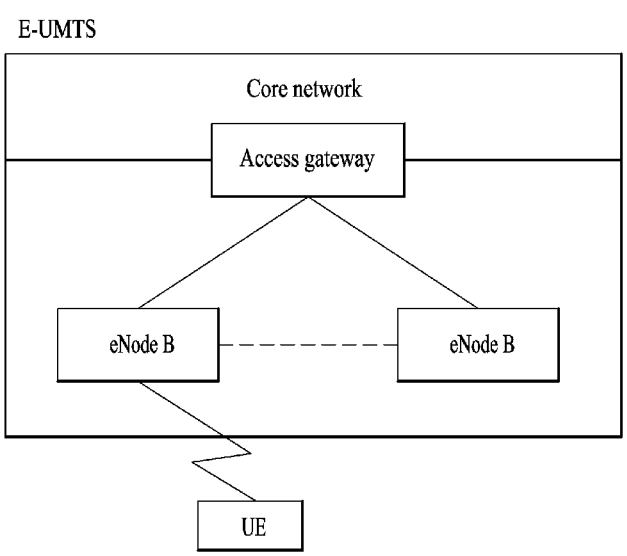
FIG. 1 shows a structure of E-UMTS network as one example of a wireless communication system.

The following technology may be used for various wireless access technologies such as code division multiple access (CDMA), frequency division multiple access (FDMA), time division multiple access (TDMA), orthogonal frequency division multiple access (OFDMA), and single carrier frequency division multiple access (SC-FDMA). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink (DL) and SC-FDMA in an uplink (UL). LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment (UE) and E-UTRAN based on the 3GPP radio access network standard. The control plane means a passageway where control messages are transmitted, wherein the control messages are used by the UE and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a DL, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the UE and the network. To this end, the RRC layers of the UE and the network exchange RRC message with each other. If the RRC layer of the UE is RRC connected with the RRC layer of the network, the UE is in an RRC connected mode. If not so, the UE is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a DL or UL transmission service to several UEs. At this time, different cells may be set to provide different bandwidths.

As DL transport channels carrying data from the network to the UE, there are provided a broadcast channel (BCH) carrying system information, a paging channel (PCH) carrying paging message, and a DL shared channel (SCH) carrying user traffic or control messages. Traffic or control messages of a DL multicast or broadcast service may be transmitted via the DL SCH or an additional DL multicast channel (MCH). Meanwhile, as UL transport channels carrying data from the UE to the network, there are provided a random access channel (RACH) carrying an initial control message and an UL shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
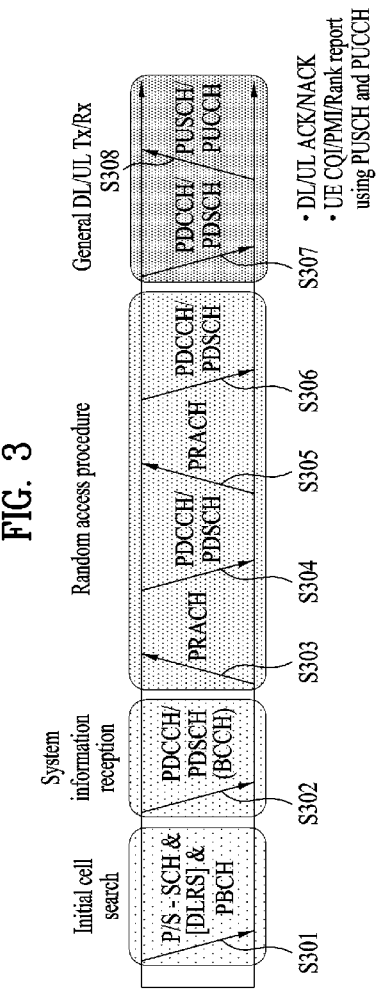
FIG. 3 is a diagram for physical channels used for 3GPP system and a general method of transmitting a signal using the physical channels.

FIG. 3 is a diagram illustrating physical channels used in a 3GPP LTE system and a general method for transmitting a signal using the physical channels.

The UE performs initial cell search such as synchronizing with the base station when it newly enters a cell or the power is turned on at step S301. To this end, the UE synchronizes with the base station by receiving a primary synchronization channel (P-SCH) and a secondary synchronization channel (S-SCH) from the base station, and acquires information such as cell ID, etc. Afterwards, the UE may acquire broadcast information within the cell by receiving a physical broadcast channel (PBCH) from the base station. Meanwhile, the UE may identify a DL channel status by receiving a DL reference signal (DL RS) at the initial cell search step.

The UE which has finished the initial cell search may acquire more detailed system information by receiving a physical DL shared channel (PDSCH) in accordance with a physical DL control channel (PDCCH) and information carried in the PDCCH at step S302.

Afterwards, the UE may perform a random access procedure (RACH) such as steps S303 to S306 to complete access to the base station. To this end, the UE may transmit a preamble through a physical random access channel (PRACH) (S303), and may receive a response message to the preamble through the PDCCH and the PDSCH corresponding to the PDCCH (S304). In case of a contention based RACH, the UE may perform a contention resolution procedure such as transmission (S305) of additional physical random access channel and reception (S306) of the physical DL control channel and the physical DL shared channel corresponding to the physical DL control channel.

The UE which has performed the aforementioned steps may receive the physical DL control channel (PDCCH)/physical DL shared channel (PDSCH) (S307) and transmit a physical UL shared channel (PUSCH) and a physical UL control channel (PUCCH) (S308), as a general procedure of transmitting UL/DL signals. Control information transmitted from the UE to the base station will be referred to as UL control information (UCI). The UCI includes hybrid automatic repeat and request acknowledgement/negative-ack (HARQ ACK/NACK), scheduling request (SR), channel state information (CSI), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes channel quality indicator (CQI), precoding matrix indicator (PMI), rank indication (RI), etc. Although the UCI is generally transmitted through the PUCCH, it may be transmitted through the PUSCH if control information and traffic data should be transmitted at the same time. Also, the UE may non-periodically transmit the UCI through the PUSCH in accordance with request/command of the network.

Figure 4:
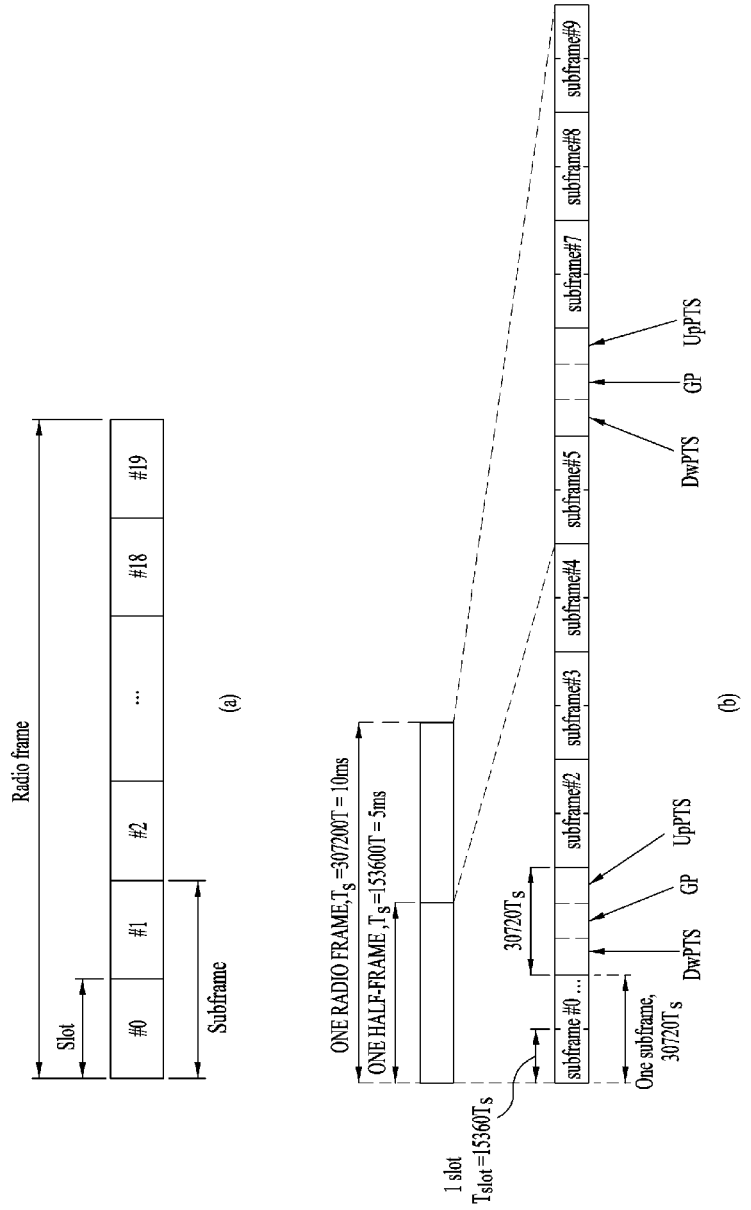
FIG. 4 is a diagram for a structure of a radio subframe used by LTE system.

FIG. 4 is a diagram illustrating a structure of a radio frame used in an LTE system.

Referring to FIG. 4, in a cellular OFDM radio packet communication system, UL/DL data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The DL radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a DL, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the UE moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical DL control channel (PDCCH), and the other OFDM symbols may be allocated to a physical DL shared channel (PDSCH).

FIG. 4(b) illustrates the structure of a type-2 radio frame. The type-2 radio frame includes two half frames, each of which has 4 normal subframes including 2 slots and a special subframe including a downlink pilot time slot (DwPTS), a guard period (GP), and an uplink pilot time slot (UpPTS).

In the special subframe, the DwPTS is used for initial cell search, synchronization, or channel estimation on a UE. The UpPTS is used for channel estimation and acquisition of uplink transmission synchronization for a UE in an eNB. That is, the DwPTS is used for downlink transmission, and the UpPTS is used for uplink transmission. In particular, the UpPTS is utilized for a PRACH preamble or SRS transmission. In addition, the GP is a period between uplink and downlink, which is intended to eliminate uplink interference caused by multipath delay of a downlink signal.

The current 3GPP standard document defines configuration of the special subframe as shown in Table 1 below. Table 1 shows DwPTS and UpPTS given when $T_s=1/(15000 \times 2048)$, and the other region is configured as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the TDD system, the structures of the type-2 radio subframe, namely uplink/downlink subframe configurations (UL/DL configurations), are given as shown in [Table 2] below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 2], D denotes a downlink subframe, U denotes an uplink subframe, and S denotes the special subframe.

Table 2 also shows downlink-to-uplink switch-point periodicity in uplink/downlink subframe configuration of each system.

The illustrated radio frame structures are merely illustrative, and various modifications may be made to the number of subframes included in a radio frame, the number of slots included in a subframe, or the number of symbols included in a slot.

Figure 5:
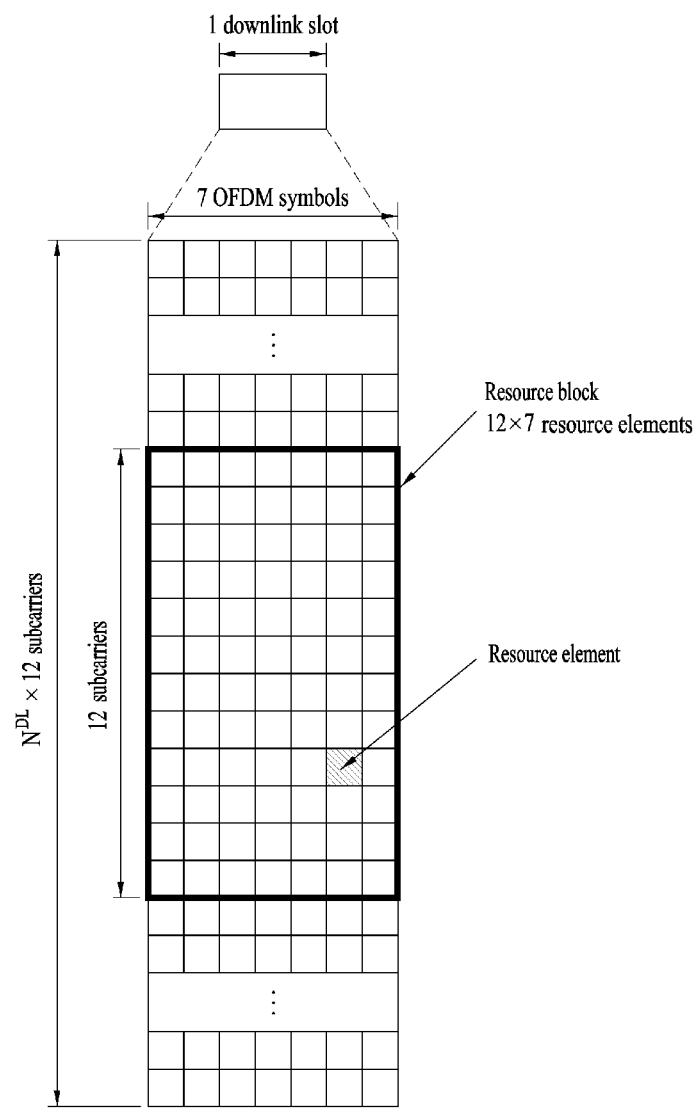
FIG. 5 is a diagram of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
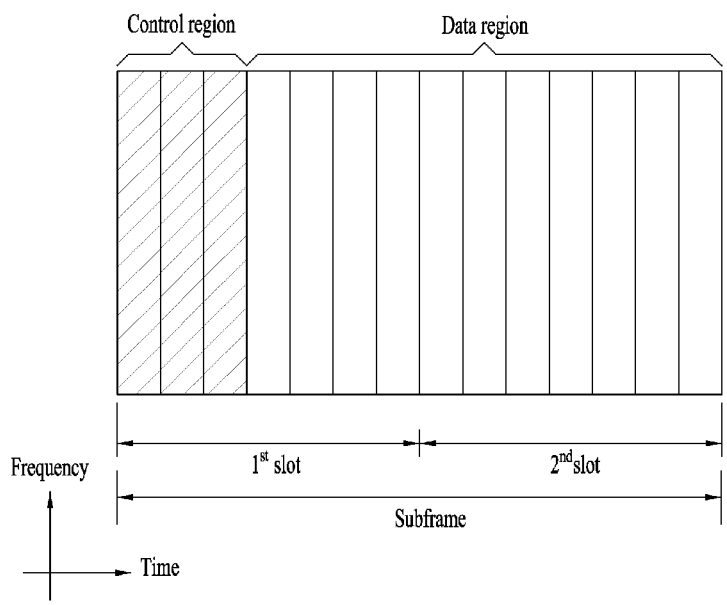
FIG. 6 is a diagram for one example of a structure of a downlink subframe.

FIG. 6 is a diagram illustrating a structure of a DL subframe.

Referring to FIG. 6, a maximum of three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a physical control format indicator channel (PCFICH), a physical downlink control channel (PDCCH), and a physical hybrid ARQ indicator channel (PHICH). The PCFICH is transmitted from the first OFDM symbol of the subframe, and carries information on the number of OFDM symbols used for transmission of the control channel within the subframe. The PHICH carries hybrid automatic repeat request acknowledgement/negative-acknowledgement (HARQ ACK/NACK) signals in response to UL transmission.

The control information transmitted through the PDCCH will be referred to as downlink control information (DCI). The DCI includes resource allocation information for a user equipment or user equipment group. For example, the DCI includes uplink/downlink scheduling information, an uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands of individual UEs within a random user equipment group, Tx power control command, and activity indication information of voice over Internet protocol (VoIP). A plurality of PDCCHs may be transmitted within the control region. The UE may monitor the plurality of PDCCHs. The PDCCH is transmitted on an aggregate of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches a cyclic redundancy check (CRC) to the control information. The CRC is masked with an identifier (for example, a radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, a system information block (SIB)), the CRC may be masked with system information RNTI (SI-RNTI). If the PDCCH is for a random access response, the CRC may be masked with a random access RNTI (RA-RNTI).

Figure 7:
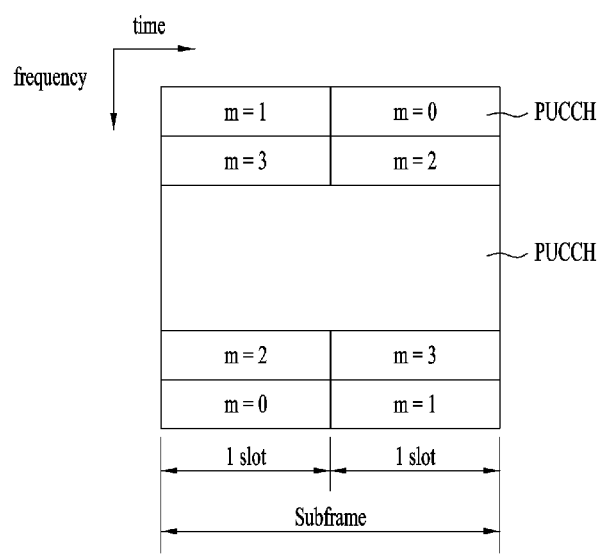
FIG. 7 is a diagram for one example of a structure of an uplink subframe.

FIG. 7 is a view illustrating an exemplary UL subframe structure in LTE.

Referring to FIG. 7, a UL subframe includes a plurality of (two) slots. A slot may include a different number of SC-FDMA symbols according to a CP length. The UL subframe is divided into a control region and a data region in the frequency domain. A PUSCH carrying user data such as voice is allocated to the data region. A PUCCH carrying UCI is allocated to the control region. The PUCCH includes an RB pair located at both ends of the data region along the frequency axis and hops over a slot boundary.

The PUCCH may carry the following control information.
Scheduling request (SR): information used to request UL-SCH resources. The SR is transmitted in on-off Keying (OOK).
HARQ ACK/NACK: a response signal to a DL data packet on a PDSCH. The HARQ ACK/NACK indicates whether the DL data packet has been received successfully. A 1-bit ACK/NACK is transmitted as a response to a single DL codeword and a 2-bit ACK/NACK is transmitted as a response to two DL codewords.
Channel state information (CSI): feedback information for a DL channel. The CSI includes a CQI, and multiple input multiple output (MIMO)-related feedback information includes an RI, a PMI, a precoding type indicator (PTI), and so on. The CSI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except for SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH.

Now, a description will be given of device-to-device (D2D) communication (UE-to-UE communication).

D2D communication may or may not be network/coordination station (e.g., BS)-assisted.

Referring to FIG. 8, FIG. 8(a) illustrates a scheme in which a network/coordination station intervenes in transmission and reception of a control signal (e.g., a grant message), HARQ, CSI, and so on, and only data is transmitted and received between D2D UEs. FIG. 8(b) illustrates a scheme in which the network provides only minimal information (e.g., D2D connection information available in a corresponding cell), and D2D UEs establish a link and transmit and receive data via the link.

Based on the foregoing description, methods for efficiently configuring D2D synchronization signal (D2DSS) (transmission/reception) resources and D2DSS transmission conditions in a D2D communication environment according to the present disclosure will be described.

D2D communication refers to communication between UEs on a direct radio channel. Although a UE is typically a terminal of a user, if network equipment such as an eNB transmits/receives a signal in a UE-to-UE communication scheme, the eNB may be regarded as a kind of UE to which the present disclosure is applicable. Wide area network (WAN) DL communication may refer to legacy communication such as transmission of an (enhanced) PDCCH ((E) PDCCH), a PDSCH, common reference signals (CRSs), or channel state information-reference signals (CSI-RSs) from an eNB to a UE. Or WAN communication may refer to legacy communication such as transmission of a PRACH, a PUSCH, or a PUCCH from a UE to an eNB.

While the present disclosure will be described below in the context of a 3GPP LTE system for the convenience of description, the present disclosure may be extended to other systems than the 3GPP LTE system.

Further, a UE that transmits a D2D signal is defined as a "D2D TX UE", and a UE that receives a D2D signal is defined as a "D2D RX UE", for the convenience of description.

Further, embodiments of the present disclosure may be extended to i) a case where some of D2D UEs participating in D2D communication are within network coverage, and the other D2D UEs are outside the network coverage (D2D discovery/communication of partial network coverage), and/or ii) a case where all of D2D UEs participating in D2D communication are within network coverage (D2D discovery/communication within network coverage), and/or iii) a case where all of D2D UEs participating in D2D communication are outside network coverage (D2D discovery/communication outside network coverage (for public safety only)).

Before a detailed description of the present disclosure, resource configuration/allocation for D2D communication will first be described.

In general, when a UE communicates with another UE on a direct radio channel, the UE may select a resource unit (RU) corresponding to specific resources from a resource pool being a set of contiguous resources, and transmits a D2D signal using the RU (i.e., a D2D TX UE operation). Then, the D2D RX UE receives information about the resource pool in which the D2D TX UE may transmit a signal, by signaling, and detects the signal of the D2D TX UE in the resource pool. Herein, i) if the D2D TX UE is within the connection coverage of an eNB, the eNB may indicate the resource pool information, and ii) if the D2D TX UE is outside the connection coverage of the eNB, another UE may indicate the resource pool information, or the resource pool may be determined to be predetermined resources.

In general, a resource pool includes a plurality of RUs, and each UE may select one or more RUs and transmit its D2D signal in the selected RUs.

Figure 9:
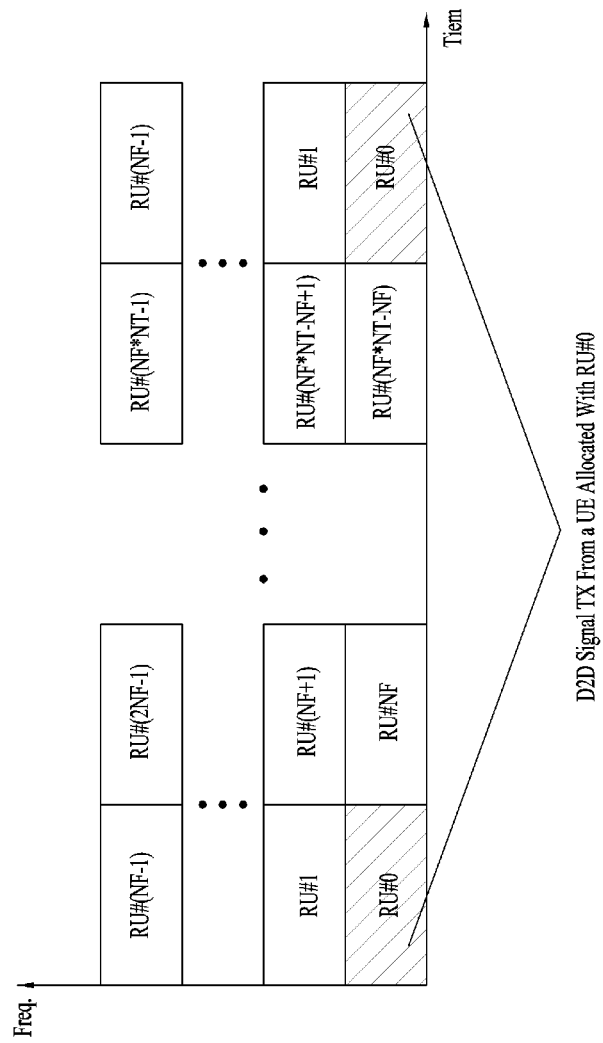
FIG. 9 is a reference diagram to describe one example of a configuration of a resource unit for D2D communication.

FIG. 9 is an exemplary view illustrating an RU configuration for D2D communication. In the illustrated case of FIG. 9, a total of NF×NT RUs are defined by dividing total frequency resources by NF and dividing total time resources by NT. It may be said that the resource pool is repeated every NT subframes (SFs). Characteristically, one RU may occur periodically as illustrated in FIG. 9. Or to achieve time or frequency diversity, the index of a physical RU to which a logical RU is mapped may vary over time in a predetermined pattern. In this RU structure, a resource pool may mean a set of RUs available for D2D signal transmission of a D2D TX UE.

Resource pools may be categorized into a plurality of types. First, the resource pools may be classified according to the content of D2D signals. For example, the content of D2D signals may be classified as follows, and a resource pool may be configured for each D2D content type.

Scheduling assignment (SA): a signal including information about the position of resources that each D2D TX UE uses for transmission of a subsequent D2D data channel, a modulation and coding scheme (MCS) required for demodulation of the data channel, a MIMO transmission scheme for the data channel, and so on. This signal may be transmitted multiplexed with D2D data in the same RU. In this case, an SA resource pool may mean a resource pool in which an SA is transmitted multiplexed with D2D data. For the convenience of description, a predefined (or signaled) resource set used for transmission and/or reception of an SA signal is referred to as an 'SA pool'.

D2D data channel: a pool of resources indicated by an SA, which a D2D TX UE uses for transmission of user data. If it is possible to transmit D2D data multiplexed with SA information in the same RU, only the D2D data channel except for the SA information may be transmitted in a resource pool configured for the D2D data channel. In other words, an RE used for transmission of the SA information in an individual RU of the SA resource pool is still used for transmission of D2D data in the resource pool of the D2D data channel. For the convenience of description, a predefined (or signaled) resource set used for transmission and/or reception of D2D data will be referred to as a 'data pool'.

Discovery message: a resource pool for a message in which a D2D TX UE transmits information such as its ID or the like so that an adjacent UE may discover the D2D TX UE. For the convenience of description, for example, a predefined (or signaled) resource set used for transmission and/or reception of a discovery message will be referred to as a 'discovery pool'.

As described before, even though D2D signals include the same type of content, different resource pools may be used according to the transmission/reception properties of the D2D signals. For example, for D2D data channels or discovery messages, different resource pools may further be defined depending on i) transmission timing determination schemes (e.g., transmission at the reception time of a reference synchronization signal, and transmission by applying a predetermined timing advance (TA) to the reception time of a reference synchronization signal) for the D2D signals, ii) resource allocation schemes (e.g., indication of transmission resources for an individual signal to an individual D2D TX UE by a cell, and autonomous selection of transmission resources for an individual signal from a pool by an individual D2D TX UE) for the D2D signals, or iii) the signal formats of the D2D signals (e.g., the number of symbols that each D2D signal occupies in one subframe or the number of subframes used for transmission of one D2D signal).

Further, resources may be allocated for transmission of a D2D data channel in the following two modes.

Mode 1: a cell directly indicates resources for use in transmission of an SA and D2D data to an individual D2D TX UE. As a result, the cell may have accurate knowledge of which UE will use which resources for D2D signal transmission. However, if the cell indicates D2D resources for transmission of every D2D signal, excessive signaling overhead may be incurred. Accordingly, the cell may allocate a plurality of SAs and/or data transmission resources by one signaling.

Mode 2: an individual D2D TX UE selects appropriate resources from a contiguous SA and data resource pool configured for a plurality of D2D TX UEs by a cell, and transmits an SA and data in the selected resources. As a result, the cell may not have accurate knowledge of which UE will use which resources for D2D signal transmission.

Resources for transmission of a discovery message may be allocated in the following two types.

TYPE 1: a discovery procedure in the case of non UE-specific resource allocation for transmission of a discovery signal. Herein, resources may be for all UEs or a group of UEs.

TYPE 2: a discovery procedure in the case of UE-specific resource allocation for transmission of a discovery signal.

TYPE 2A: resources are allocated at a specific transmission instance of each discovery signal.

TYPE 2B: resources are allocated semi-persistently for transmission of a discovery signal.

Figure 10:
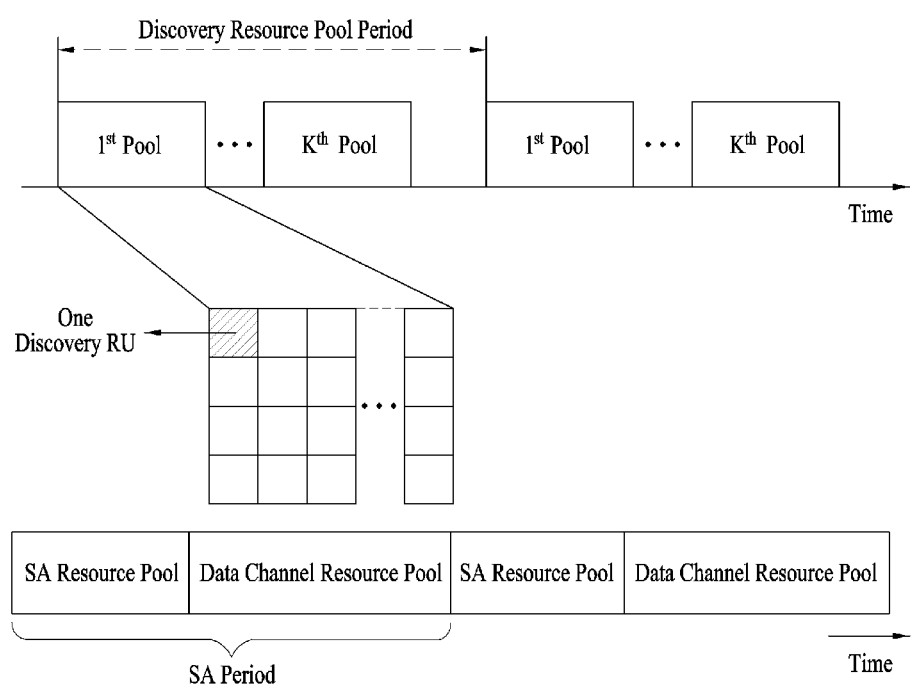
FIG. 10 shows a case that a discovery message related resource pool appears periodically.

FIG. 10 illustrates periodic occurrences of a discovery message-related resource pool (i.e., 'discovery resource pool'). In FIG. 10, the occurrence period of the resource pool is written as a 'discovery resource pool period'. In FIG. 10, among a plurality of discovery resource pools configured within one discovery resource pool period, a specific discovery resource pool(s) may be defined as a serving cell-related discovery TX/RX resource pool(s), and the other discovery resource pool(s) may be defined as a neighbor cell-related discovery RX resource pool(s).

A description will be given of methods for configuring D2DSS resources, and D2DSS transmission conditions, as proposed by the present disclosure based on the above description.

First, an in-coverage (or in-network (in-NW)) UE will be described.

A maximum of one D2DSS resource per cell may be configured for in-coverage UEs. The D2DSS resource includes a periodic SF satisfying the following Condition i) and Condition ii). A D2DSS may be transmitted in the periodic SF (e.g., an eNB will utilize resources unused for D2DSS transmission (for WAN communication)). i) D2DSS resource periods are equal for in-coverage and out-of-coverage, and may be preset to 40 ms. ii) When the D2DSS resource is configured, a time offset may be set in units of an SF, and D2DSS resource offsets of neighbor cells may be signaled by an SIB (the D2DSS resource offsets are time offsets in units of an SF with respect to SFN #0 of a serving cell).

A UE transmitting an SA or D2D data transmits a D2DSS in each SF satisfying (all or a part of) the following conditions within the D2DSS resource.

The SF does not collide with a cellular transmission, from the viewpoint of the UE.

A predefined condition such as UE capabilities is satisfied.

The SF is within an SA or a data period during which the SA or data is transmitted.

The UE is in RRC_Connected and an eNB indicates initiation of D2DSS transmission (by dedicated signaling), and/or when the UE does not transmit an SA or D2D data in an SF within the SA or a data period, a predefined other condition is satisfied, and/or all (or a part) of the following conditions are satisfied.

A reference signal received power (RSRP) threshold is set for D2DSS transmission related to D2D communication, and the RSRP threshold is configured by an SIB. For example, the threshold may be set to one of {−∞, −115, . . . , −60 (incremented by 5 each time), +∞} dBm.

The RSRP of the UE is lower than the threshold.

The eNB does not indicate discontinuation of the D2DSS transmission (by dedicated signaling).

For each discovery pool, in the case where the first SF of the discovery pool is a D2DSS resource, if (all or a part of) the following conditions are satisfied, a discovery UE transmits a D2DSS in the SF. Otherwise, if a D2DSS resource closest to the discovery pool, before the starting time of the discovery pool satisfies (all or a part of) the following conditions, the discovery UE transmits a D2DSS in the SF.

The SF does not collide with a cellular transmission from the view point of the UE.

The UE does not scan for another D2DSS.

A predefined condition such as UE capabilities is satisfied.

The UE transmits a discovery message in the discovery pool.

The UE is RRC_Connected and the eNB indicates initiation of D2DSS transmission (by dedicated signaling), and/or all (or a part) of the following conditions are satisfied.

An RSRP threshold is set for D2DSS transmission related to D2D communication, and the RSRP threshold is configured by an SIB. For example, the threshold may be set to one of {−∞, −115, . . . , −60 (incremented by 5 each time), +∞} dBm.

The RSRP of the UE is lower than the threshold.

The eNB does not indicate discontinuation of the D2DSS transmission (by dedicated signaling).

Further, an out-of-coverage UE will be described below. The out-of-coverage UE does not transmit a D2DSS in more D2DSS resources than one. For example, two D2DSS resources are used for out-of-coverage. For example, the positions of D2DSS resources (with respect to DFN #0) may be preset or signaled.

If a D2D RX UE receives neighbor cell-related synchronization error information of w1/w2 (by predefined higher-layer signaling), the D2D RX UE assumes a discovery reference synchronization window of size ±w1/±w2 for a neighbor cell D2D resource (and/or a neighbor cell discovery resource pool) (refer to [Table 3]).

TABLE 3

Figure 11:
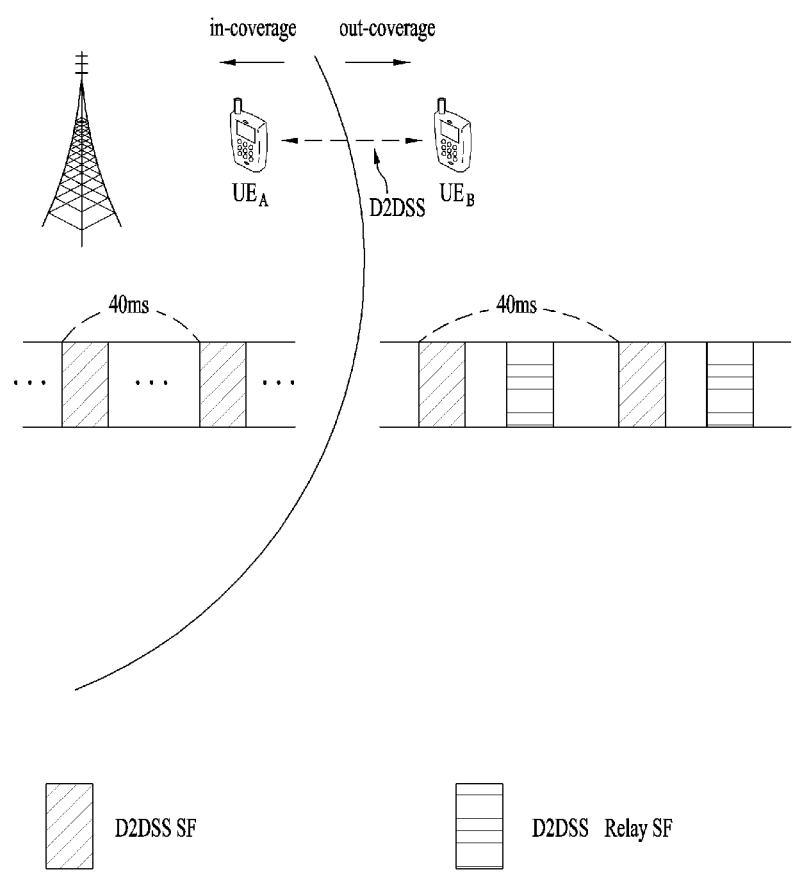
FIG. 11 is a reference diagram to describe D2DSS SF configuration and D2DSS relay SF for the aforementioned in-coverage UE and an out-of-coverage UE.

If higher layer indicates w1 in a given neighbor cell, UE may assume for the purpose of discovery a reference synchronization window of size +/−w1 ms for that neighbor cell with respect to neighbor cell D2DSS resource
w1 is a fixed value and decided
UE may assume D2DSS is transmitted in that cell TABLE 3-continued If higher layer indicates w2 in a given neighbor cell, UE may assume for the purpose of discovery a reference synchronization window of size +/−w2 ms for that neighbor cell with respect to neighbor cell discovery resource
  Exact value of w2 is decided
  RAN1 recommend w2 as not greater than CP length
  (of the order of CP length)
UE expects that D2DSS indicated by the resource pool configuration appears only within signaled reference synchronization window FIG. 11 is a view referred to for describing configuration of a D2DSS SF and a D2DSS relay SF for the above-described in-coverage UE and out-of-coverage UE.

Referring to FIG. 11, a maximum of one D2DSS resource (e.g., D2DSS SF) per cell may be configured for an in-coverage UE (e.g., UEa) located within the coverage of an eNB. On the other hand, for an out-of-coverage UE located outside the coverage of the eNB, a (another) D2DSS resource (e.g., a D2DSS relay SF) may be configured along with a (one) D2DSS resource aligned with the D2DSS resource for the in-coverage UE.

Figure 12:
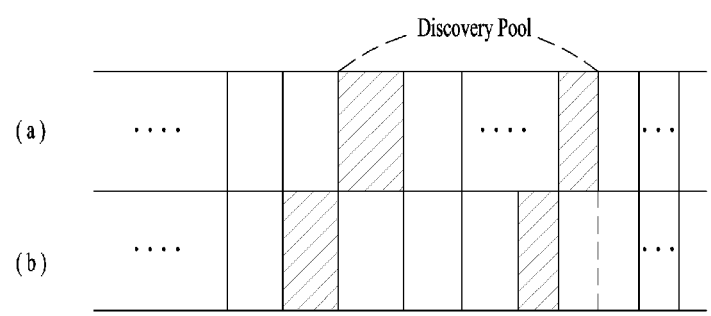
FIG. 12 shows a location of a resource pool carrying D2DSS.

FIG. 12 illustrates the positions of resource pools in which a D2DSS is transmitted. Referring to FIG. 12, a D2DSS may be transmitted in the first SF of a discovery pool ((a)) or in an SF closest to the discovery pool, before the starting time of the discovery pool ((b)).

Different conditions for D2DSS transmission may be set for an in-coverage UE and an out-of-coverage UE. For example, it may be indicated to the in-coverage UE whether a D2DSS will be transmitted by i) dedicated signaling from an eNB, or ii) a (preset or signaled) RSRP reference. For example, it may be determined for an out-of-coverage UE whether a D2DSS will be transmitted, based on (energy) measurement/detection in demodulation RSs (DMRSs) of a physical sidelink broadcast channel (PSBCH). For example, if no signal (e.g., no PSBCH DMRS) having a strength equal to or greater than a predetermined threshold is measured/detected (within a predetermined area/distance), the out-of-coverage UE determines that there is no synchronization source (within the predetermined area/distance), and transmits a D2DSS (as an independent synchronization source (ISS)). While discovery (pool)-related D2DSS transmission has been focused in FIG. 12, for the convenience of description, the present disclosure may also be extended to D2D communication (e.g., SA or D2D data) (pool)-related D2DSS transmission.

A description will first be given of an operation of an in-NW UE based on the foregoing description. Characteristically, D2DSS transmission may be optional to D2D-capable UEs. Accordingly, for example, only a D2DSS-capable UE preferably transmits a D2DSS.

A discovery UE transmits a D2DSS in a single SF during each discovery period. This operation may be sufficient for discovery performed only for an in-NW UE. In other words, as the in-NW UE is synchronized with a cell, a frequency error between a TX UE and an RX UE is limited, and D2DSS detection in a single SF is highly reliable. In this case, an additional condition may not be needed for D2DSS scanning because a serving cell provides D2DSS resources of neighbor cells and the D2DSS resources of a plurality of cells may be separated in time according to a network configuration. Further, a UE may not transmit a discovery signal in a resource pool, one of the reasons for which is collision with a WAN UL TX.

Therefore, one of the foregoing discovery-related D2DSS transmission conditions, "the UE transmits a discovery message in the discovery pool" needs to be changed to "the UE intends to transmit a discovery message in the discovery pool".

In regards to communication, it may first be determined whether D2DSS transmission needs to precede SA transmission (herein, data cannot be transmitted before the SA transmission). This is because there may not be a D2DSS resource before an SA SF within an SA/data period. In this case, a D2DSS may be transmitted after transmission of the SA. That is, if synchronization is required before SA reception, conditions similar to the foregoing conditions for discovery (discovery-related D2DSS transmission) may be additionally set.

In this case, however, D2DSS transmission in a single SF may not provide reliable synchronization performance to an out-NW UE(s) that may have a large initialization frequency offset. Accordingly, it is preferred that a D2DSS is transmitted in a plurality of SFs before SA transmission. For example, time limitation may be needed for the preceding D2DSS transmission. This is because if a time gap between a D2DSS SF and an SA SF is large, a UE has difficulty in accurately predicting the intention of SA transmission.

Further, in the case where an SA or data is not transmitted within an SA/data period, whether to transmit a D2DSS will be described. Because out-NW UEs need to receive a D2DSS for communication, an operation for discovery and an operation for communication need to be different. Specifically, because out-NW UEs may have a large frequency error, D2DSS detection should be highly reliable.

For fast synchronization of out-NW UEs, in-NW UEs need to transmit D2DSSs consecutively during a (preset) minimum time period. Thus, the out-NW UEs may detect at least one D2DSS in a set of contiguous D2DSS transmission SFs.

Further, because the out-NW UEs need to select a synchronization reference, measure a D2DSS to determine whether a D2DSS transmission condition is satisfied, and average proper (or reliable) measurements across a plurality of D2DSS SFs, random on-off of D2DSS transmission in units of 40 ms is preferably avoided.

For this purpose, if a preset specific condition is satisfied, a UE may be configured to transmit a D2DSS even though an SA or D2D data is not transmitted within an SA/data period. Hereinbelow, this will be referred to as a "condition for continuing D2DSS transmission".

The "condition for continuing D2DSS transmission" may be based on the principle that if a UE has transmitted a D2DSS at a previous time instant, the UE continues the D2DSS transmission during a (preset) time period. This principle may ensure continuous D2DSS transmission helpful for D2DSS detection and measurement of out-NW UEs.

Therefore, the following Option 1-1 to Option 1-3 may be considered in the present disclosure. FIG. 13 is a view referred to for describing Option 1-1 to Option 1-3. Option 1-1 to Option 1-3 will be described with reference to FIG. 13.

Option 1-1: a "D2DSS transmission timer" may be defined. If a UE transmits a D2DSS in SF #n under the condition that "the SF is within the SA or D2D data period in which the SA or data is transmitted", the UE may transmit the D2DSS continuously in SF #n+40, SF #n+80, . . . SF #n+K*40 in spite of the absence of an SA/data to be transmitted. Herein, K corresponds to the "D2DSS transmission timer".

Option 1-2: a total DFN range may be divided into a plurality of time partitions. On the assumption that the DFN range is from 0 to 1023 (i.e., one D2D frame is 10 ms long), DFN partition x includes D2D frames x, x+1, ..., x+M−1 (i.e., in the case of division into 1024/M DFN partitions). If a UE transmits a D2DSS in an SF included in DFN partition X, the UE continues the D2DSS transmission in the remaining D2DSS SFs of DFN partition X. This option is advantageous in that after an RX UE decodes a DFN on a linked (or associated) PD2DSCH, the RX UE may determine a potential D2DSS transmission change-related time instance.

Option 1-3: a "D2DSS measurement period" may be defined, and a UE that has transmitted a D2DSS in a specific SF transmits the D2DSS during a D2DSS measurement period linked to the SF. For example, it may be defined that a closest D2DSS measurement period (to the specific SF carrying the D2DSS of the UE) is linked (to the specific SF).

In relation to the above conditions, it is necessary to make sure that a UE does not transmit a D2DSS in an SF that does not satisfy the D2DSS transmission conditions. The eNB may determine at least a subset of SFs in which a D2DSS is not transmitted, and use the D2DSS resources of these SFs for cellular transmission (communication).

That is, in the case of in-coverage UEs,

A UE transmitting an SA or D2D data transmits a D2DSS in each SF satisfying (all or a part of) the following conditions within a D2DSS resource.

The SF does not collide with a cellular transmission, from the viewpoint of the UE.

A D2DSS-capable UE.

The SF is within the SA or D2D data period in which the SA or data is transmitted, and/or the SF is within Xms from an SF in which the UE intends to transmit the SA, and/or the SF satisfies a "condition for continuing D2DSS transmission".

The UE is in RRC_Connected state and the eNB indicates initiation of D2DSS transmission (by dedicated signaling), and/or all (or a part) of the following conditions are satisfied.

An RSRP threshold for D2D communication-related D2DSS transmission is set, and the threshold is set by an SIB. For example, the threshold may be set to one of {−∞, −115 . . . −60 (incremented by 5 each time), +∞}dBm.

The RSRP value of the UE is smaller than the threshold.

The eNB does not indicate discontinuation of the D2DSS transmission (by dedicated signaling).

In regards to a discovery UE, for each discovery pool, if the first SF of the discovery pool is a D2DSS resource and (all or a part of) the following conditions are satisfied, the discovery UE transmits a D2DSS in the SF. Otherwise, if a D2DSS resource closest to the discovery pool before the starting time of the discovery pool satisfies (all or a part of) the following conditions, the UE transmits a D2DSS in the SF.

The SF does not collide with a cellular transmission, from the viewpoint of the UE.

A D2DSS-capable UE.

The UE intends to transmit a discovery message in the discovery pool.

The UE is in RRC_Connected state and the eNB indicates initiation of D2DSS transmission (by dedicated signaling), and/or all (or a part) of the following conditions are satisfied.

An RSRP threshold for D2D discovery-related D2DSS transmission is set, and the threshold is set by an SIB. For example, the threshold may be set to one of {−∞, −115 . . . −60 (incremented by 5 each time), +∞}dBm.

The RSRP value of the UE is smaller than the threshold.

The eNB does not indicate discontinuation of the D2DSS transmission (by dedicated signaling).

If the above conditions are not satisfied, the UE does not transmit a D2DSS.

Further, for the "condition for continuing D2DSS transmission", the following three options, Option 2-1 to Option 2-3 may be considered.

Option 2-1: a D2DSS timer may be defined, and a UE that has transmitted a D2DSS according to the SA/data transmission condition may continue the D2DSS transmission without SA/data transmission until the timer expires.

Option 2-2: a total DFN range is divided into a plurality of DFN partitions, and a UE that has transmitted a D2DSS in an SF continues the D2DSS transmission during a DFN partition.

Option 2-3: a D2DSS measurement period is defined, and a UE that has transmitted a D2DSS in an SF continues the D2DSS transmission during a linked D2DSS measurement period.

Further, for D2DSS reception, a reference synchronization window for discovery may also be applied to communication, because the same D2DSS resource is shared between discovery and communication. After receiving a discovery resource pool, a UE may determine an accurate position of D2DSS transmission for discovery. Further, in the case of w2, a D2DSS may be omitted or transmitted outside a synchronization window. In consideration of this, a D2DSS (reception)-related UE assumption within the synchronization window may be limited to w1.

Accordingly, the reference synchronization window may be applied to both discovery and communication based on the principle that the "UE expects that a D2DSS indicated by the resource pool configuration appears only within a signaled reference synchronization window if w1 is indicated".

Now, out-NW UEs will be described. For example, it is important to minimize the number of D2DSSs that an out-NW UE needs to track. That is, since the UE can track only a limited number of D2DSSs, if the number of D2DSSs related to an incoming SA and data exceeds a limit, the UE may not receive all incoming SAs and data.

Therefore, since a UE capability of tracking different timings is limited, the following UE operations need to be considered. That is, 1) a UE synchronized with a D2DSS transmits the same D2DSS to form a synchronization cluster sharing a common timing.
2) only a data TX UE may become an ISS.
3) if a UE has transmitted a specific sequence during a previous period, the UE excludes the same D2DSS sequence when reselecting a D2DSS.

Therefore, a D2DSS sequence selection procedure for out-NW UEs is performed in the following three steps. For the convenience of description, for example, "a set of D2DSS sequence(s) transmitted by a UE when a transmission timing reference is an eNB" is referred to as D2DSS_net, and "a set of D2DSS sequence(s) transmitted by a UE when a transmission timing reference is not an eNB" is referred to as D2DSSue_oon.

Step 1: if an out-NW UE selects D2DSS X of D2DSSue_net as its TX timing reference, the UE selects D2DSS Y from D2DSSue_oon and transmits the selected D2DSS Y. The UE may make the selection randomly, or may avoid/prevent selection of a D2DSS detected during a TX timing reference selection procedure.

Step 2: if the UE selects D2DSS Z from D2DSSue_oon as its TX timing reference, the UE transmits the same D2DSS Z, when transmitting a D2DSS.

Step 3: if the UE has D2D data traffic to be transmitted, the UE may become an ISS using a D2DSS selected randomly from D2DSSue_oon.

Step 2 enables a D2DSS relay operation that reduces the number of D2DSSs in the system, in consideration that a UE synchronized with a D2DSS transmits the same D2DSS to form a synchronization cluster sharing a common timing.

Further, if the ISS has transmitted a specific sequence during a previous period, the ISS that has transmitted (or started to transmit) D2DSS Z assumes that D2DSS Z has not been detected, for synchronization with another D2DSS, in consideration that the same D2DSS sequence is excluded in D2DSS reselection. In other words, before reselection, the ISS may maintain the ISS operation only when a D2DSS other than a D2DSS transmitted by the ISS is not detected during reselection. After this operation, the out-NW UE may determine a D2DSS sequence for use in D2DSS transmission.

Further, a "detecting D2DSS" will be described in detail in the present disclosure. If an associated PD2DSCH is not decoded accurately or PD2DSCH reception quality is very poor, it is not proper to consider that a D2DSS has been detected and thus use the D2DSS as a reliable synchronization source. Specifically, if the associated PD2DSCH reception quality (e.g., the RSRQ of a PD2DSCH DM RS) is lower than a specific level, a UE may assume that a D2DSS has not been detected (therefore, the D2DSS does not affect D2D synchronization of the UE).

Accordingly, the following configurations may be applied for selection of a D2DSS sequence according to the present disclosure.

If a UE selects D2DSSue_oon as its TX timing reference, the UE transmits the same D2DSS.

The UE assumes that UEs transmitting the same D2DSS have been synchronized.

A condition that the out-NW UE transmits a D2DSS using a D2DSS sequence selected in the above operation will be described additionally. Basically, the D2DSS transmission condition formulation for an in-NW UE may be reused. If a UE other than an ISS detects a D2DSS from another UE, the UE transmits a D2DSS irrespective of whether its SA/data will be transmitted. That is, an additional condition may be required for D2DSS transmission of a non-ISS UE. For example, an RSRP threshold may be replaced with a D2DSS measurement threshold, and eNB configurations may be removed.

For reliable D2DSS detection and measurement of an out-NW UE, the afore-described D2DSS transmission preceding SA transmission and the afore-described condition for continuing D2DSS transmission may still be needed.

Therefore, according to the present disclosure, the following conditions may be configured to determine whether an out-NW UE will transmit a D2DSS in a single SF.

In regards to an out-of-coverage UE, in the case where the UE is an independent synchronization source (i.e., ISS), if each SF in a D2DSS resource that the UE has selected for D2DSS transmission is i) an SF within an SA or D2D data period in which the SA or D2D data is transmitted, and/or ii) an SF within X ms from an SF in which the UE intends to transmit the SA, and/or iii) an SF satisfying the "condition for continuing D2DSS transmission", the UE should transmit a D2DSS in the SF.

in the case where the UE is not an ISS, i) if each SF of a D2DSS resource that the UE does not use in receiving its TX synchronization reference is an SF within an SA or D2D data period in which the SA or D2D data is transmitted, or (/and) an SF within X ms from an SF in which the UE intends to transmit the SA, or (/and) an SF satisfying the "condition for continuing D2DSS transmission", or (/and) if a D2DSS of the TX synchronization reference is detected within a (preset) time window, or (/and) ii) if the D2DSS measurement of the TX timing reference is lower than a threshold, the UE should transmit a D2DSS.

Further, only two D2DSS resources are configured as D2DSS transmission resources, and an out-NW UE receives a D2DSS in one D2DSS resource from its synchronization reference and transmits a D2DSS in the other D2DSS resource.

Further, an out-of-coverage UE uses a periodic synchronization resource in D2DSS transmission. For example, a PD2DSCH may be transmitted (when supported), for D2DSS transmission. For example, the size of the synchronization resource may be predefined and the period of the synchronization resource may also be preset.

When a D2DSS synchronization source transmits a D2DSS in a synchronization resource, it transmits the D2DSS in at least one synchronization resource, and receives a D2DSS at least in the other synchronization resource(s). The synchronization resource that transmits (and/or) receives a D2DSS may be predetermined. In an additional example, a timing offset may be set between the synchronization resource for D2DSS reception and the synchronization resource for D2DSS transmission.

Therefore, according to the present disclosure, the UE should not transmit any (other) D2D signal/channel in a (D2DSS) SF unused for its D2DSS transmission, to thereby make sure to receive D2DSSs from other UEs.

Further, whether a D2D-silent period is required during a D2DSS reselection procedure of a UE will be described. Even though a synchronization resource occurs periodically and a UE does not transmit any (other) D2D signal/channel in (other) synchronization resources except for synchronization resources used for its D2DSS transmission, eNBs and UEs that are not synchronized with the periodic synchronization resources may transmit D2DSSs (in synchronization resources unused for transmission of the UE's D2DSS). Accordingly, it is necessary to define a "D2D-silent period" for D2D scanning without disturbance (or interference) from transmissions of nearby D2D UEs, so that UEs may efficiently scan potential asynchronous D2DSSs. If this period is not defined, the out-NW UE may not detect a weak D2DSS with high priority transmitted by an eNB or an in-NW UE, due to interference from other out-NW UEs.

Therefore, the present disclosure may support scanning of other synchronization sources by an out-NW UE by defining a "D2D-silent period" as a multiple of the length of a D2DSS period.

A description will be given of a WAN DL signal reception operation that a D2D RX UE with a single RX chain (i.e., "SRXCH_D2D RX UE") assumes when receiving a D2D discovery signal.

TABLE 4

For FDD carriers:
 At least for UEs with a single Rx chain (FFS subject to the UE capability
  discussion whether this also applies for UEs with a shared D2D/cellular Rx chain), a UE that is receiving D2D discovery signals on an UL carrier
  is not expected to read DL signals on the DL carrier paired to such UL carrier during the subframes belonging to the D2D discovery pools on that UL carrier as well as one subframe preceding and following these subframes
   The discovery pools are configured by the eNB by broadcast or UE-specific signaling
    FFS: For RRC_CONNECTED UEs, 1 bit may be signalled using RRC signaling indicating whether this rule applies or not
    (on a per UE basis)
  Cellular measurement gaps subframes are excluded from this rule
  Paging reception is prioritized over D2D reception
For TDD carriers:
 A UE configured by the eNB to monitor D2D on a certain carrier is expected to read DL signals on that carrier according to legacy procedures.

[Table 3] illustrates an exemplary synchronization assumption/configuration with which a D2D RX UE receives an inter-cell discovery signal (or a neighbor cell discovery signal). For example, if a D2D RX UE receives neighbor cell-related synchronization error information of w1/w2 (by predefined higher-layer signaling), the D2D RX UE assumes a discovery reference synchronization window of size ±w1/±w2 for a neighbor cell D2D resource (and/or a neighbor cell discovery resource cell) (refer to [Table 3]).

In a specific example, if a neighbor-cell D2DSS resource is configured in serving-cell SF #N, the D2D RX UE assumes that it may receive a neighbor-cell D2DSS within a range from 'SF #N−w1' to 'SF #N+w1'. If the D2D RX UE receives neighbor cell-related synchronization error information of w2 (by predefined higher-layer signaling), the D2D RX UE assumes a discovery reference synchronization window of size ±w2 for a neighbor-cell discovery resource. In a specific example, if a neighbor-cell discovery resource is configured in serving-cell SF #K, the D2D RX UE assumes that it may receive a neighbor-cell discovery signal within a range from 'SF #K−w2' to 'SF #K+w2'.

Now, the present disclosure proposes methods for efficiently receiving a WAN DL signal(s) in a DL SF(s) overlapped at least partially in the time domain, when a D2D RX UE with a single RX chain receives a D2D signal(s) in a preset or signaled D2D signal resource pool and/or a D2DSS(s) (linked to the D2D signal resource pool) under a D2D communication environment.

For the convenience of description, a D2D RX UE with a single RX chain will be referred to as an "SRXCH_D2D RX UE". For example, the term "SRXCH_D2D RX UE" may be extended to (interpreted as) a UE having fewer RX chains than the number of RX chains needed for simultaneous reception of a WAN DL signal/channel and/or a D2D signal/channel. For example, in view of the single RX chain, the SRXCH_D2D RX UE has difficulty in simultaneously receiving a D2D signal(s) (i.e., UL carrier #X) and a WAN DL signal(s) (i.e., DL carrier #X paired with UL carrier #X), or a D2DSS(s) and a WAN DL signal(s), which are overlapped at least partially (i.e., fully or partially) on different carriers (or in different frequency bands). For example, the SRXCH_D2D RX UE receives i) a D2D signal(s) (/D2DSS(s)) and a WAN DL signal(s) or ii) a D2DSS(s) and a WAN DL signal(s), which are transmitted in different time areas of different carriers (or frequency bands), by carrier (or frequency band) switching of the single RX chain.

A DL SF(s) overlapped at least partially (i.e., partially or fully) in the time domain may be interpreted as at least one of i) a DL SF(s) overlapped in the time domain at least partially (i.e., partially or fully) with all SF(s) within a time period to which a D2D signal resource pool configuration-related bitmap is applied, ii) a DL SF(s) overlapped in the time domain at least partially (i.e., partially or fully) with a (D2D signal resource pool or D2D signal(s) reception-related valid) D2DSS(s), iii) a DL SF(s) overlapped in the time domain at least partially (i.e., partially or fully) with one SF preceding and following a D2D signal resource pool (illustrated in [Table 4]) (i.e., an SF(s) for ensuring a time required, for carrier (or frequency band) switching of a single RX chain), iv) a DL SF(s) overlapped in the time domain at least partially (i.e., partially or fully) with an SF(s) configured actually as a D2D SF(s) among a SF(s) within a time period to which a D2D signal resource pool configuration-related bitmap is applied, or v) a DL SF(s) overlapped in the time domain at least partially (i.e., partially or fully) with one SF preceding and following a (D2D signal resource pool or D2D signal(s) reception-related valid) D2DSS(s) (i.e., an SF(s) for ensuring a time required for carrier (or frequency band) switching of a single RX chain).

For the convenience of description, such a DL SF(S) will be referred to as an "INV_DL SF(S)" (or "DL gap"), and when a SRXCH_D2D RX UE receives a D2D signal(s)/D2DSS(S), it may be interpreted that the SRXCH_D2D RX UE does not receive a WAN DL signal(s) in a corresponding INV_DL SF(S) (or DL GAP). Further, a preset or signaled D2D signal resource pool may be interpreted as at least one of a serving cell-related D2D signal resource pool and/or a neighbor cell-related D2D signal resource pool. In relation to i) D2D SA reception, ii) D2D data reception, iii) D2D discovery signal reception, or iv) a D2D discovery pool, at least one valid D2DSS resource position may be assumed according to the afore-described D2DSS resource configuration.

The following embodiments of the present disclosure are based on the assumption that an SRXCH_D2D RX UE receives a discovery signal(s) in a preset or signaled (serving-cell/neighbor-cell) D2D signal resource pool, and/or a D2DSS(s) (linked to the (serving-cell/neighbor-cell) D2D signal resource pool). However, the proposed methods of the present disclosure may be extended to a case in which a different type of D2D signal (e.g., a D2D communication signal) is received. It may also be configured that the proposed methods are applied restrictively to FDD carrier-based D2D signal/D2DSS reception.

<Method 1>

According to the present disclosure, when an SRXCH_D2D RX UE receives a D2DSS(s) linked to a (serving-cell/neighbor-cell) D2D signal resource pool, the SRXCH_D2D RX UE may be configured to assume that not only i) a DL SF(s) overlapped in the time domain at least partially (i.e., partially or fully) with a corresponding D2DSS resource(s) (or a D2DSS SF(s)) but also ii) a DL SF(s) overlapped in the time domain at least partially (i.e., partially or fully) with one SF preceding and following a D2DSS resource(s) (or D2DSS SF(S)) (i.e., an SF(s) for ensuring a time required for carrier (or frequency band) switching of a single RX chain) is an INV_DL SF(S).

Further, when the SRXCH_D2D RX UE receives a discovery signal(s) in a preset or signaled neighbor-cell discovery resource pool and/or a D2DSS(s) (linked to the neighbor-cell discovery resource pool), an INV_DL SF(S) may be defined/configured according to at least a part (i.e., a part or all) of the following rules.

The following description is based on the assumption that the SRXCH_D2D RX UE receives neighbor cell-related synchronization error information of w1 (or w2) (by predefined higher-layer signaling) (refer to [Table 4]). In this case, i) the SRXCH_D2D RX UE assumes that a neighbor-cell D2DSS may be received within a range from 'SF #N−w1' to 'SF #N+w1' (i.e., in the case where a neighbor-cell D2DSS resource is configured in serving-cell SF #N), or ii) the SRXCH_D2D RX UE assumes that a neighbor-cell discovery signal may be received within a range from 'SF #K−w2' to 'SF #K+w2' (i.e., in the case where a neighbor-cell discovery resource is configured in serving-cell SF #K).

Example 1-1

According to Embodiment 1 of the present disclosure, the SRXCHD2D RX UE should blind-search an area ranging from 'SF #N−w1' to 'SF #N+w1', for neighbor-cell D2DSS reception (or detection) (i.e., in the case where a neighbor-cell D2DSS resource is configured in serving-cell SF #N).

For this operation, when the SRXCH_D2D RX UE receives a neighbor-cell D2DSS (linked to a preset or signaled neighbor-cell discover resource pool), the SRXCH_D2D RX UE may be configured to assume that not only i) a DL SF(s) overlapped in the time domain at least partially (i.e., partially or fully) with an area ranging from 'SF #N−CEILING(w1)' to 'SF #N+CEILING(w1)', but also ii) a DL SF(s) overlapped in the time domain at least partially (i.e., partially or fully) with one SF preceding or following the area ranging from 'SF #N−CEILING(w1)' to 'SF #N+CEILING(w1)' (i.e., an SF(s) for ensuring a time required for carrier (or frequency band) switching of a single Rx chain) is an INV_DL SF(S).

In other words, the SRXCH_D2D RX UE assumes that a DL SF(s) overlapped in the time domain at least partially (i.e., partially or fully) with an area ranging from 'SF #N−CEILING(w1)−1' to 'SF #N+CEILING(w1)+1' is an INV_DL SF(S). Herein, CEILING(X) represents a function of deriving a smallest integer equal to or greater than X.

In another example, in the same situation (in the case where w1 is smaller than a preset or signaled threshold, that is, a time required for carrier (or frequency band) switching is secured without configuring an additional INV_DL SF(S)), the SRXCH_D2D RX UE may be configured to finally assume that a DL SF(s) overlapped in the time domain at least partially (i.e., partially or fully) with an area ranging from 'SF #N−CEILING(w1)' to 'SF #N+CEILING (w1)' is an INV_DL SF(s).

In another example, the SRXCH_D2D RX UE should blind-search an area ranging from 'SF #P−w1' to 'SF #P+w1', for neighbor-cell discovery signal reception(/detection) (i.e., in the case where a neighbor-cell discovery resource is configured in serving-cell SF #P) due to a D2D RX neighbor cell-related synchronization error (in the same situation).

For this operation, the SRXCH_D2D RX UE may be configured to assume that i) a DL SF(s) overlapped in the time domain at least partially (i.e., partially or fully) with an area ranging from '(STARTING) SF−CEILING(w1)−1 of a neighbor-cell discovery pool' to '(ENDING) SF+CEILING (w1)+1 of the neighbor-cell discovery pool' is an INV_DL SF(s), or ii) a DL SF(s) overlapped in the time domain at least partially (i.e., partially or fully) with an area ranging from '(STARTING) SF−CEILING(w1) of a neighbor-cell discovery pool' to '(ENDING) SF+CEILING(w1) of the neighbor-cell discovery pool' is an INV_DL_SF(s) (in the case where w1 is smaller than a preset or signaled threshold), or iii) a DL SF(s) overlapped in the time domain at least partially (i.e., partially or fully) with an area ranging from 'SF #P−CEILING(w1)−1' to 'SF #P+CEILING(w1)+1' (or (in the case where w1 is smaller than a preset or signaled threshold) an area ranging from 'SF #P−CEILING(w1)' to 'SF #P+CEILING(w1)+1') is an INV_DL_SF(s) (i.e., it may be interpreted that when an INV_DL SF(s) is configured, only an SF(s) actually configured as a discovery SF(s) from among an SF(s) within a time period to which a neighbor-cell discovery pool configuration-related bitmap is applied is considered).

In another example, if the ending SF of a time period to which a (serving-cell/neighbor-cell) discovery pool configuration-related bitmap is applied is a non-D2D SF (or a non-discovery SF), it may be configured that a DL SF(s) overlapped in the time domain at least partially (i.e., partially or fully) with one SF following the ending SF is not assumed to be an INV_DL SF(S).

In another example, if SFs are arranged in the order of "non-D2D SF, D2D SF, non-D2D SF" in the time period to which the (serving-cell/neighbor-cell) discovery pool configuration-related bitmap is applied, it may be configured that a DL SF(s) overlapped in the time domain at least partially (i.e., partially or fully) with one SF preceding and following the D2D SF is assumed to be an INV_DL SF(S). Or if SFs are arranged in the order of "non-discovery SF, discovery SF, non-discovery SF" in the time period to which the (serving-cell/neighbor-cell) discovery pool configuration-related bitmap is applied, it may be configured that a DL SF(s) overlapped in the time domain at least partially (i.e., partially or fully) with one SF preceding and following the discovery SF is assumed to be an INV_DL SF(S).

In another example, if in the time period to which the (serving-cell/neighbor-cell) discovery pool configuration-related bitmap is applied, D2DSS transmission is configured in a (UL) SF(s) for which the bitmap does not indicate '1' (i.e., meaning that the (UL) SF(s) is configured as a D2D SF (or a discovery SF)) or the (UL) SF(s) is defined as a D2DSS resource, it may be configured that D2D transmission is performed exceptionally in the (UL) SF(s). On the contrary, if in the time period to which the (serving-cell/neighbor-cell) discovery pool configuration-related bitmap is applied, D2DSS transmission is configured in a (UL) SF(s) for which the bitmap does not indicate '1' (i.e., meaning that the (UL) SF(s) is configured as a D2D SF (or a discovery SF)) or the (UL) SF(s) is defined as a D2DSS resource, it may be configured that D2D transmission is not performed exceptionally in the (UL) SF(s).

In another example, if the SRXCH_D2D RX UE blind-searches an area ranging from 'SF #N−w2' to 'SF #N+w2', for reception/detection of a neighbor-cell D2DSS (linked to a preset or signaled neighbor-cell discovery resource pool) (i.e., in the case where a neighbor-cell D2DSS resource is configured in serving-cell SF #N), the SRXCH_D2D RX UE may be configured to assume that a DL SF(s) overlapped in the time domain at least partially (i.e., partially or fully) with one of an area ranging from 'SF #N−1' to 'SF #N+1', an area ranging from 'SF #N−CEILING(w2)−1' to 'SF #N+CEILING(w2)+1', and an area ranging from 'SF #N−FLOOR(w2)−1' to 'SF #N+FLOOR(w2)+1' is an INV_DL SF(S).

In another example, (in the same situation) the SRXCH_D2D RX UE should blind-search an area ranging from 'SF #P−w2' to 'SF #P+w2', for reception/detection of a neighbor-cell discovery signal due to a D2D RX neighbor cell-related synchronization error (i.e., in the case where a neighbor-cell discovery resource is configured in serving-cell SF #P).

For this operation, the SRXCH_D2D RX UE may be configured to assume that a DL SF(s) overlapped in the time domain at least partially (i.e., partially or fully) with i) an area ranging from 'the starting SF−1 of a neighbor-cell discovery pool' to 'the ending SF+1 of the neighbor-cell discovery pool', ii) an area ranging from 'the starting SF−CEILING(w2)−1 of the neighbor-cell discovery pool' to 'the ending SF+CEILING(w2)+1 of the neighbor-cell discovery pool', and iii) an area ranging from 'the starting SF−FLOOR(w2)−1 of the neighbor-cell discovery pool' to 'the ending SF+FLOOR(w2)+1 of the neighbor-cell discovery pool' is an INV_DL SF(S).

In another example, as the rule described in [Table 4], "paging reception (and/or SIB reception) is prioritized over D2D reception" is applied, if an (RRC_IDLE) D2D UE should receive a paging signal (and/or an SIB) (SF #N) during at least one of i) reception of a (neighbor-cell/serving-cell) discovery signal in a (neighbor-cell/serving-cell) D2D signal resource pool and ii) reception of a (neighbor-cell/serving-cell) D2DSS linked to the (neighbor-cell/serving-cell cell) D2D signal resource pool, the (RRC_IDLE) D2D UE may be configured not to receive a discovery signal in an SF(s) of the (neighbor-cell/serving-cell cell) D2D signal resource pool, overlapped in the time domain at least partially (i.e., partially or fully) with an area ranging from 'SF #N−1' to 'SF #N+1' (or 'SF #N').

In another example, as the rule described in [Table 4], "paging reception (and/or SIB reception) is prioritized over D2D reception" is applied, if the (RRC_IDLE) D2D UE should receive a paging signal (and/or an SIB) (SF #N) during at least one of i) reception of a (neighbor-cell/serving-cell) discovery signal in a (neighbor-cell/serving-cell) D2D signal resource pool and ii) reception of a (neighbor-cell/serving-cell) D2DSS linked to the (neighbor-cell/serving-cell cell) D2D signal resource pool, the (RRC_IDLE) D2D UE may be configured not to receive a D2DSS in a (neighbor-cell/serving-cell) D2DSS(s) (or D2DSS resource) overlapped in the time domain at least partially (i.e., partially or fully) with an area ranging from 'SF #N−1' to SF #N+1' (or SF #N').

In another example, the (RRC_IDLE) D2D UE may be configured not to receive a discovery signal in a (neighbor-cell/serving-cell) D2D signal resource pool overlapped in the time domain at least partially (i.e., partially or fully) with a reception time of the paging signal (and/or SIB).

Example 1-2

According to Embodiment 1 of the present disclosure, if i) the difference between a preset or signaled neighbor-cell D2DSS resource offset and a preset or signaled neighbor-cell discovery resource pool offset or ii) the difference between 'SF #N+CEILING(w1)+1' (or 'SF #N+CEILING(w1)') for configuring an INV_DL SF(s) related to neighbor-cell D2DSS reception and 'starting SF−CEILING(w1)−1' of a neighbor-cell discovery pool (or 'starting SF−CEILING (w1)' of the neighbor-cell discovery pool) for configuring an INV_DL SF(s) related to neighbor-cell discovery signal reception, as described in Example 1-1, is smaller than a preset or signaled threshold, it may be configured that a DL SF(s) overlapped in the time domain at least partially (i.e., partially or fully) with an area between 'SF #N+CEILING (w1)+1' (or 'SF #N+CEILING(w1)') for configuring an INV_DL SF(s) related to neighbor-cell D2DSS reception and 'starting SF-CEILING(w1)−1' of a neighbor-cell discovery pool (or 'starting SF-CEILING(w1)' of the neighbor-cell discovery pool) for configuring an INV_DL SF(s) related to neighbor-cell discovery signal reception, as described in Example 1-1, is also assumed/configured to be an INV_DL SF(S). This assumption/configuration may reduce frequent carrier (or frequency band) switchings of a single RX chain.

In an example, the assumption/configuration may be interpreted as meaning that if i) the difference between a preset or signaled neighbor-cell D2DSS resource offset and a preset or signaled neighbor-cell discovery resource pool offset or ii) the difference between 'SF #N+CEILING(w1)+1' (or 'SF #N+CEILING(w1)') for configuring an INV_DL SF(s) related to neighbor-cell D2DSS reception and 'starting SF−CEILING(w1)−1' of a neighbor-cell discovery pool (or 'starting SF-CEILING(w1) of the neighbor-cell discovery pool') for configuring an INV_DL SF(s) related to neighbor-cell discovery signal reception, as described in Example 1-1, is greater than a preset or signaled threshold, it may be configured that a DL SF(s) overlapped in the time domain at least partially (i.e., partially or fully) with an area between 'SF #N+CEILING(w1)+1' (or 'SF #N+CEILING(w1)') for configuring an INV_DL SF(s) related to neighbor-cell D2DSS reception and 'starting SF−CEILING(w1)−1' of a neighbor-cell discovery pool (or 'starting SF-CEILING(w1) of the neighbor-cell discovery pool') for configuring an INV_DL SF(s) related to neighbor-cell discovery signal reception, as described in Example 1-1, is not assumed/configured to be an INV_DL SF(S).

<Method 2>

As described above, a (serving-cell/neighbor-cell) D2DSS resource with a preset or configured periodicity may be linked to a plurality of (serving-cell/neighbor-cell) D2D signal resource pools. Or one (serving-cell/neighbor-cell) D2DSS configuration may be used for a plurality of (serving-cell/neighbor-cell) D2D signal resource pools. Further, for example, the (serving-cell/neighbor-cell) D2DSS resource period may be fixed to 40 ms.

In consideration of this characteristic, when an INV_DL SF(s) related to reception of a (serving-cell/neighbor-cell) D2DSS(s) linked to a (serving-cell/neighbor-cell) D2D signal resource pool(s) is configured, the SRXCH_D2D RX UE may configure an INV_DL SF(s) according to Method #1, taking into account only a (preceding or following) (serving-cell/neighbor-cell) D2DSS linked to a (serving-cell/neighbor-cell) D2D signal resource pool that the SRXCH_D2D RX UE intends to actually receive (i.e., the latest SF of the D2DSS resource before the start of the discovery pool).

For example, this configuration/assumption may be interpreted as meaning that the SRXCH_D2D RX UE does not configure an INV_DL SF(s) in consideration of a linked (serving-cell/neighbor-cell) D2DSS preceding (or before) a (serving-cell/neighbor-cell) D2D signal resource pool that the SRXCH_D2D RX UE does not receive or does not want to receive. Application of the configuration/assumption may reduce excessive INV_DL SF(s) configuration caused by a (serving-cell/neighbor-cell) D2DSS.

Further, for example, the assumption/configuration may be applied restrictively to a case in which the SRXCH_D2D RX UE is instructed by predefined dedicated signaling (e.g., RRC signaling) (from the serving cell) to perform a (serving-cell/neighbor-cell) discovery signal reception only in a specific (serving-cell/neighbor-cell) D2D signal resource pool.

In another example, when an INV_DL SF(s) related to reception of a (serving-cell/neighbor-cell) D2DSS(s) linked to a (serving-cell/neighbor-cell) D2D signal resource pool(s) is configured, the SRXCH_D2D RX UE may configure an INV_DL SF(s) according to Method #1, taking into account only a (preceding or following) (serving-cell/neighbor-cell) D2DSS linked to a (serving-cell/neighbor-cell) D2D signal resource pool (i.e., the latest SF of the D2DSS resource before the start of the discovery pool).

<Method #3>

If it is difficult to acquire synchronization to an associated/linked (serving-cell/neighbor-cell) D2D signal resource pool with reception of one (serving-cell/neighbor-cell) D2DSS, it may be defined that preset or signaled Q (serving-cell/neighbor-cell) D2SS(s) preceding (or before) the (serving-cell/neighbor-cell) D2D signal resource pool are received/used.

In this case, the SRXCH_D2D RX UE may be configured to configure an INV_DL SF(s) (according to the afore-described Method #1 or Method #2) in consideration of the preset or signaled Q (serving-cell/neighbor-cell) D2SS(s) preceding (or before) the (serving-cell/neighbor-cell) D2D signal resource pool.

Further, a method for setting usage indexes in relation to a discovery pool configuration may be defined as illustrated in [Table 5].

TABLE 5

The discovery pools RRC configuration can indicate a usage index per pool to reserve the pool for specific usages
If more than 1 resource pool with the same usage index is configured for type 1 discovery, the network configures the method for the UE to select the resource pool among the pools with a given usage index;
the following methods are supported:
  Random, subject to meeting the UE and network power configurations
    Default if no other method is configured
  UE RSRP measurement
    For each pool, an upper RSRP value and a lower RSRP value are configured
    For each value: {−infinity, −110 . . . −60, +infinity}dBm, increments of 10 dB Methods for efficiently configuring an INV_DL SF(s) (or a DL GAP) will be additionally described. Based on the afore-described [Table 4] and [Table 3], the operation of [Table 4] is valid as an operation for D2D discovery pools of a serving-cell D2D discovery pool and a D2D discovery pool of a neighbor cell for which a window length of w2 is indicated.

However, regarding pools of a neighbor cell for which a window length of w1 is indicated, a 1-ms margin preceding or following a discovery pool is not sufficient to accommodate the ambiguity of a cell timing. In other words, a DL gap should be defined as SFs belonging to discovery resource pools of the neighbor cell on a UL carrier, (ceil(w1)+1) SFs preceding the SFs, and (ceil(w1)+1) SFs following the SFs.

Further, a UE needs to receive a D2DSS in the first SF of the discovery pool or in an SF closest to the first SF of the discovery pool, before the discovery pool.

In consideration of this, a D2DSS SF related to a discovery pool of a neighbor cell, (ceil(w1)+1) SFs preceding the D2DSS SF, and (ceil(w1)+1) SFs following the D2DSS SF need to be configured as an (additional) DL gap.

Figure 14A:
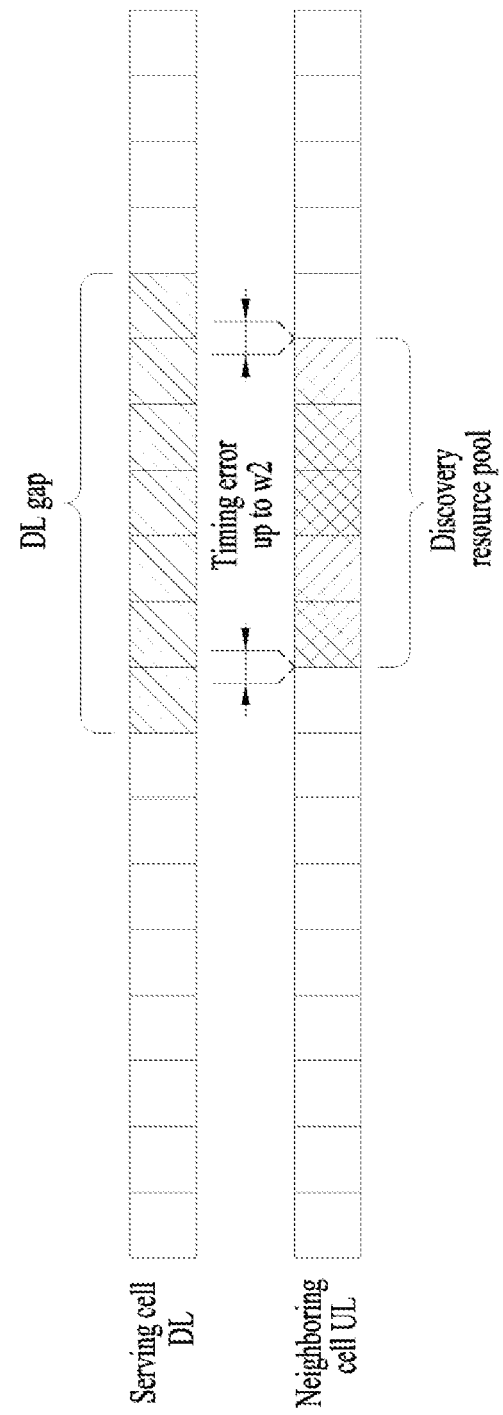
FIG. 14a is a reference diagram to compare DL GAPs necessary for neighbor cells of synchronization window lengths w2 and w1 according to the present invention.
Figure 14B:
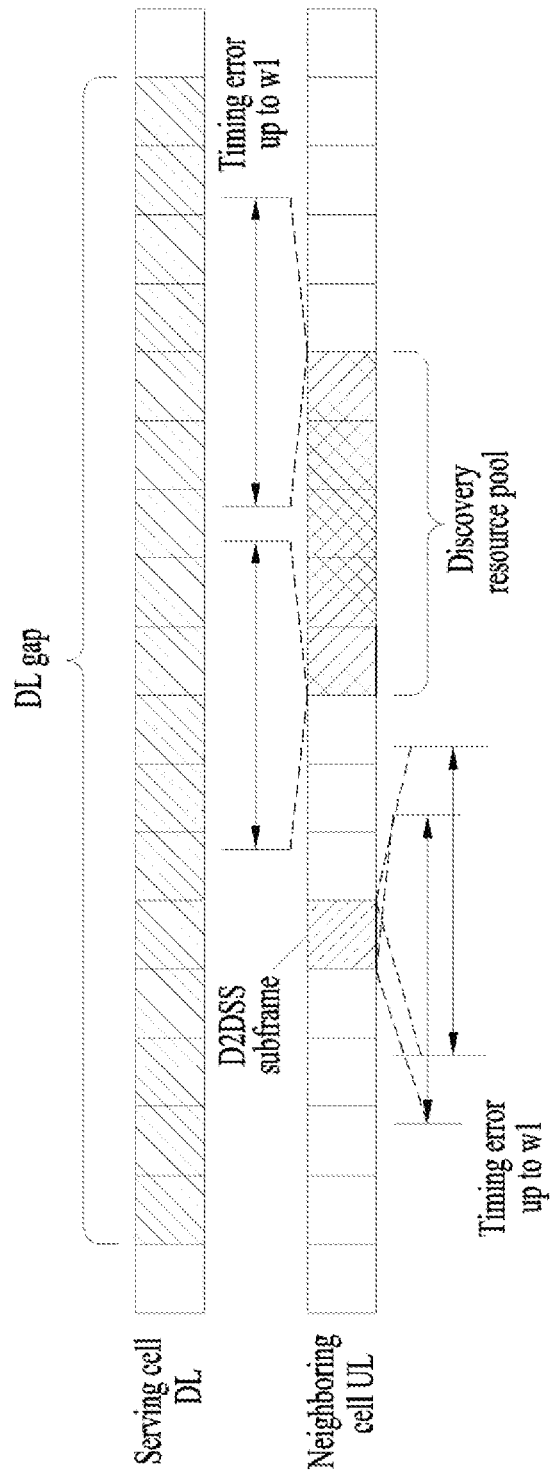
FIG. 14b is a reference diagram to compare DL GAPs necessary for neighbor cells of synchronization window lengths W2 and w1 according to the present invention.

FIG. 14 is a view referred for comparing DL gaps required for neighbor cells with synchronization window lengths of w2 and w1. FIG. 14(a) illustrates a DL gap required for a neighbor cell with a synchronization window length of w2, and FIG. 14(b) illustrates a DL gap required for a neighbor cell with a synchronization window length of w1.

Whether a DL gap for a discovery pool and an associated D2DSS SF is a single continuous DL gap or two independent (separate) DL gaps may be additionally considered. Also, whether a DL gap for a D2DSS SF can be configured for a D2DSS-incapable UE may be considered.

For example, a DL gap related to discovery may be applied to discovery pools of a serving cell or discovery pools of a neighbor cell for which a synchronization window length of w2 is indicated.

For a neighbor cell having a synchronization window length of w1, a DL gap may be configured for discovery pools, D2DSS SFs related to the discovery pools, (ceil(w1)+1) SFs preceding the D2DSS SFs, and (ceil(w1)+1) SFs following the D2DSS SFs.

Now, whether an eNB is capable of controlling a DL gap configuration for each UE will be described below. A DL gap may be unnecessary for some UEs according to the capabilities of the UEs and a CA configuration.

For example, if a UE is capable of both communication and discovery, and DL CA supporting simultaneous reception of a WAN DL signal and a D2D signal is configured for the UE, the UE may not need a DL gap for reception of a discovery signal.

Even though the UE does not support D2D communication, UE capability signaling indicating a condition (for the UE) requiring a DL gap (or indicating whether a DL gap is necessary) may be defined (refer to [Table 6]).

TABLE 6

1. INTRODUCTION
This contribution discusses the D2D UE capability. How to separate the features of Rel-12 D2D will be discussed first, and then how to define the D2D frequency bands will be discussed.
2. DISCUSSION
2.1 D2D FEATURES
Considering many discussions on PS and non-PS services in D2D SI/WI, it is natural to separate the features of discovery and communication. In other words, a D2D-capable UE supports only communication, only discovery, or both of them. Regarding the two communication modes, we think that the following agreements made in RAN1#76 imply that a D2D communication capable UE shall support both modes. In our understanding the agreement, a D2D communication capable UE shall be able to be a transmitting UE using Mode 1 when it is inside network coverage, and, at the same time, it also shall be able to be a transmitting UE using Mode 2 when it is at the edge-of-coverage and/or outside network coverage. The definition "edge-of-coverage" is not cleared specified, but we think that it can include the exceptional case which uses Mode 2 for the resource allocation.

TABLE 6-continued

Agreements (RAN1#76):
   From a transmitting UE perspective a UE can operate in two modes for resource
   allocation:
      Mode 1: eNodeB or rel-10 relay node schedules the exact resources used by a
      UE to transmit direct data and direct control information
         FFS: if semi-static resource pool restricting the available resources for
         data and/or control is needed
      Mode 2: a UE on its own selects resources from resource pools to transmit
      direct data and direct control information
         FFS if the resource pools for data and control are the same
         FFS: if semi-static and/or pre-configured resource pool restricting the
         available resources for data and/or control is needed
      D2D communication capable UE shall support at least Mode 1 for in-coverage
      D2D communication capable UE shall support Mode 2 for at least edge-of-
      coverage and/or out-of-coverage
         FFS: Definition of out-of-coverage, edge-of-coverage, in-coverage
It may be possible to separate the two discovery types in the supported features. On the other
hand, the difference in the transmitter behavior in the two types may not be significant: The
resource allocation within each discovery period would be identical, and the only difference
is random selection vs. deterministic resource hopping across discovery periods. We note that
the receiver behavior is expected to be identical in the two discovery types, i.e., a receiver UE
blindly searches each reception pool with no knowledge about the discovery type used in the
transmitters.
The D2DSS-related feature can be separated from the features of communication and
discovery. For example, if a UE is intended to be operated only inside the coverage of
synchronized networks, the D2DSS-related operations do not need to be implemented. It is
noteworthy that, even a UE not capable of D2DSS can support inter-cell D2D in un-
synchronized networks because high layer signaling provides the cell ID together with the
resource pools of neighboring cells [1] and such a UE can receive D2D signals from
neighboring cell UEs by using PSS/SSS/CRS. Details of D2DSS features can be different in
discovery and communication. By the following agreement, D2DSS in discovery does not
require any PD2DSCH-related operations, while a communication UE should be able to
transmit PD2DSCH if it can transmit D2DSS.
Agreement:
   Communication UEs transmitting D2DSS transmit PD2DSCH in in-coverage, out of
   coverage cases
   In coverage UEs participating only in discovery do not transmit PD2DSCH
Considering that D2DSS sequences are divided into two sets, D2DSSue_net and
D2DSSue_oon, a UE capable of only discovery does not need to transmit/receive a D2DSS
belonging to D2DSSue_oon. This leads to two different features, one for D2DSSue_net and
the other for PD2DSCH. By the above agreement, supporting PD2DSCH means supporting
D2DSS as well, thus the feature PD2DSCH can have D2DSSue_net and D2DSSue_oon as
the prerequisite. It would be a natural consequence that a UE which is not capable of D2DSS
cannot transmit or receive D2D communication when it is outside network coverage, but such
a UE may be able to communicate with some out-coverage UEs if these out-coverage UEs
are synchronized to the serving cell timing which is relayed by D2DSS transmitted from
some other in-coverage UEs.
The above discussions lead to the D2D features listed in Table 7(List of the D2D features).
Some D2D feature combinations are listed in Table 8(Examples of D2D feature
combinations), and we note that more combinations can be considered, e.g., Feature B + D in
the future releases where discovery for out-NW UEs is necessary.
Proposal 1: As the baseline, four D2D features are defined for D2DSSUE_net,
PD2DSCH (including D2DSSue_net and D2DSSue_oon), D2D communication, and D2D
discovery. Inter-cell D2D or out-coverage D2D can be supported by a proper
combination of these features.
2.2 D2D FREQUENCY BANDS
In general, the eNB needs to know the D2D frequency bands supported by each UE. This
knowledge is necessary especially for the assessment of impact across D2D and WAN which
appears differently in the D2D reception and D2D transmission.
A. ISSUES IN D2D RECEPTIONS
It seems natural to define a list of frequency bands in which the UE can receive D2D. In
defining the related UE capability, the impact of D2D reception on the WAN operation needs
to be addressed together. First, in relation to WAN RX, the related agreement can be
summarized as follows:
   For communication, receiving D2D in a FDD UL band may reduce the DL
   CA/MIMO capability [2].
   For discovery, receiving D2D in a FDD UL band requires "DL gap" in the paired DL
   band. FFS whether eNB can control the configuration of such DL gap [3].
One solution to reflect the agreement for communication can be to inform the network of the
DL CA/MIMO capability which will be supported if the UE needs to participate in receiving
communication in a certain frequency band. In other words, a UE reports the frequency band
where D2D communication reception is supported with a certain DL CA band combination
and MIMO capability. Detailed capability signaling design can be discussed in RAN2. In
discovery reception capability, if it is supported for the eNB to control the configuration of
"DL gap" for discovery [4], it can be useful if the eNB knows in which condition a certain
UE requires such DL gap. We note that the discussed capability signaling for communication
and discovery share the commonality that it describes the impact of D2D reception on WAN
DL reception, so a common signaling structure may be feasible.
Proposal 2: For communication, a UE reports the frequency band(s) where it supports
D2D communication reception per each supported band combination. It can be TABLE 6-continued discussed whether the same capability signaling is also used to report the impact of D2D discovery on WAN DL reception.
Another issue is related to WAN TX as per the agreement of supporting "Simultaneous D2D RX on CC1 and WAN TX on CC2 from RAN1 perspective." As this feature is related to the frequency separation and UE implementation, it seems reasonable to inform the network of the band combination in which this simultaneous operation is supported. To be specific, a UE can indicate a list of {CC1, CC2}, each of which represents the band combination in which the simultaneous D2D RX on CC1 and WAN TX on CC2 is supported (or such simultaneous operation is not supported equivalently). Based on this information, the eNB can decide in which combination of D2D RX and WAN TX UL scheduling restriction is necessary for a UE participating in D2D reception.
Proposal 3: A UE reports a list of band combinations, each of which represents the support (or no support) of simultaneous D2D RX and WAN TX.
B. ISSUES IN D2D TRANSMISSIONS
The network needs to know the set of frequency bands on which a UE can transmit D2D. It can be further discussed whether a D2D-capable UE can transmit D2D on a carrier frequency if it can transmit WAN in the same carrier. If the answer is yes, no additional band combination signaling is necessary to indicate the carrier frequency in which D2D TX is supported.
In the last meeting, it was agreed to support "simultaneous D2D TX on CC1 and WAN TX on CC2 from RAN1 perspective." As discussed in [5], the feasibility of such simultaneous TX is dependent of the TX timing of D2D and WAN. When the transmit timing of the two carriers is the same, it is basically the same as conventional UL CA from the RF point of view, so no specific issues are expected other than handling the power limited case which is discussed in [6]. On the other hand, supporting misaligned simultaneous transmission has been up to the UE capability so far. Multiple timing advance group (TAG) was introduced in Rel-11, and if two carriers belong to different TAGs in the UE capability, the UE can support simultaneous transmissions as far as the timing misalignment is not greater than 32.47 us. If UE is not able to support misaligned transmissions of WAN UL in the two carriers, the maximum supported timing misalignment is zero for the two carriers and it can be assumed that simultaneous TX of D2D and WAN is not supported with misaligned timing. To generalize this, it can be assumed that, for a given combination of two carriers, there is an upper bound and the UE can support simultaneous transmissions if the timing misalignment is not greater than the upper bound.
As an effort to minimize the related specification work, it can be the baseline to reuse the existing UE capability for the indication of D2D TX capability. In other words, a UE can transmit WAN in CC1 and CC2, it can transmit D2D in CC1 as long as the timing difference from the WAN TX in CC2 does not exceed the upper bound in the capability of the UE.
Proposal 4: As the baseline, it is assumed that a UE supports simultaneous TX of D2D on a carrier and WAN UL on another carrier if the two carriers belong to the supported band combination for WAN TX and the timing difference is less than the upper bound in its capability.

TABLE 7

| Feature | Description |
| --- | --- |
| D2DSSue_net (Feature A) | The UE can transmit and receive D2DSS in D2DSSue_net. |
| PD2DSCH (Feature B) | The UE can transmit and receive D2DSS in D2DSSue_oon and PD2DSCH. The feature A is the prerequisite. |
| D2D communication (Feature C) | The UE can transmit and receive SA and data using Mode 1 and Mode 2. |
| D2D discovery (FeatureD) | The UE can transmit and receive discovery messages. FFS whether further separation is necessary for Type 1 and Type 2B. |

TABLE 8

| Example case | Description |
| --- | --- |
| Case 1: Discovery without D2DSS | Feature D only. Inter-cell discovery can be supported by using neighboring cell's PSS/SSS/CRS. |
| Case 2: Discovery with D2DSS | Feature A + D. Inter-cell discovery based on D2DSS is supported. |
| Case 3: D2D communication without D2DSS | Feature C only. Inter-cell communication can be supported by using neighboring cell's PSS/SSS/CRS. |
| Case 4: D2D communication with D2DSS | Feature B + C (A is the prerequisite of B). Inter-cell communication based on D2DSS is supported. Communication outside network coverage is supported. |
| Case 5: Discovery and communication without D2DSS | Feature C + D. Inter-cell discovery and communication can be supported by using neighboring cell's PSS/SSS/CRS. |
| Case 6: Discovery and communication with D2DSS | Feature B + C + D (A is the prerequisite of B). Inter-cell discovery and communication based on D2DSS is supported. Communication outside network coverage is supported. |

Accordingly, controllability on a DL gap for UE-specific discovery is needed to minimize DL SF loss.

If it is assumed that an eNB controls a DL gap, it should be determined whether to configure a DL gap for a specific resource pool and/or a specific cell. A UE may not be interested in receiving a discovery signal transmitted in a pool having a specific usage index. It may also be impossible for the UE to receive a discovery signal transmitted from a specific neighbor cell due to the distance from the cell.

Therefore, regarding configuration of a DL gap, the eNB may control a DL gap configuration in a pool-specific/neighbor cell-specific manner according to the present disclosure.

A description will be given of a method for performing a DL WAN operation during a DL gap by a UE having a single RX chain. For example, if the reception timing of a PHICH belongs to a DL gap, the UE may assume the PHICH as an ACK and report it to its higher layer in order to prevent an unintended PUSCH retransmission.

Moreover, if a CSI reference resource (e.g., SF #n) related to CSI reporting belongs to the DL gap, the CSI reference resource may be replaced with a valid DL SF closest to SF #n before SF #n (, which is not located in the DL gap). In another example, in this case, the UE may be defined to report a predefined CSI value. An operation related to a discontinuous reception (DRX) counter may also be defined. For example, since the UE may receive a PDCCH in another serving cell (i.e., another aggregated carrier) in which a D2D discovery signal is not received, the UE may maintain (or perform) DRX counting even in the DL gap.

<Method #4>

If an INV_DL SF(S) is configured according to the afore-descried Method #1/Method #2/Method #3, it may be defined that the SRXCH_D2D RX UE conducts WAN communication according to at least a part (i.e., a part or all) of the following Example 4-1 to Example 4-3.

Example 4-1

For example, if an interference measurement resource (IMR) related to calculation/derivation of (periodic/aperiodic) CSI reported at a specific time instant resides in an INV_DL SF, the SRXCH_D2D RX UE may be configured to assume that the IMR is not valid. It may be configured that a CSI report is transmitted/calculated (re)using an IMR included in a non-INV_DL SF closest to the INV_DL SF before the INV_DL SF, the CSI report is omitted, or CSI of a predefined specific value (e.g., out-of-range (OOR)) is reported.

For example, if a CSI reference resource related to calculation/derivation of (periodic/aperiodic) CSI reported at a specific time instant resides in an INV_DL SF, the SRXCH_D2D RX UE may be configured to assume that the CSI reference resource is not valid. It may be configured that the CSI report is transmitted/calculated (re)using/(re)assuming, as a CSI reference resource, a DL SF which is at once a non-INVL_DL_SF closest to the INV_DL SF (or the earliest non-INV_DL SF) before the INV_DL SF and a valid DL SF, the CSI report is omitted, or CSI set to a predefined value (e.g., OOR) is reported.

For example, application of the afore-described Example 4-1 may be interpreted as meaning that an INV_DL SF is not used for CSI measurement. The CSI measurement means at least one of desired signal measurement and/or interference measurement. In another example, it may be configured that not a D2D signal reception but a WAN communication-related CSI measurement operation is performed in the INV_DL SF. In another example, the INV_DL SF may be configured not to be used for radio resource management (RRM) and/or radio link monitoring (RLM).

Example 4-2

If the afore-described Example 4-1 is applied, it may be configured that a CSI reference resource related to calculation of (periodic/aperiodic) CSI reported at a specific time instant is redetected only within a predefined or signaled time window (hereinafter, referred to as "WIN_SIZE"). As the time window is configured, excessive outdated CSI reporting may be reduced.

In a specific example, if SF #(R−4) being a CSI reference resource related to calculation/derivation of (periodic/aperiodic) CSI reported in SF #R is an INV_DL SF, a closest (or earliest) CSI reference resource before SF #(R−4), which is at once a non-INV_DL SF and a valid DL SF, is redetected only within an area ranging from 'SF #(R−4-1)' to 'SF #(R−4-WIN_SIZE)'.

In another example, it may be configured that a valid IMR related to calculation of (periodic/aperiodic) CSI reported at a specific time instant is redetected only within a predefined or signaled time window. For example, if SF #(R−5) having an IMR related to calculation/derivation of (periodic/aperiodic) CSI reported in SF #R is an INV_DL SF, a closest (or earliest) IMR before SF #(R−5), which satisfies the condition of an IMR located in a non-INV_DL SF, is redetected only within an area ranging from 'SF #(R−5-1)' to 'SF #(R−5-WIN_SIZE)' according to the foregoing configuration/assumption.

In the case where the above Example 4-2 is applied, if a valid CSI reference resource and/or a valid IMR does not exist or is not reselected in a re-search area based on a predefined or signaled time window, it may be configured that a corresponding CSI report is omitted or CSI set to a predefined specific value (e.g., OOR) is reported.

Example 4-3

For example, if D2D communication and dynamic switching for radio resources (i.e., "EIMTA MODE") are simultaneously configured for UE #Z having a single RX chain, and an SF related monitoring (or reception) of a dynamic switching indicator for radio resources (i.e., "EIMTA DCI") is configured as an INV_DL SF, UE #Z may be configured not to perform EIMTA DCI monitoring (or reception) in the INV_DL SF. In another example, UE #Z may be configured to perform EIMTA DCI monitoring (or reception), not D2D signal reception, in the INV_DL SF.

In another example, as noted from [Table 3], reception of a predefined specific WAN DL signal is prioritized over at least one of i) (serving cell/neighbor cell-related) D2D signal reception, ii) (serving cell/neighbor cell-related) discovery signal reception, or iii) reception of a (serving-cell/neighbor-cell) D2DSS(s) linked to a (serving-cell/neighbor-cell) D2D signal resource pool(s). The WAN DL signal may be defined as a paging signal (and/or an SIB).

In the case where this definition is applied, if a D2D UE should receive a paging signal (and/or SIB) (SF #N) during one of reception of a (neighbor-cell/serving-cell) discovery signal in a (neighbor-cell/serving-cell) D2D signal resource pool and reception of a (neighbor-cell/serving-cell) D2DSS linked to the (neighbor-cell/serving-cell) D2D signal resource pool, at least one of i) a configuration that the D2D UE does not perform a discovery signal reception operation in an SF(s) in the (neighbor-cell/serving-cell) D2D signal resource pool, overlapped in the time domain at least partially (i.e., partially or fully) with an area ranging from 'SF #N−1' to 'SF #N+1' (or 'SF #N'), and ii) a configuration that the D2D UE does not perform a D2DSS reception operation in a (neighbor-cell/serving-cell) D2DSS SF(s) (or a D2DSS resource), overlapped in the time domain at least partially (i.e., partially or fully) with the area ranging from 'SF #N−1' to 'SF #N+1' (or 'SF #N') may be applied.

For example, it may be configured that in 'SF #N' (or the area ranging from 'SF #N−1' to 'SF #N+1'), i) at least one of PHICH reception, EIMTA DCI reception, random access response reception, reception of message 4 (i.e., a contention resolution message) (in a contention-based random access procedure), and PHICH reception related to (re)transmission of message 3 (i.e., a PUSCH) (in the contention-based random access procedure) (which are not performed/valid in an INV_DL SF(s) due to application of Method #4) is performed, and/or ii) at least one of an IMR and a CSI reference resource in 'SF #N' (or the area ranging from 'SF #N−1' to 'SF #N+1') is assumed to be valid. It may be configured that this configuration is applied restrictively to an SRXCH_D2D RX UE.

In another example, it may be configured that in 'SF #N' (or the area ranging from 'SF #N−1' to 'SF #N+1'), i) PHICH reception, EIMTA DCI reception, random access response reception, reception of message 4 (i.e., a contention resolution message) (in a contention-based random access procedure), or PHICH reception related to (re)transmission of message 3 (i.e., a PUSCH) (in the contention-based random access procedure) is not allowed, and/or ii) an IMR and a CSI reference resource in 'SF #N' (or the area ranging from 'SF #N−1' to 'SF #N+1') is assumed to be invalid.

An example of a D2D UE capability/operation of simultaneously receiving a D2D signal (i.e., a UL spectrum)/WAN DL signal (i.e., a DL spectrum) under an FDD environment is illustrated in [Table 9].

TABLE 9

For communication, UE is able to receive simultaneously on the DL and UL spectrum of FDD carriers supporting D2D
For discovery, UE may not be able to receive simultaneously on the DL and UL spectrum of FDD carriers supporting D2D
Send LS to RAN2, RAN4, and SA2
  RAN2:
    To investigate impact on UE capability signaling of restriction on cellular operation when D2D is operated
    [Public safety UEs are assumed to be able to simultaneously perform cellular on DL carrier and D2D on associated UL carrier for FDD band]
    For discovery, non-public safety UE may not be able to receive simultaneously on the DL and UL spectrum of FDD carriers supporting D2D
    There is no simultaneous operation of CA and D2D required for Rel-12 D2D communication if we assume 2 DL CA capable UEs
  RAN4:
    RAN1 asks feasibility and implication of simultaneous reception of cellular on DL spectrum and D2D associated UL spectrum for FDD band
    RAN1 asks feasibility and implication of single receiver chain switching between cellular spectrum and D2D reception associated UL spectrum for FDD band
  SA2:
    [Public safety UEs are assumed to be able to simultaneously perform cellular on one carrier and D2D on another carrier]

<Method #5>

If at least a part (i.e., a part or all) of the following conditions are satisfied, an INV_DL SF(s) which is configured according to at least a part (i.e., a part or all) of the proposed methods (e.g., Method #1, Method #2, Method #3, and Method #4) may not be configured. Method #5 may be configured to be applied restrictively only when a D2D operation is performed in an FDD system environment (DL and UL spectrums of FDD carriers supporting D2D).

Example 5-1

For example, if a D2D UE is receiving a D2D communication signal and a D2D discovery signal simultaneously in the same (UL) carrier (or (UL) spectrum), an INV_DL SF(s) may not be configured. This is because the D2D UE already has or is equipped with a D2D receiver for receiving a D2D communication signal according to "For communication, RAN1 assumes that UE is able to receive simultaneously on the DL and UL spectrum of FDD carriers supporting D2D" in [Table 9].

In another example, in the case where the D2D UE is capable of signaling whether an INV_DL SF(s) needs to be configured, if the D2D UE signals that it is not necessary to configure an INV_DL SF(s), an INV_DL SF(s) may not be configured.

In another example, in the case where the D2D UE is capable of signaling whether a DL gap needs to be configured, if the D2D UE signals that it is not necessary to configure a DL gap, a DL gap may not be configured.

Example 5-2

For example, if a D2D UE is not capable of supporting D2DSS (TX/RX), a D2DSS-related INV_DL SF(s) which is configured based on at least one of the afore-described Method #1, Method #2, Method #3, and Method #4 may not be configured. If this UE capability is signaled or reported, an eNB/network may be configured to indicate whether a D2DSS-related INV_DL SF(s) is configured or not by a predefined signal (e.g., dedicated (RRC) signaling or an SIB).

Example 5-3

For example, i) if a measurement of a (neighbor-cell) D2DSS linked to a preset or signaled neighbor-cell discovery pool is equal to or smaller than a preset or signaled threshold (i.e., it is determined that a neighbor cell is remote from a serving cell/D2D RX UE), and/or ii) if a (modified) RSRP value (or (modified) RSRQ value) of the neighbor cell is equal to or smaller than a preset or signaled threshold (i.e., it is determined that the neighbor cell is remote from the serving cell (or the D2D RX UE)), a D2DSS-related INV_DL SF(s) (or a DL gap) and/or a discovery pool-related INV_DL SF(s) (or a DL gap) which is configured based on at least a part (i.e., a part or all) of the afore-described proposed methods (e.g., Method #1 and/or Method #2 and/or Method #3 and/or Method #4) may not be configured.

In another example, i) if the measurement of the (neighbor-cell) D2DSS linked to the preset or signaled neighbor-cell discovery pool is equal to or greater than the preset or signaled threshold, and/or ii) if the (modified) RSRP value (or (modified) RSRQ value) of the neighbor cell is equal to or greater than the preset or signaled threshold, a D2DSS-related INV_DL SF(s) (or a DL gap) and/or a discovery pool-related INV_DL SF(s) (or a DL gap) which is configured based on at least a part (i.e., a part or all) of the afore-described proposed methods (e.g., Method #1 and/or Method #2 and/or Method #3 and/or Method #4) may not be configured.

For example, if the D2D UE reports to the eNB at least one of i) information indicating whether the measurement of the (neighbor-cell) D2DSS linked to the preset or signaled neighbor-cell discovery pool is equal to or less than the preset or signaled threshold, ii) information indicating whether the measurement of the (neighbor-cell) D2DSS linked to the preset or signaled neighbor-cell discovery pool is equal to or greater than the preset or signaled threshold, iii) information about the measurement of the (neighbor-cell) D2DSS linked to the neighbor-cell discovery pool, iv) information indicating whether the (modified) RSRP value (or (modified) RSRQ value) of the neighbor cell is equal to or less than the preset or signaled threshold, v) information indicating whether the (modified) RSRP value (or (modified) RSRQ value) of the neighbor cell is equal to or greater than the preset or signaled threshold, or vi) information about the (modified) RSRP value (or (modified) RSRQ value) of the neighbor cell, the serving cell receiving the information may indicate whether a D2DSS-related INV_DL SF(s) (or a DL gap) and/or a discovery pool-related INV_DL SF(s) (or a DL gap) is configured by a predefined UE-specific or cell-specific signal (e.g., dedicated (RRC) signaling or an SIB).

In another example, the eNB (or serving cell) may indicate whether a D2DSS SF(s) and/or a discovery (pool) SF(s) of a (neighbor) cell(s) is configured as an INV_DL SF(S) (or a DL gap), UE-specifically/cell-specifically.

In another example of the proposed method, it may be defined that the UE configures the above-described INV_DL SF(S) (or DL gap) only in a DL CC (or DL cell) linked to/paired with a (discovery) pool with an intended usage index, or the eNB configures the above-described INV_DL SF(S) (or DL gap) only in a DL CC (or DL cell) linked to/paired with a (discovery) pool with a specific usage index (or a specific (discovery) pool).

In another example of the proposed method, it may be configured that an INV_DL SF(s) (or a DL gap) is not configured for a cell for which synchronization error information of w1 (related to reception of a discovery signal and/or a D2DSS (linked to a discovery pool) is signaled, and at least one of i) discovery, ii) discovery signal reception, and iii) reception of a D2DSS (linked to the discovery pool) is performed in a best effort manner.

In another example of the proposed method, it may be configured that an INV_DL SF(s) (or a DL gap) is configured for a cell for which synchronization error information of w1 (related to reception of a discovery signal and/or a D2DSS (linked to a discovery pool) is signaled, like (or in the same manner as for) a cell for which synchronization error information of w2 (related to reception of a discovery signal and/or a D2DSS (linked to a discovery pool) is signaled, while the resulting performance degradation is allowed.

For example, for the cell for which the synchronization error information of w/(related to reception of a discovery signal and/or a D2DSS (linked to a discovery pool) is signaled, it may be configured that i) a DL SF(s) overlapped in the time domain at least partially (i.e., partially or fully) with an area ranging from '(starting) SF−CEILING(w1)−1 of a neighbor-cell discovery pool' to '(ending) SF+CEILING(w1)+1 of the neighbor-cell discovery pool' is assumed to be an INV_DL SF(s) (or a DL gap), and/or ii) a DL SF(s) overlapped in the time domain at least partially (i.e., partially or fully) with an area ranging from 'SF #N−CEILING (w1)−1' to 'SF #N+CEILING(w1)+1' is assumed to be an INV_DL SF(s) (or a DL gap) (e.g., a neighbor-cell D2DSS resource is configured in SF #N of a serving cell), as described in Example 1-1 of Method #1.

On the other hand, for example, for the cell for which the synchronization error information of w2 (related to reception of a discovery signal and/or a D2DSS (linked to a discovery pool) is signaled, it may be configured that i) a DL SF(s) overlapped in the time domain at least partially (i.e., partially or fully) with an area ranging from 'starting SF−1 of a neighbor-cell discovery pool' to 'ending SF+1 of the neighbor-cell discovery pool' is assumed to be an INV_DL SF(s) (or a DL gap), and/or ii) a DL SF(s) overlapped in the time domain at least partially (i.e., partially or fully) with an area ranging from 'SF #N−1' to 'SF #N+1' is assumed to be an INV_DL SF(s) (or a DL gap) (e.g., a neighbor-cell D2DSS resource is configured in SF #N of a serving cell), as described in Example 1-1 of Method #1.

Now, a description will be given of methods for efficiently configuring the above-described INV_DL SF(s) (or DL gap(s)), in the case where a D2D RX UE having a single RX chain (hereinafter, referred to as an "SRXCH_D2D RX UE") or a D2D RX UE having a D2D/cellular shared RX chain (hereinafter, referred to as an "SHRXCH_D2D RX UE") performs i) a D2D discovery signal reception operation in another (UL) carrier in an inter-frequency, or ii) a D2D discovery signal reception in another PLMN (UL) carrier based on inter-PLMN. The SHRXCH_D2D RX UE (or SRXCH_D2D RX UE) may be interpreted as a UE that alternately uses or shares its (relatively small number of RX chains or a single) RX chain for D2D RX and WAN DL RX. The following proposed methods may be extended to configuration of a single cell as well as CA.

[Table 10] below illustrates a WAN DL signal reception operation (i.e., INV_DL SF(s) (or DL gap(s)) configuration) that an SHRXCH_D2D RX UE (or SRXCH_D2D RX UE) assumes when receiving a D2D discovery signal.

TABLE 10

For FDD carriers:
A UE with a shared D2D/cellular Rx chain (or a UE with a single Rx chain) and is receiving D2D discovery signals on an UL carrier is not expected to read DL signals on the DL carrier paired to such UL carrier during the subframes belonging to the D2D discovery pools on that UL carrier as well as one subframe preceding and following these subframes.

<Method #6>

If a UE (e.g., a D2D RX UE having a single RX chain) (or an SRXCH_D2D RX UE (e.g., a D2D RX UE having a shared D2D/cellular RX chain) performs i) a D2D discovery signal reception operation in another (UL) carrier in an inter-frequency, or ii) a D2D discovery signal reception in another PLMN (UL) carrier based on inter-PLMN, the afore-described INV_DL SF(s) (or DL gap(s)) may be defined based on at least a part (i.e., a part or all) of the following rules/configurations disclosed in Example 6-1 to Example 6-8. For example, the SHRXCH_D2D RX UE (or SRXCH_D2D RX UE) may be interpreted as a UE that alternately uses (or shares) its (relatively small number of RX chains or a single) RX chain for D2D RX and WAN DL RX. For example, the following proposed methods may be extended to configuration of a single cell as well as CA.

For the convenience of description of the proposed methods, it is assumed that an SHRXCH_D2D RX UE (or SRXCH_D2D RX UE) performs a D2D discovery signal reception in another (UL) carrier (or another PLMN (UL) carrier) in an inter-frequency (hereinafter, referred to as "DIFF_CC") in a situation where two cells (i.e., primary cell #A (i.e., DL CC #A, UL CC #A) and secondary cell #B (i.e., DL CC #B, UL CC #B) have been configured.

Further, another (UL) carrier in an inter-frequency may be designated as an inter-frequency UL CC from the viewpoint of UL CC #A (SCell #B (UL CC #B/DL CC #B)) of PCell #A, or as an inter-frequency UL CC from the viewpoint of UL CC #B (PCell #A (UL CC #A/DL CC #A)) of SCell #B.

For example, Method #6 may also be extended to a case in which a D2D discovery signal reception operation is performed in DIFF_CC, with three or more cells (or a single cell) configured.

Example 6-1

If an SHRXCH_D2D RX UE (or SRXCH_D2D RX UE) performs a D2D discovery signal reception in DIFF_CC, the SHRXCH_D2D RX UE may configure an INV_DL SF(s) (or DL gap(s)) in all DL CC(s) (e.g., DL CC #A and DL CC #B) configured for the SHRXCH_D2D RX UE (or SRXCH_D2D RX UE) by CA. Application of this configuration/rule may be interpreted as meaning that whether to configure an INV_DL SF(s) (or DL gap(s)) in a specific (serving cell-related) DL CC depends on not whether the specific (serving cell-related) DL CC and DIFF_CC are in a paired DL CC relationship but whether a D2D discovery signal is received in DIFF_CC.

Example 6-2

If the SHRXCH_D2D RX UE (or SRXCH_D2D RX UE) performs a D2D discovery signal reception in DIFF_CC, the SHRXCH_D2D RX UE may configure an INV_DL SF(s) (or DL gap(s)) only in a predefined or signaled serving cell-related DL CC(s) among DL CC(s) (or serving cell(s)) configured for the SHRXCH_D2D RX UE (or SRXCH_D2D RX UE) by CA.

Herein, it may be interpreted that i) (virtual) pairing is configured between a DL CC(s) in which an INV_DL SF(s) (or DL gap(s)) is configured and DIFF_CC, or ii) a DL CC(s) in which an INV_DL SF(s) (or DL gap(s)) is configured is (virtually) paired with DIFF_CC.

When the SHRXCH_D2D RX UE (or SRXCH_D2D RX UE) performs a D2D discovery signal reception in DIFF_CC, i) information about a DL CC(s) or ii) a serving cell(s) in which an INV_DL SF(s) (or DL gap(s)) is configured may be signaled/defined as a pair/combination of "information about a (UL) CC (or serving cell) in which a D2D discovery pool is configured" and "information about a DL CC(s) (or serving cell(s)) in which an INV_DL SF(s) (or DL gap(s)) is configured, when the D2D discovery signal reception is performed in the (UL) CC (or serving cell) in which the D2D discovery pool is configured".

Example 6-3

It may be defined that when the SHRXCH_D2D RX UE (or SRXCH_D2D RX UE) performs a D2D discovery signal reception operation in DIFF_CC, the SHRXCH_D2D RX UE (or SRXCH_D2D RX UE) configures an INV_DL SF(s) (or a DL gap(s)) only in a DL CC (e.g., DL CC #A) of a PCell from among a DL CC(s) configured for the SHRXCH_D2D RX UE (or SRXCH_D2D RX UE) by CA. Application of this method may be interpreted as meaning that whether an INV_DL SF(s) (or a DL gap(s)) is configured in a DL CC (e.g., DL CC #A) of a PCell is determined according to whether a D2D discovery signal reception operation is performed in DIFF_CC, not whether a D2D discovery signal reception operation is performed in a UL CC (e.g., UL CC #A) paired with the PCell.

Example 6-4

It may be defined that when the SHRXCH_D2D RX UE (or SRXCH_D2D RX UE) performs a D2D discovery signal reception operation in DIFF_CC, the SHRXCH_D2D RX UE (or SRXCH_D2D RX UE) configures an INV_DL SF(s) (or a DL gap(s)) only in a DL CC(s) (e.g., DL CC #B) of an SCell(s) except for a PCell from among a DL CC(s) configured for the SHRXCH_D2D RX UE (or SRXCH_D2D RX UE) by CA. Application of this method may be interpreted as meaning that whether an INV_DL SF(s) (or a DL gap(s)) is configured in a DL CC(s) (e.g., DL CC #B) of an SCell(s) is determined according to whether a D2D discovery signal reception operation is performed in DIFF_CC, not whether a D2D discovery signal reception operation is performed in a UL CC(s) (e.g., UL CC #B) paired with the SCell(s).

Example 6-5

If w1 is signaled as synchronization error information related to a discovery pool in DIFF_CC and/or reception of a D2DSS (linked to the discovery pool) in the foregoing examples (e.g., Example 6-1, Example 6-2, Example 6-3, and Example 6-4), i) a DL SF(s) of a DL CC(s) selected or indicated based on the above-described examples, which is overlapped in the time domain at least partially (i.e., partially or fully) with an area ranging from '(starting) SF−CEILING(w1)−1 of the DIFF_CC discovery pool' to '(ending) SF+CEILING(w1)+1 of the DIFF_CC discovery pool' is assumed to be an INV_DL SF(s) (or DL gap), and/or ii) a DL SF(s) of the DL CC(s) selected or indicated based on the above-described examples, which is overlapped in the time domain at least partially (i.e., partially or fully) with an area ranging from 'SF #N−CEILING(w1)−1' to 'SF #N+CEILING(w1)+1' is assumed to be an INV_DL SF(s) (or a DL gap) (i.e., a DIFF_CC D2DSS resource is configured in serving-cell SF #N). It may be defined that this configuration/rule is applied restrictively to a case in which DIFF_CC is for a neighbor cell (and/or serving-cell) and/or another PLMN (UL) carrier).

In another example, if w2 is signaled as synchronization error information related to a discovery pool in DIFF_CC (and/or reception of a D2DSS linked to the discovery pool), i) a DL SF(s) of a DL CC(s) selected or indicated based on the above-described examples, which is overlapped in the time domain at least partially (i.e., partially or fully) with an area ranging from '(starting) SF−1' of the DIFF_CC discovery pool' to '(ending) SF+1 of the DIFF_CC discovery pool' is assumed to be an INV_DL SF(s) (or a DL gap) is assumed to be an INV_DL SF(s) (or a DL gap), and/or ii) a DL SF(s) of the DL CC(s) selected or indicated based on the above-described examples, which is overlapped in the time domain at least partially (i.e., partially or fully) with an area ranging from 'SF #N−1' to 'SF #N+1' is assumed to be an INV_DL SF(s) (or a DL gap) (i.e., a DIFF CC D2DSS resource is configured in serving-cell SF #N). It may be defined that this configuration/rule is applied restrictively to a case in which DIFF_CC is for a neighbor cell (and/or serving-cell) and/or another PLMN (UL) carrier)).

Example 6-6

In the foregoing examples (e.g., Example 6-1, Example 6-2, Example 6-3, and Example 6-4), i) a DL SF(s) of a DL CC(s) selected or indicated based on the above-described examples, which is overlapped in the time domain at least partially (i.e., partially or fully) with an area ranging from '(starting) SF−1' of the DIFF_CC discovery pool' to '(ending) SF+1 of the DIFF_CC discovery pool' is assumed to be an INV_DL SF(s) (or a DL gap), and/or ii) a DL SF(s) of the DL CC(s) selected or indicated based on the above-described examples, which is overlapped in the time domain at least partially (i.e., partially or fully) with an area ranging from 'SF #N−1' to 'SF #N+1' is assumed to be an INV_DL SF(s) (or a DL gap) (i.e., a DIFF_CC D2DSS resource is configured in serving-cell SF #N). It may be defined that this configuration/rule is applied restrictively to a case in which DIFF_CC is for a serving cell (and/or neighbor-cell) and/or another PLMN (UL) carrier)).

Example 6-7

A serving eNB/D2D UE may be configured to indicate to a (another) D2D UE by a predefined signal (e.g., an SIB, a (dedicated) RRC signal, or a PD2DSCH), at least one of i) information indicating whether (a part or all of) the above-described example(s) (e.g., Example 6-1, Example 6-2, Example 6-3, Example 6-4, Example 6-5, and Example 6-6)

is applied, ii) information indicating which one(s) of the foregoing examples is applied to which (serving) cell, iii) information indicating whether an INV_DL SF(s) (or a DL gap(s)) is configured due to a D2D discovery signal reception operation in another (UL) carrier in an inter-frequency, or iv) information indicating whether an INV_DL SF(s) (or a DL gap(s)) is configured due to a D2D discovery signal reception operation in another PLMN (UL) carrier, or the at least one piece of information may be preset.

In another example, the above-described example(s) (e.g., Example 6-1, Example 6-2, Example 6-3, Example 6-4, Example 6-5, and Example 6-6) may be extended to a case in which an SHRXCH_D2D RX UE (or SRXCH_D2D RX UE) performs a D2D communication signal (e.g., SA or D2D data) reception operation in DIFF_CC.

In another example, if there is a DL CC paired with DIFF_CC in the above-described example(s) (e.g., Example 6-1, Example 6-2, Example 6-3, Example 6-4, Example 6-5, and Example 6-6) (e.g., a D2D discovery signal reception operation is performed in another (UL) carrier of an inter-frequency), and the SHRXCH_D2D RX UE (or SRXCH_D2D RX UE) performs a D2D discovery signal reception operation in DIFF_CC, an INV_DL SF( ) (or a DL gap(s)) (based on the afore-described rule) may be configured i) always or ii) only when configuration of an INV_DL SF( ) (or a DL gap(s)) is enabled.

Example 6-8

Information about an INV_DL SF( ) (or a DL gap(s)) configured when the SHRXCH_D2D RX UE (or SRXCH_D2D RX UE) performs a D2D discovery signal reception operation in DIFF_CC may be indicated or signaled in the form of a bitmap. The serving eNB (or D2D UE) may indicate information about a (serving) cell to which the information is to be actually applied by an additional signal (e.g., an SIB, a (dedicated) RRC signal, or a PD2DSCH), or the information may be set based on a preset rule or at least a part (i.e., a part or all of) of the above-described (predefined or signaled) rules (e.g., Example 6-1, Example 6-2, Example 6-3, Example 6-4, Example 6-5, and Example 6-6).

<Method #7>

If an INV_DL SF(s) (or a DL gap(s)) is configured according to at least a part (i.e., a part or all of) of the above-described methods (e.g., Method #1, Method #2, Method #3, Method #4, and Method #5), a DRX operation may be performed according to at least a part (i.e., a part or all of) of the following configurations.

Before a detailed description of the present disclosure, a legacy (UE) DRX configuration/operation is performed as illustrated in [Table 11], [Table 12](Discontinuous Reception (DRX)), [Table 13] and [Table 14].

TABLE 11

The UE may be configured by RRC with a DRX functionality that controls the UE's PDCCH monitoring activity for the UE's C-RNTI, TPC-PUCCH-RNTI, TPC-PUSCH-RNTI, Semi-Persistent Scheduling C-RNTI (if configured) and eIMTA-RNTI (if configured). When in RRC_CONNECTED, if DRX is configured, the UE is allowed to monitor the PDCCH discontinuously using the DRX operation specified in this subclause [1]; otherwise the UE monitors the PDCCH continuously. When using DRX operation, the UE shall also monitor PDCCH according to requirements found in other subclauses of this specification [1]. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined (see subclause 7.7).
When a DRX cycle is configured, the Active Time includes the time while:
onDurationTimer or drx-InactivityTimer or drx-RetransmissionTimer or mac-ContentionResolutionTimer (as described in subclause 5.1.5 [1]) is running; or
a Scheduling Request is sent on PUCCH and is pending (as described in subclause 5.4.4 [1]); or
an uplink grant for a pending HARQ retransmission can occur and there is data in the corresponding HARQ buffer; or
a PDCCH indicating a new transmission addressed to the C-RNTI of the UE has not been received after successful reception of a Random Access Response for the preamble not selected by the UE (as described in subclause 5.1.4 [1]).
When DRX is configured, the UE shall for each subframe:
if a HARQ RTT Timer expires in this subframe and the data of the corresponding HARQ process was not successfully decoded:
1. start the drx-RetransmissionTimer for the corresponding HARQ process.
if a DRX Command MAC control element or a Long DRX Command MAC control element is received:
2. stop onDurationTimer;
3. stop drx-InactivityTimer.
if drx-InactivityTimer expires or a DRX Command MAC control element is received in this subframe:
4. if the Short DRX cycle is configured:
start or restart drxShortCycleTimer;
use the Short DRX Cycle.
5. else:
use the Long DRX cycle.
if drxShortCycleTimer expires in this subframe:
6. use the Long DRX cycle.
if a Long DRX Command MAC control element is received:
7. stop drxShortCycleTimer;
8. use the Long DRX cycle.
If the Short DRX Cycle is used and [(SFN * 10) + subframe number] modulo (shortDRX-Cycle) = (drxStartOffset) modulo (shortDRX-Cycle); or
if the Long DRX Cycle is used and [(SFN * 10) + subframe number] modulo (longDRX-Cycle) = drxStartOffset:

TABLE 11-continued 9. start onDurationTimer.
during the Active Time, for a PDCCH-subframe, if the subframe is not required for
uplink transmission for half-duplex FDD UE operation, if the subframe is not a half-duplex
guard subframe [5] and if the subframe is not part of a configured measurement gap; or
during the Active Time, for a subframe other than a PDCCH-subframe and for a UE
capable of simultaneous reception and transmission in the aggregated cells, if the subframe is
a downlink subframe indicated by a valid eIMTA L1 signalling for at least one serving cell
not configured with schedulingCellId [3] and if the subframe is not part of a configured
measurement gap; or
during the Active Time, for a subframe other than a PDCCH-subframe and for a UE
not capable of simultaneous reception and transmission in the aggregated cells, if the
subframe is a downlink subframe indicated by a valid eIMTA L1 signalling for the PCell and
if the subframe is not part of a configured measurement gap:
10. monitor the PDCCH;
11. if the PDCCH indicates a DL transmission or if a DL assignment has been
configured for this subframe:
start the HARQ RTT Timer for the corresponding HARQ process;
stop the drx-RetransmissionTimer for the corresponding HARQ process.
12. if the PDCCH indicates a new transmission (DL or UL):
start or restart drx-InactivityTimer.
in current subframe n, if the UE would not be in Active Time considering
grants/assignments/DRX Command MAC control elements received and Scheduling Request
sent until and including subframe n-5 when evaluating all DRX Active Time conditions as
specified in this subclause, type-0-triggered SRS [2] shall not be reported.
if CQI masking (cqi-Mask) is setup by upper layers:
13. in current subframe n, if onDurationTimer would not be running considering
grants/assignments/DRX Command MAC control elements received until and including
subframe n-5 when evaluating all DRX Active Time conditions as specified in this subclause,
CQI/PMI/RI/PTI on PUCCH shall not be reported.
else:
14. in current subframe n, if the UE would not be in Active Time considering
grants/assignments/DRX Command MAC control elements received and Scheduling Request
sent until and including subframe n-5 when evaluating all DRX Active Time conditions as
specified in this subclause, CQI/PMI/RI/PTI on PUCCH shall not be reported.
Regardless of whether the UE is monitoring PDCCH or not, the UE receives and transmits
HARQ feedback and transmits type-1-triggered SRS [2] when such is expected.
[NOTE]: The same active time applies to all activated serving cell(s).
[NOTE]: In case of downlink spatial multiplexing, if a TB is received while the HARQ
RTT Timer is running and the previous transmission of the same TB was received at least N
subframes before the current subframe (where N corresponds to the HARQ RTT Timer), the
UE should process it and restart the HARQ RTT Timer.
MAC-MainConfig [3]
The IE MAC-MainConfig is used to specify the MAC main configuration for signaling and
data radio bearers.
[01] MAC-MainConfig information element
-- ASN1START
MAC-MainConfig ::=                          SEQUENCE {
   ul-SCH-Config                             SEQUENCE {
      maxHARQ-Tx                              ENUMERATED
{
                                                                                     n1,
n2, n3, n4, n5, n6, n7, n8,
   n10, n12, n16, n20, n24, n28,
   spare2, spare 1}          OPTIONAL, --Need ON
      periodicBSR-Timer                      ENUMERATED {
                                                                                     sf5,
sf10, sf16, sf20, sf32, sf40, sf64, sf80,
   sf128, sf160, sf320, sf640, sf1280, sf2560,
   infinity, spare 1}     OPTIONAL, --Need ON
      retxBSR-Timer                          ENUMERATED
{
   sf320, sf640, sf1280, sf2560, sf5120,
   sf10240, spare2, spare1},
      ttiBundling                                                              BOOLEAN
}
                          OPTIONAL, --Need ON
   drx-Config                                DRX-Config
                   OPTIONAL, --Need ON
   timeAlignmentTimerDedicated               TimeAlignmentTimer,
   phr-Config                                CHOICE {
      release                                                                 NULL,
      setup                                                                   SEQUENCE {
         periodicPHR-Timer                                                    ENUMERATED
{sf10, sf20, sf50, sf100, sf200,
      sf500, sf1000, infinity},
         prohibitPHR-Timer                                                    ENUMERATED
{sf0, sf10, sf20, sf50, sf100,
      sf200, sf500, sf1000}, TABLE 11-continued

```
        dl-PathlossChange                           ENUMERATED
{dB1, dB3, dB6, infinity}
        }
    }
                    OPTIONAL, --Need ON
    ...,
    [[ sr-ProhibitTimer-r9                          INTEGER (0..7)
        OPTIONAL --Need ON
    ]],
    [[ mac-MainConfig-v1020                         SEQUENCE {
        sCellDeactivationTimer-r10                  ENUMERATED {
rf2, rf4, rf8, rf16, rf32, rf64, rf128,
spare}        OPTIONAL, --Need OP
            extendedBSR-Sizes-r10                   ENUMERATED
{setup}   OPTIONAL, --Need OR
            extendedPHR-r10
    ENUMERATED {setup}     OPTIONAL --Need OR
        }
                    OPTIONAL --Need ON
    ]],
    [[   stag-ToReleaseList-r11                     STAG-ToReleaseList-r11
    OPTIONAL, --Need ON
            stag-ToAddModList-r11                   STAG-ToAddModList-
r11 OPTIONAL, --Need ON
            drx-Config-v1130                        DRX-Config-v1130
    OPTIONAL -- Cond DRX
    ]]
}
MAC-MainConfigSCell-r11 ::=                         SEQUENCE {
    stag-Id-r11                                     STAG-Id-r11
    OPTIONAL, --Need OP
    ...
}
DRX-Config ::=                                      CHOICE {
    release                                             NULL,
    setup                                               SEQUENCE {
        onDurationTimer                                     ENUMERATED
{
 psf1, psf2, psf3, psf4, psf5, psf6,
 psf8, psf10, psf20, psf30, psf40,
 psf50, psf60, psf80, psf100,
 psf200},
        drx-InactivityTimer                             ENUMERATED {
 psf1, psf2, psf3, psf4, psf5, psf6,
 psf8, psf10, psf20, psf30, psf40,
 psf50, psf60, psf80, psf100,
 psf200, psf300, psf500, psf750,
 psf1280, psf1920, psf2560, psf0-v1020,
 spare9, spare8, spare7, spare6,
 spare5, spare4, spare3, spare2,
 spare1},
        drx-RetransmissionTimer                         ENUMERATED {
 psf1, psf2, psf4, psf6, psf8, psf16,
 psf24, psf33},
        longDRX-CycleStartOffset                        CHOICE {
            sf10                                            INTEGER(0..9),
            sf20                                            INTEGER(0..19),
            sf32                                            INTEGER(0..31),
            sf40                                            INTEGER(0..39),
            sf64                                            INTEGER(0..63),
            sf80                                            INTEGER(0..79),
            sf128                                           INTEGER(0..127),
            sf160                                           INTEGER(0..159),
            sf256                                           INTEGER(0..255),
            sf320                                           INTEGER(0..319),
            sf512                                           INTEGER(0..511),
            sf640                                           INTEGER(0..639),
            sf1024
INTEGER(0..1023),
            sf1280
INTEGER(0..1279),
            sf2048
INTEGER(0..2047),
            sf2560
INTEGER(0..2559)
        },
        shortDRX                                        SEQUENCE {
            shortDRX-Cycle
ENUMERATED {
sf2, sf5, sf8, sf10, sf16, sf20,
```

TABLE 11-continued

```
    sf32, sf40, sf64, sf80, sf128, sf160,
    sf256, sf320, sf512, sf640},
        drxShortCycleTimer                              INTEGER (1..16)
    }            OPTIONAL
                            -- Need OR
  }
}
DRX-Config-v1130 ::=                                    SEQUENCE {
  drx-RetransmissionTimer-v1130                         ENUMERATED {psf0-v1130}
  OPTIONAL, --Need OR
  longDRX-CycleStartOffset-v1130                        CHOICE {
    sf60-v1130
  INTEGER(0..59),
    sf70-v1130
  INTEGER(0..69)
  }
                                          OPTIONAL, --Need OR
  shortDRX-Cycle-v1130                                  ENUMERATED
  {sf4-v1130} OPTIONAL --Need OR
}
STAG-ToReleaseList-r11 ::= SEQUENCE (SIZE (1..maxSTAG-r11)) OF STAG-Id-r11
STAG-ToAddModList-r11 ::=           SEQUENCE (SIZE (1..maxSTAG-r11)) OF STAG-
ToAddMod-r11
STAG-ToAddMod-r11 ::=               SEQUENCE {
    stag-Id-r11                             STAG-Id-r11,
    timeAlignmentTimerSTAG-r11              TimeAlignmentTimer,
    ...
}
STAG-Id-r11:=                       INTEGER (1..maxSTAG-r11)
-- ASN1STOP
```

TABLE 12

Abbreviations [1]

Active Time
Time related to DRX operation, during which the UE monitors the PDCCH in PDCCH-
subframes.
DRX Cycle
Specifies the periodic repetition of the On Duration followed by a possible period of
inactivity.
drx-InactivityTimer
Specifies the number of consecutive PDCCH-subframe(s) after successfully decoding a
PDCCH indicating an initial UL or DL user data transmission for this UE.
drx-RetransmissionTimer
Specifies the maximum number of consecutive PDCCH-subframe(s) for as soon as a DL
retransmission is expected by the UE.
drxShortCycleTimer
Specifies the number of consecutive subframe(s) the UE shall follow the Short DRX cycle.
drxStartOffset
Specifies the subframe where the DRX Cycle starts.
HARQ RTT Timer
This parameter specifies the minimum amount of subframe(s) before a DL HARQ
retransmission is expected by the UE.
onDurationTimer
Specifies the number of consecutive PDCCH-subframe(s) at the beginning of a DRX
Cycle.
PDCCH-subframe
Refers to a subframe with PDCCH or, for an RN with R-PDCCH configured and not
suspended, to a subframe with R-PDCCH. For FDD UE operation, this represents any
subframe; for TDD, only downlink subframes and subframes including DwPTS. For RNs
with an RN subframe configuration configured and not suspended, in its communication
with the E-UTRAN, this represents all downlink subframes configured for RN
communication with the E-UTRAN.
HARQ RTT Timer
For FDD the HARQ RTT Timer is set to 8 subframes. For TDD the HARQ RTT Timer is
set to (k + 4) subframes, where k is the interval between the downlink transmission and the
transmission of associated HARQ feedback, as indicated in Table 10.1.3.1-1 of [2].

TABLE 13

| MAC-MainConfig field descriptions [3] |
| --- | dl-PathlossChange
DL Pathloss Change and the change of the required power backoff due to power
management (as allowed by P-MPRc [4]) for PHR reporting in TS 36.321 [1]. Value in
dB. Value dB1 corresponds to 1 dB, dB3 corresponds to 3 dB and so on. The same value
applies for each serving cell (although the associated functionality is performed
independently for each cell).
drx-Config
Used to configure DRX as specified in TS 36.321 [1]. E-UTRAN configures the values
in DRX-Config-v1130 only if the UE indicates support for IDC indication.
drx-InactivityTimer
Timer for DRX in TS 36.321 [1], Value in number of PDCCH sub-frames. Value psf1
corresponds to 1 PDCCH sub-frame, psf2 corresponds to 2 PDCCH sub-frames and so
on.
drx-RetransmissionTimer
Timer for DRX in TS 36.321 [1], Value in number of PDCCH sub-frames. Value psf1
corresponds to 1 PDCCH sub-frame, psf2 corresponds to 2 PDCCH sub-frames and so
on. In case drx-RetransmissionTimer-v1130 is signalled, the UE shall ignore drx-
RetransmissionTimer (i.e. without suffix).
drxShortCycleTimer
Timer for DRX in TS 36.321 [1], Value in multiples of shortDRX-Cycle. A value of 1
corresponds to shortDRX-Cycle, a value of 2 corresponds to 2 * shortDRX-Cycle and so
on.
extendedBSR-Sizes
If value setup is configured, the BSR index indicates extended BSR size levels as defined
in TS 36.321 [1, Table 6.1.3.1-2].
extendedPHR
Indicates if power headroom shall be reported using the Extended Power Headroom
Report MAC control element defined in TS 36.321 [1] (value setup). Otherwise the
power headroom shall be reported using the Power Headroom Report MAC control
element defined in TS 36.321 [1]. E-UTRAN always configures the value setup if more
than one Serving Cell with uplink is configured.
longDRX-CycleStartOffset
longDRX-Cycle and drxStartOffset in TS 36.321 [1]. The value of longDRX-Cycle is in
number of sub-frames. Value sf10 corresponds to 10 sub-frames, sf20 corresponds to 20
sub-frames and so on. If shortDRX-Cycle is configured, the value of longDRX-Cycle
shall be a multiple of the shortDRX-Cycle value. The value of drxStartOffset value is in
number of sub-frames. In case longDRX-CycleStartOffset-v1130 is signalled, the UE
shall ignore longDRX-CycleStartOffset (i.e. without suffix).
maxHARQ-Tx
Maximum number of transmissions for UL HARQ in TS 36.321 [1].
onDurationTimer
Timer for DRX in TS 36.321 [1], Value in number of PDCCH sub-frames. Value psf1
corresponds to 1 PDCCH sub-frame, psf2 corresponds to 2 PDCCH sub-frames and so
on.
periodicBSR-Timer
Timer for BSR reporting in TS 36.321 [1]. Value in number of sub-frames. Value sf10
corresponds to 10 sub-frames, sf20 corresponds to 20 sub-frames and so on.
periodicPHR-Timer
Timer for PHR reporting in TS 36.321 [1]. Value in number of sub-frames. Value sf10
corresponds to 10 subframes, sf20 corresponds to 20 subframes and so on.
prohibitPHR-Timer
Timer for PHR reporting in TS 36.321 [1]. Value in number of sub-frames. Value sf0
corresponds to 0 subframes, sf100 corresponds to 100 subframes and so on.
retxBSR-Timer
Timer for BSR reporting in TS 36.321 [1]. Value in number of sub-frames. Value sf640
corresponds to 640 sub-frames, sf1280 corresponds to 1280 sub-frames and so on.
sCellDeactivationTimer
SCell deactivation timer in TS 36.321 [1], Value in number of radio frames. Value rf4
corresponds to 4 radio frames, value rf8 corresponds to 8 radio frames and so on. E-
UTRAN only configures the field if the UE is configured with one or more SCells. If the
field is absent, the UE shall delete any existing value for this field and assume the value
to be set to infinity. The same value applies for each SCell (although the associated
functionality is performed independently for each SCell).
shortDRX-Cycle
Short DRX cycle in TS 36.321 [1], Value in number of sub-frames. Value sf2
corresponds to 2 sub-frames, sf5 corresponds to 5 subframes and so on. In case
shortDRX-Cycle-v1130 is signalled, the UE shall ignore shortDRX-Cycle (i.e. without
suffix).
sr-ProhibitTimer
Timer for SR transmission on PUCCH in TS 36.321 [1]. Value in number of SR
period(s). Value 0 means no timer for SR transmission on PUCCH is configured. Value 1
corresponds to one SR period, Value 2 corresponds to 2*SR periods and so on. SR
period is defined in TS 36.213 [2, table 10.1.5-1].
stag-Id

TABLE 13-continued

MAC-MainConfig field descriptions [3]

Indicates the TAG of an SCell, see TS 36.321 [1]. If the field is not configured for an SCell (e.g. absent in MAC-MainConfigSCell), the SCell is part of the PTAG.
stag-ToAddModList, stag-ToReleaseList
Used to configure one or more STAGs. E-UTRAN ensures that a STAG contains at least one SCell with configured uplink. If, due to SCell release a reconfiguration would result in an 'empty' TAG, E-UTRAN includes release of the concerned TAG.
timeAlignmentTimerSTAG
Indicates the value of the time alignment timer for an STAG, see TS 36.321 [1].
ttiBundling
TRUE indicates that TTI bundling TS 36.321 [1] is enabled while FALSE indicates that TTI bundling is disabled. TTI bundling can be enabled for FDD and for TDD only for configurations 0, 1 and 6. For TDD, E-UTRAN does not simultaneously enable TTI bundling and semi-persistent scheduling in this release of specification. Furthermore, E-UTRAN does not simultaneously configure TTI bundling and SCells with configured uplink.

TABLE 14

| Conditional presence | Explanation |
|---|---|
| DRX | The field is optionally present, need ON, if drx-Config is present. Otherwise the field is not present and the UE takes no action i.e. continues to use the existing value, if previously configured. |

Herein, DRX configurations for individual UEs may be set UE-specifically depending on whether a serving cell has DL data (to be transmitted) for each UE. Further, Method #7 may be applied restrictively to an SRXCH_D2D RX UE. Also, Method #7 may be applied restrictively to a case in which an RRC_CONNECTED UE (or RRC_IDLE UE) performs a DRX operation. Further, Method #7 may be applied restrictively to a case in which CA is applied (and/or a case in which CA is not applied).

Example 7-1

It may be configured that predefined or signaled DRX operation-related specific timers (e.g., onDurationTimer, drx-InactivityTimer, and drx-RetransmissionTimer) do not count an INV_DL SF(s) configured based on at least a part (i.e., a part or all) of the afore-described proposed methods (e.g., Method #1, Method #2, Method #3, Method #4, and Method #5). Herein, the INV_DL SF(S) may be interpreted as a kind of measurement gap (i.e., [Table 9]) that the DRX operation-related specific timers do not count in a legacy operation, or may be interpreted as an SF(s) other than a PDCCH SF(s) (refer to [Table 9]).

Example 7-2

It may be configured that predefined or signaled DRX operation-related specific timers (e.g., onDurationTimer, drx-InactivityTimer, and drx-RetransmissionTimer) count an INV_DL SF(s) configured based on at least a part (i.e., a part or all) of the afore-described proposed methods (e.g., Method #1, Method #2, Method #3, Method #4, and Method #5). If this method is applied, the INV_DL SF(S) may be interpreted as an SF(s) in which PDCCH monitoring is not actually performed but which the predefined or signaled DRX operation-related specific timers count.

Example 7-3

Predefined or signaled DRX operation-related specific timers (e.g., onDurationTimer, drx-InactivityTimer, and drx-RetransmissionTimer) may count in different manners for CA and for non-CA.

For example, it is assumed for the convenience of description that two cells (e.g., [CELL #1]: DL CC #A, UL CC #A, [CELL #2]: DL CC #B, UL CC #B) are configured by CA, and a D2D signal (e.g., (serving/neighbor) discovery signal) reception operation is configured/performed only in UL CC #A of CELL #1. In this situation, the predefined or signaled DRX operation-related specific timers may be configured to count an INV_DL SF(s) configured based on the above-descried at least part (i.e., part or all) of the methods. This is because a WAN DL signal reception operation is not performed only in DL CC #A (paired with UL CC #A) due to a D2D signal reception operation in UL CC #A of CELL #1 (refer to [Table 3]), but a WAN DL signal reception operation is still possible in DL CC #B of CELL #2, and a DRX operation is commonly applied/performed irrespective of cells.

On the other hand, in another example, if CA is not applied, the predefined or signaled DRX operation-related specific timers may be configured not to count an INV_DL SF(s) configured based on the above-described at least part (i.e., part or all) of the methods. This is because if CA is not applied, there are no other cells in which a WAN DL signal reception operation can be performed in the INV_DL SF(s).

In another example, if CA is applied, the predefined or signaled DRX operation-related specific timers may be configured not to count an INV_DL SF(s) configured based on the above-described at least part (i.e., part or all) of the methods, whereas if CA is not applied, the predefined or signaled DRX operation-related specific timers may be configured to count an INV_DL SF(s) configured based on the above-described at least part (i.e., part or all) of the methods.

Method #8

The above-described INV_DL SF(s) (or DL gap(s)) may be configured according to at least a part (i.e., a part or all) of rules disclosed in at least one of the following Example 8-1 to Example 8-3.

Before a detailed description of this method, an example of a legacy (UE) random access procedure is illustrated in [Table 15], [Table 16](TPC Command $\delta_{msg2}$ for Scheduled PUSCH) and [Table 17].

TABLE 15

6.1 Random access procedure [2]

Prior to initiation of the non-synchronized physical random access procedure, Layer 1 shall receive the following information from the higher layers:
1. Random access channel parameters (PRACH configuration and frequency position)
2. Parameters for determining the root sequences and their cyclic shifts in the preamble sequence set for the primary cell (index to logical root sequence table, cyclic shift ($N_{CS}$), and set type (unrestricted or restricted set))
6.1 Physical non-synchronized random access procedure From the physical layer perspective, the L1 random access procedure encompasses the transmission of random access preamble and random access response. The remaining messages are scheduled for transmission by the higher layer on the shared data channel and are not considered part of the L1 random access procedure. A random access channel occupies 6 resource blocks in a subframe or set of consecutive subframes reserved for random access preamble transmissions. The eNodeB is not prohibited from scheduling data in the resource blocks reserved for random access channel preamble transmission.
The following steps are required for the L1 random access procedure:
1. Layer 1 procedure is triggered upon request of a preamble transmission by higher layers.
2. A preamble index, a target preamble received power (PREAMBLE_RECEIVED_TARGET_POWER), a corresponding RA-RNTI and a PRACH resource are indicated by higher layers as part of the request.
3. A preamble transmission power $P_{PRACH}$ is determined as $P_{PRACH} = \min\{ P_{CMAX,c}^{(i)}, \text{PREAMBLE\_RECEIVED\_TARGET\_POWER} + PL_c \}\_[\text{dBm}]$, where $P_{CMAX,c}^{(i)}$ is the configured UE transmit power defined in [4] for subframe i of serving cell $c$ and $PL_c$ is the downlink pathloss estimate calculated in the UE for serving cell $c$.
4. A preamble sequence is selected from the preamble sequence set using the preamble index.
5. A single preamble is transmitted using the selected preamble sequence with transmission power $P_{PRACH}$ on the indicated PRACH resource.
6. Detection of a PDCCH with the indicated RA-RNTI is attempted during a window controlled by higher layers (see [1], subclause 5.1.4). If detected, the corresponding DL-SCH transport block is passed to higher layers. The higher layers parse the transport block and indicate the 20-bit uplink grant to the physical layer, which is processed according to subclause 6.2.
6.1.1 Timing For the L1 random access procedure, UE's uplink transmission timing after a random access preamble transmission is as follows.
a) If a PDCCH with associated RA-RNTI is detected in subframe n, and the corresponding DL-SCH transport block contains a response to the transmitted preamble sequence, the UE shall, according to the information in the response, transmit an UL-SCH transport block in the first subframe $n + k_1$, $k_1 \geq 6$, if the UL delay field in subclause 6.2 is set to zero where $n + k_1$ is the first available UL subframe for PUSCH transmission, where for TDD serving cell, the first UL subframe for PUSCH transmission is determined based on the UL/DL configuration (i.e., the parameter subframeAssignment) indicated by higher layers. The UE shall postpone the PUSCH transmission to the next available UL subframe after $n + k_1$ if the field is set to 1.
b) If a random access response is received in subframe n, and the corresponding DL-SCH transport block does not contain a response to the transmitted preamble sequence, the UE shall, if requested by higher layers, be ready to transmit a new preamble sequence no later than in subframe n + 5.
c) If no random access response is received in subframe n, where subframe n is the last subframe of the random access response window, the UE shall, if requested by higher layers, be ready to transmit a new preamble sequence no later than in subframe n + 4.
In case a random access procedure is initiated by a "PDCCH order" in subframe n, the UE shall, if requested by higher layers, transmit random access preamble in the first subframe $n + k_2$, $k_2 \geq 6$, where a PRACH resource is available.
If a UE is configured with multiple TAGs, and if the UE is configured with the carrier indicator field for a given serving cell, the UE shall use the carrier indicator field value from the detected "PDCCH order" to determine the serving cell for the corresponding random access preamble transmission.
6.2 Random Access Response Grant The higher layers indicate the 20-bit UL Grant to the physical layer, as defined in 3GPP TS 36.321 [1].
This is referred to the Random Access Response Grant in the physical layer.
The content of these 20 bits starting with the MSB and ending with the LSB are as follows:
Hopping flag-1 bit
Fixed size resource block assignment-10 bits
Truncated modulation and coding scheme-4 bits
TPC command for scheduled PUSCH-3 bits
UL delay-1 bit
CSI request-1 bit
The UE shall use the single-antenna port uplink transmission scheme for the PUSCH transmission corresponding to the Random Access Response Grant and the PUSCH retransmission for the same transport block.

TABLE 15-continued

The UE shall perform PUSCH frequency hopping if the single bit frequency hopping
(FH) field in a corresponding Random Access Response Grant is set as 1 and the uplink
resource block assignment is type 0, otherwise no PUSCH frequency hopping is performed.
When the hopping flag is set, the UE shall perform PUSCH hopping as indicated via the
fixed size resource block assignment detailed below.
The fixed size resource block assignment field is interpreted as follows:
if $N_{RB}^{UL} \leq 44$
Truncate the fixed size resource block assignment to its b least significant bits, where
$b = \lceil \log_2(N_{RB}^{UL} \cdot (N_{RB}^{UL} + 1)/2) \rceil$, and interpret the truncated resource block assignment
according to the rules for a regular DCI format 0
else
Insert b most significant bits with value set to '0' after the $N_{UL\_hop}$ hopping bits in the fixed
size resource block assignment, where the number of hopping bits $N_{UL\_hop}$ is zero when the
hopping flag bit is not set to 1, and is defined in Table 8.4-1 when the hopping flag bit is set
to 1, and $b = (\lceil \log_2(N_{RB}^{UL} \cdot (N_{RB}^{UL} + 1)/2) \rceil - 10)$, and interpret the expanded resource block
assignment according to the rules for a regular DCI format 0
end if
The truncated modulation and coding scheme field is interpreted such that the modulation
and coding scheme corresponding to the Random Access Response grant is determined from
MCS indices 0 through 15 in Table 8.6.1-1.
The TPC command $\delta_{msg2}$ shall be used for setting the power of the PUSCH, and is interpreted
according to Table 6.2-1.
In non-contention based random access procedure, the CSI request field is interpreted to
determine whether an aperiodic CQI, PMI, and RI report is included in the corresponding
PUSCH transmission according to subclause 7.2.1. In contention based random access
procedure, the CSI request field is reserved.
The UL delay applies for TDD, FDD and FDD-TDD and this field can be set to 0 or 1 to
indicate whether the delay of PUSCH is introduced as shown in subclause 6.1.1.

TABLE 16

| TPC Command | Value (in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

TABLE 17

5.1 Random Access procedure [1]
5.1.1 Random Access Procedure initialization
The Random Access procedure described in this subclause is initiated by a PDCCH order or
by the MAC sublayer itself Random Access procedure on an SCell shall only be initiated by
a PDCCH order. If a UE receives a PDCCH transmission consistent with a PDCCH order [6]
masked with its C-RNTI, and for a specific Serving Cell, the UE shall initiate a Random
Access procedure on this Serving Cell. For Random Access on the PCell a PDCCH order or
RRC optionally indicate the ra-PreambleIndex and the ra-PRACH-MaskIndex; and for
Random Access on an SCell, the PDCCH order indicates the ra-PreambleIndex with a value
different from 000000 and the ra-PRACH-MaskIndex. For the pTAG preamble transmission
on PRACH and reception of a PDCCH order are only supported for PCell.
Before the procedure can be initiated, the following information for related Serving Cell is
assumed to be available [3]:
  the available set of PRACH resources for the transmission of the Random Access
  Preamble, prach-ConfigIndex.
  the groups of Random Access Preambles and the set of available Random Access
  Preambles in each group (PCell only):
  The preambles that are contained in Random Access Preambles group A and Random
  Access Preambles group B are calculated from the parameters numberOfRA-Preambles
  and sizeOfRA-PreamblesGroupA:
  If sizeOfRA-PreamblesGroupA is equal to numberOfRA-Preambles then there is no
  Random Access Preambles group B. The preambles in Random Access Preamble group
  A are the preambles 0 to sizeOfRA-PreamblesGroupA-1 and, if it exists, the preambles
  in Random Access Preamble group B are the preambles sizeOfRA-PreamblesGroupA to
  numberOfRA-Preambles-1 from the set of 64 preambles as defined in [5].
  if Random Access Preambles group B exists, the thresholds,
  messagePowerOffsetGroupB and messageSizeGroupA, the configured UE transmitted
  power of the Serving Cell performing the Random Access Procedure, $P_{CMAX, c}$ [4], and
  the offset between the preamble and Msg3, deltaPreambleMsg3, that are required for
  selecting one of the two groups of Random Access Preambles (PCell only).
  the RA response window size ra-ResponseWindowSize.
  the power-ramping factor powerRampingStep.
  the maximum number of preamble transmission preamble TransMax.
  the initial preamble power preambleinitialReceivedTargetPower.
  the preamble format based offset DELTA_PREAMBLE (see subclause 7.6).

TABLE 17-continued the maximum number of Msg3 HARQ transmissions maxHARQ-Msg3Tx (PCell only).
the Contention Resolution Timer mac-ContentionResolution Timer (PCell only).
NOTE: The above parameters may be updated from upper layers before each Random
Access procedure is initiated.
The Random Access procedure shall be performed as follows:
Flush the Msg3 buffer;
set the PREAMBLE_TRANSMISSION_COUNTER to 1;
set the backoff parameter value in the UE to 0 ms;
for the RN, suspend any RN subframe configuration;
proceed to the selection of the Random Access Resource (see subclause 5.1.2).
NOTE: There is only one Random Access procedure ongoing at any point in time. If the
UE receives a request for a new Random Access procedure while another is
already ongoing, it is up to UE implementation whether to continue with the
ongoing procedure or start with the new procedure.
5.1.2 Random Access Resource selection
The Random Access Resource selection procedure shall be performed as follows:
If ra-PreambleIndex (Random Access Preamble) and ra-PRACH-MaskIndex (PRACH
Mask Index) have been explicitly signalled and ra-PreambleIndex is not 000000:
15. the Random Access Preamble and the PRACH Mask Index are those
explicitly signalled.
else the Random Access Preamble shall be selected by the UE as follows:
16. If Msg3 has not yet been transmitted, the UE shall:
if Random Access Preambles group B exists and if the potential message size
(data available for transmission plus MAC header and, where required, MAC
control elements) is greater than messageSizeGroupA and if the pathloss is less
than $P_{CMAX, c}$ (of the Serving Cell performing the Random Access Procedure)-
preambleInitialReceivedTargetPower-deltaPreambleMsg3-
messagePowerOffsetGroupB, then:
17. select the Random Access Preambles group B;
else:
18. select the Random Access Preambles group A.
19. else, if Msg3 is being retransmitted, the UE shall:
select the same group of Random Access Preambles as was used for the preamble
transmission attempt corresponding to the first transmission of Msg3.
20. randomly select a Random Access Preamble within the selected group.
The random function shall be such that each of the allowed selections can be chosen
with equal probability;
21. set PRACH Mask Index to 0.
determine the next available subframe containing PRACH permitted by the restrictions
given by the prach-ConfigIndex, the PRACH Mask Index (see subclause 7.3) and
physical layer timing requirements [2] (a UE may take into account the possible
occurrence of measurement gaps when determining the next available PRACH
subframe);
if the transmission mode is TDD and the PRACH Mask Index is equal to zero:
22. if ra-PreambleIndex was explicitly signalled and it was not 000000
(i.e., not selected by MAC):
randomly select, with equal probability, one PRACH from the PRACHs available
in the determined subframe.
23. else:
randomly select, with equal probability, one PRACH from the PRACHs available
in the determined subframe and the next two consecutive subframes.
else:
24. determine a PRACH within the determined subframe in accordance
with the requirements of the PRACH Mask Index.
proceed to the transmission of the Random Access Preamble (see subclause 5.1.3).
5.1.3 Random Access Preamble transmission
The random-access procedure shall be performed as follows:
set PREAMBLE_RECEIVED_TARGET_POWER to
preambleInitialReceivedTargetPower + DELTA_PREAMBLE +
(PREAMBLE_TRANSMISSION_COUNTER-1) * powerRampingStep;
instruct the physical layer to transmit a preamble using the selected PRACH,
corresponding RA-RNTI, preamble index and
PREAMBLE_RECEIVED_TARGET_POWER.
5.1.4 Random Access Response reception
Once the Random Access Preamble is transmitted and regardless of the possible occurrence
of a measurement gap, the UE shall monitor the PDCCH of the PCell for Random Access
Response(s) identified by the RA-RNTI defined below, in the RA Response window which
starts at the subframe that contains the end of the preamble transmission
subframes and has length ra-ResponseWindowSize subframes. The RA-RNTI associated with
the PRACH in which the Random Access Preamble is transmitted, is computed as:
$$RA\text{-}RNTI = 1 + t\_id + 10*f\_id$$
Where t id is the index of the first subframe of the specified PRACH ($0 \leq t\_id < 10$), and f_id
is the index of the specified PRACH within that subframe, in ascending order of frequency
domain ($0 \leq f\_id < 6$). The UE may stop monitoring for Random Access Response (s) after
successful reception of a Random Access Response containing Random Access Preamble
identifiers that matches the transmitted Random Access Preamble.
If a downlink assignment for this TTI has been received on the PDCCH for the RA-RNTI
and the received TB is successfully decoded, the UE shall regardless of the
possible occurrence of a measurement gap:

TABLE 17-continued 25. if the Random Access Response contains a Backoff Indicator subheader:
set the backoff parameter value in the UE as indicated by the BI field of the Backoff Indicator subheader and Table 7.2-1.
26. else, set the backoff parameter value in the UE to 0 ms.
27. if the Random Access Response contains a Random Access Preamble identifier corresponding to the transmitted Random Access Preamble (see subclause 5.1.3), the UE shall:
consider this Random Access Response reception successful and apply the following actions for the serving cell where the Random Access Preamble was transmitted:
28. process the received Timing Advance Command (see subclause 5.2);
29. indicate the preambleInitialReceivedTargetPower and the amount of power ramping applied to the latest preamble transmission to lower layers (i.e., (PREAMBLE_TRANSMISSION_COUNTER-1) * powerRampingStep);
30. process the received UL grant value and indicate it to the lower layers;
if ra-PreambleIndex was explicitly signalled and it was not 000000 (i.e., not selected by MAC):
31. consider the Random Access procedure successfully completed.
else, if the Random Access Preamble was selected by UE MAC:
32. set the Temporary C-RNTI to the value received in the Random Access Response message no later than at the time of the first transmission corresponding to the UL grant provided in the Random Access Response message;
33. if this is the first successfully received Random Access Response within this Random Access procedure:
if the transmission is not being made for the CCCH logical channel, indicate to the Multiplexing and assembly entity to include a C-RNTI MAC control element in the subsequent uplink transmission;
obtain the MAC PDU to transmit from the "Multiplexing and assembly" entity and store it in the Msg3 buffer.
NOTE: When an uplink transmission is required, e.g., for contention resolution, the eNB should not provide a grant smaller than 56 bits in the Random Access Response.
NOTE: If within a Random Access procedure, an uplink grant provided in the Random Access Response for the same group of Random Access Preambles has a different size than the first uplink grant allocated during that Random Access procedure, the UE behavior is not defined.
If no Random Access Response is received within the RA Response window, or if none of all received Random Access Responses contains a Random Access Preamble identifier corresponding to the transmitted Random Access Preamble, the Random Access Response reception is considered not successful and the UE shall:
increment PREAMBLE_TRANSMISSION_COUNTER by 1;
If PREAMBLE_TRANSMISSION_COUNTER = preambleTransMax + 1:
34. if the Random Access Preamble is transmitted on the PCell:
indicate a Random Access problem to upper layers;
35. if the Random Access Preamble is transmitted on an SCell:
consider the Random Access procedure unsuccessfully completed.
if in this Random Access procedure, the Random Access Preamble was selected by MAC:
36. based on the backoff parameter in the UE, select a random backoff time according to a uniform distribution between 0 and the Backoff Parameter Value;
37. delay the subsequent Random Access transmission by the backoff time;
proceed to the selection of a Random Access Resource (see subclause 5.1.2).
5.1.5 Contention Resolution
Contention Resolution is based on either C-RNTI on PDCCH of the PCell or UE Contention Resolution Identity on DL-SCH.
Once Msg3 is transmitted, the UE shall:
start mac-ContentionResolutionTimer and restart mac-ContentionResolutionTimer at each HARQ retransmission;
regardless of the possible occurrence of a measurement gap, monitor the PDCCH until mac-ContentionResolutionTimer expires or is stopped;
if notification of a reception of a PDCCH transmission is received from lower layers, the UE shall:
38. if the C-RNTI MAC control element was included in Msg3:
if the Random Access procedure was initiated by the MAC sublayer itself and the PDCCH transmission is addressed to the C-RNTI and contains an UL grant for a new transmission; or
if the Random Access procedure was initiated by a PDCCH order and the PDCCH transmission is addressed to the C-RNTI:
39. consider this Contention Resolution successful;
40. stop mac-ContentionResolutionTimer;
41. discard the Temporary C-RNTI;
42. consider this Random Access procedure successfully completed.
43. else if the CCCH SDU was included in Msg3 and the PDCCH transmission is addressed to its Temporary C-RNTI:
if the MAC PDU is successfully decoded:
44. stop mac-ContentionResolutionTimer;
45. if the MAC PDU contains a UE Contention Resolution Identity MAC control element; and

TABLE 17-continued

```
46. if the UE Contention Resolution Identity included in the MAC control
    element matches the CCCH SDU transmitted in Msg3:
      consider this Contention Resolution successful and finish the disassembly
      and demultiplexing of the MAC PDU;
      set the C-RNTI to the value of the Temporary C-RNTI;
      discard the Temporary C-RNTI;
      consider this Random Access procedure successfully completed.
47. else
    discard the Temporary C-RNTI;
    consider this Contention Resolution not successful and discard the
    successfully decoded MAC PDU.
if mac-ContentionResolutionTimer expires:
  48. discard the Temporary C-RNTI;
  49. consider the Contention Resolution not successful.
if the Contention Resolution is considered not successful the UE shall:
  50. flush the HARQ buffer used for transmission of the MAC PDU in the
      Msg3 buffer;
  51. increment PREAMBLE_TRANSMISSION_COUNTER by 1;
  52. If PREAMBLE_TRANSMISSION_COUNTER = preambleTransMax + 1:
      indicate a Random Access problem to upper layers.
  53. based on the backoff parameter in the UE, select a random backoff
      time according to a uniform distribution between 0 and the
      Backoff Parameter Value;
  54. delay the subsequent Random Access transmission by the backoff time;
  55. proceed to the selection of a Random Access Resource (see subclause 5.1.2).
5.1.6 Completion of the Random Access procedure
At completion of the Random Access procedure, the UE shall:
  discard explicitly signalled ra-PreambleIndex and ra-PRACH-MaskIndex, if any;
  flush the HARQ buffer used for transmission of the MAC PDU in the Msg3 buffer.
In addition, the RN shall resume the suspended RN subframe configuration, if any.
```

It may be configured that Method #8 is applied restrictively to an SRXCH_D2D RX UE. It may also be configured that Method #8 is applied restrictively to a case in which an RRC_CONNECTED UE (or RRC_IDLE UE) performs a random access procedure. It may also be configured that Method #8 is applied restrictively to CA (and/or non-CA). It may also be configured that Method #8 is applied restrictively to a contention-based random access procedure (and/or a contention free-based random access procedure).

For the convenience of description, a set of INV_DL SFs (or DL gaps) (and/or a set of D2DSS-related INV_DL SFs (or DL gaps) (linked to a corresponding discovery pool)) configured in at least a part (i.e., a part or all) of the above-described proposed methods (e.g., Method #1, Method #2, Method #3, Method #4, Method #5, and Method #6) is referred to as "INV_DL SF(s)_DSSWIN" (and/or "INV_DL SF(s)_DSSWIN"). For example, it may be configured that Method #8 is applied restrictively to "INV_DL SF(s)_DISWIN" (and/or "INV_DL SF(s)_DSSWIN").

Example 8-1

If INV_DL SF(s)_DISWIN (and/or INV_DL SF(s)_DSSWIN) is overlapped at least partially (i.e., partially or fully) with the afore-described random access response window (refer to [Table 17]), a D2D UE may be configured not to configure INV_DL SF(s)_DISWIN (and/or INV_DL SF(s)_DSSWIN) related to a corresponding discovery pool (and/or a D2DSS linked to the discovery pool) (i.e., not to receive a discovery signal and/or a D2DSS linked to the discovery pool).

Herein, application of this configuration/rule may be interpreted as meaning that reception of a random access response (or a random access procedure) is prioritized over reception of a discovery signal (and/or a D2DSS linked to a discovery pool).

Example 8-2

If INV_DL SF(s)_DISWIN (and/or INV_DL SF(s)_DSSWIN) is overlapped at least partially (i.e., partially or fully) with the afore-described random access response window (refer to [Table 17]), the D2D UE may be configured to perform a random access response reception operation in an area ranging from '(starting) SF of a random access response window' to '(ending) SF of the random access response window' (i.e., not to receive a discovery signal and/or a D2DSS linked to the discovery pool), and not to receive a discovery signal and/or a D2DSS linked to the discovery pool (i.e. to perform a WAN DL signal reception operation) in an SF(s) following 'the ending SF of the random access response window'.

For example, in the case where this rule is applied, if there is also a (reception) resource related to a discovery pool (and/or a D2DSS linked to the discovery pool) before the starting SF of the random access response window', it may be configured that an operation for receiving a discovery signal and/or a D2DSS linked to the discovery pool is not performed in resources overlapped at least partially (i.e., partially or fully) with 'the starting SF-1 of the random access response window' (i.e., an SF(s) that ensures a time required for carrier (or frequency band) switching of a single RX chain). For example, if an SF(s) preceding an SF overlapped at least partially (i.e., partially or fully) with 'the starting SF-1 of the random access response window' is also configured as a discovery pool and/or a D2DSS-related (reception) resource linked to the discovery pool, it may be configured that an operation for receiving a discovery signal and/or a D2DSS linked to the discovery pool is performed in the preceding SF(s).

Example 8-3

If INV_DL SF(s)_DISWIN (and/or INV_DL SF(s)_DSSWIN) is overlapped at least partially (i.e., partially or fully) with the afore-described random access response window (refer to [Table 17]), the D2D UE may be configured not to perform an operation for receiving a discovery signal and/or a D2DSS linked to a discovery pool, only in an SF(s)

overlapped at least partially (i.e., partially or fully) with an area ranging from 'the starting SF-1 of the random access response window' to 'the ending SF+1 of the random access response window'.

Example 8-4

If INV_DL SF(s)_DISWIN (and/or INV_DL SF(s)_DSSWIN) is overlapped with an SF(s) (a set of SFs) (hereinafter, referred to as "WAN_WIN") for at least a part (i.e., a part or all) of the following usages, the D2D UE may not configure INV_DL SF(s)_DISWIN (and/or INV_DL SF(s)_DSSWIN) (related to a discovery pool and/or a D2DSS linked to the discovery pool).

In another example, if INV_DL SF(s)_DISWIN (and/or INV_DL SF(s)_DSSWIN) is overlapped at least partially (i.e., partially or fully) with the above-described WAN_WIN, the D2D UE may be configured to perform a WAN_WIN-related reception operation (i.e., not to receive a discovery signal and/or a D2DSS linked to a discovery pool) in an area ranging from the starting SF of WAN_WIN' to 'the ending SF of WAN_WIN', and not to receive a discovery signal and/or a D2DSS linked to a discovery pool (i.e., to perform a WAN DL signal reception operation) in an SF(s) following 'the ending SF of WAN_WIN'.

Herein, in the case where this configuration/rule is applied, if there is also a (reception) resource related to a discovery pool and/or a D2DSS linked to the discovery pool before 'the starting SF of WAN_WIN', it may be configured that an operation for receiving a discovery signal and/or a D2DSS linked to the discovery pool is not performed in resources overlapped at least partially (i.e., partially or fully) with 'the starting SF-1 of WAN_WIN-1' (i.e., an SF(s) for ensuring a time required for carrier (or frequency band) switching of a single RX chain). For example, if an SF(s) preceding an SF overlapped at least partially (i.e., partially or fully) with 'the starting SF-1 of WAN_WIN' is configured as (reception) resources related to the discovery pool and/or the D2DSS linked to the discovery pool, an operation for receiving a discovery signal and/or a D2DSS linked to the discovery pool is performed in the preceding SF(s).

In another example, if INV_DL SF(s)_DISWIN (and/or INV_DL SF(s)_DSSWIN) is overlapped at least partially (i.e., partially or fully) with the above-described WAN_WIN, the D2D UE may be configured not to perform an operation for receiving a discovery signal and/or a D2DSS linked to a discovery pool, only in an SF(s) overlapped at least partially (i.e., partially or fully) with an area ranging from the starting SF-1 of WAN WIN' to 'the ending SF+1 of WAN_WIN'.

a random access response window
  a (re)transmission time instant of message 3 (e.g., a PUSCH) (in a contention-based random access procedure)
  a reception time instant of a PHICH related to (re) transmission of message 3 (e.g., a PUSCH) (in the contention-based random access procedure)
  a (re)transmission time instant of message 4 (i.e., a contention resolution message) (in the contention-based random access procedure)
  a (re)transmission time instant of a random access preamble <Method 9>

Further, a description will be given of a method for efficiently supporting D2D discovery in a multi-carrier situation to which the present disclosure is applicable, or a method for efficiently supporting D2D discovery in a carrier other than a PCell.

[Table 18] describes a method for supporting discovery, or a method for efficiently supporting D2D discovery in a carrier other than a PCell.

TABLE 18

1. Introduction
  One objective of Rel-13 eD2D WI is to enhance D2D discovery in multiple carriers [1]:
  3) Enhance D2D discovery support in the presence of multiple carriers and PLMNs:
    a) Allow D2D transmissions in a non-serving carrier and/or secondary cell belonging to the same and possibly different PLMN as the serving cell.
  In order to fulfil the above objective, it needs to be defined how the UE can know the TX and RX resource pools in other carriers as well as how the UE utilizes its limited TX and RX capability in the multi-carrier scenarios. This contribution focuses on these two aspects. For brevity, a carrier which is not PCell of a UE is called non-PCell throughout this paper, and a non-PCell can be an SCell, a non-serving carrier belonging to the same PLMN as PCell, or a carrier belonging to a different PLMN.
2. Resource pool configuration
  In Rel-12 discovery, the eNB signals the configuration of TX and RX resource pools only for the carrier in which this signaling is transmitted. For the other carriers, the eNB only can inform the list of carriers on which discovery may be operated, and if a UE is interested in discovery monitoring in the other carriers, the UE may read SIB from other carriers to acquire the resource pool configuration. However, such Rel-12 inter-carrier discovery monitoring is operated in a best-effort basis, and the eNB has no idea about when the UE actually operates the inter-carrier discovery. It is our understanding that the Rel-13 objective of the multi-carrier discovery is to define more predictable UE behavior and related performance requirement, especially for discovery transmissions which consumes radio resources and causes interference. In order to achieve this objective, it is necessary to have a clear definition of the resource pool in a non-PCell so that the UE behavior about the pool can be explicitly specified in a predictable manner. Therefore, the eNB needs to signal TX and RX resource pools for a non-PCell on which the related UE behavior can be clearly defined.

Regarding the case of [Table 18], an eNB may signal a TX/RX discovery resource configuration for a carrier (or cell) other than a PCell through the PCell according to the present disclosure.

For example, in the case of intra-PLMN, a discovery transmission (resource) configuration in another carrier may be allowed for a UE by RRC signaling. For example, RRC signaling may be used for the usage of configuring type 1 or type 2 discovery (resources) in a non-primary carrier.

In another example, in the case of inter-PLMN, a higher layer may handle inter-PLMN authentication for discovery signal transmission. In the presence of a network infrastructure, a network having inter-PLMN information should have an option for making a (discovery transmission (resource)) configuration for a UE, similarly to intra-PLMN. Since inter-PLMN coordination is not possible all the time, uncoordinated inter-PLMN should be considered basically. If an uncoordinated inter-PLMN scenario with a network infrastructure is considered, a UE may be aware of TX/RX resource pool information to be used (in a corresponding carrier frequency) by parsing (or detecting) SIB19 of a concerned carrier frequency. Herein, for example, a carrier frequency (in which a D2D discovery signal is to be transmitted(/received)) may be indicated to the UE by predefined signaling (or rule). On the other hand, an inter-PLMN scenario without a network infrastructure (e.g., a case in which an eNB is not on a ProSe (or D2D) carrier) may be supported, and out-of-coverage discovery may also be considered to be supported.

Further, transmission of a non-PCell will be described. First, how a UE will determine a transmission synchronization reference will be described.

Figure 15:
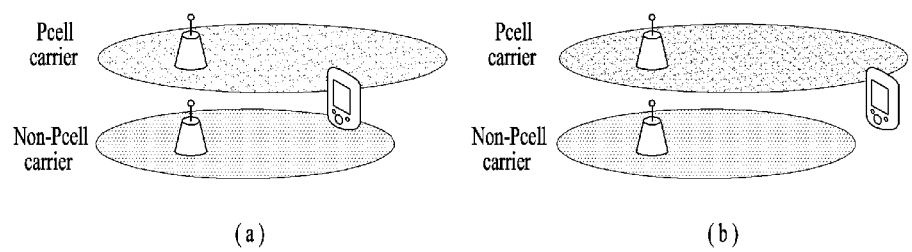
FIG. 15 shows multicarrier coverages related to the present invention.

FIG. 15 illustrates coverage states in a multi-carrier environment related to the present disclosure. FIG. 15(a) illustrates a case in which a TX UE is located within the network coverage of a PCell and within the network coverage of a concerned non-PCell, and FIG. 15(b) illustrates a case in which a TX UE is located within the network coverage of a PCell but outside the network coverage of a concerned non-PCell.

Figure 16:
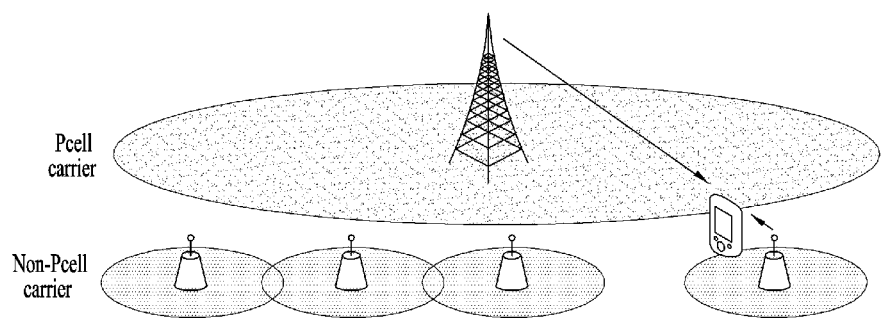
FIG. 16 shows a multicarrier applied hetero-network.

FIG. 16 illustrates a heterogeneous network in a multi-carrier environment. Referring to FIG. 16, even though CA is applied, the timings of a PCell and a non-PCell may be different (e.g., in the case of multiple TAGs) due to a propagation delay difference or the like in a heterogeneous network environment (refer to FIG. 16). For example, in the case illustrated in FIG. 15(a), when a UE transmits a D2D signal in a non-PCell, the UE preferably uses a cell of the non-PCell as a transmission synchronization reference. For this purpose, an eNB needs to signal a synchronization reference ID related to each TX pool in the non-PCell, similarly to configuring (or signaling) RX pools for neighbor cells.

For example, the difference (from configuring (or signaling) RX pools for neighbor cells) lies in that a resource pool-related bitmap is applied based on SFN #0 of an indicated reference cell located in a non-PCell carrier. Upon receipt of this information, the TX UE is synchronized with the indicated reference cell and transmits a D2D signal according to a resource pool configuration. The indicated cell is a reference for all transmissions in the resource pool (e.g., RSRP-based SLSS transmission, RSRP-based resource pool selection, path-loss dependent open-loop power control).

If the UE is in RRC_Connected state in the PCell, a single reference cell-based TX pool may be sufficient. This is because the network may select a reference cell based on an RRM report received from the UE. If the UE is already connected to a cell on a non-PCell according to CA or dual connectivity, a reference cell ID may not be indicated because the connected cell may become a transmission synchronization reference (naturally). However, if the UE is in RRC_Idle state, a plurality of small cells may exist on the non-PCell carrier within the coverage of the PCell, as illustrated in FIG. 16. Therefore, in this case, PCell signaling (e.g., an SIB) may need a plurality of TX pools related to each reference cell. Further, a reference cell selection procedure in an appropriate non-PCell carrier needs to be defined.

According to the present disclosure, therefore, the PCell needs to indicate the ID of a transmission synchronization resource for each discovery resource pool in a carrier other than the PCell. For RRC_Idle UEs, the PCell may configure a plurality of TX pools for a carrier other than the PCell. In the latter case (e.g., in the case of RRC_Idle UEs), one TX pool may be selected by a proper selection procedure.

Further, in the case of FIG. 15(b), in-coverage and out-coverage are co-existent in carriers in the D2D synchronization procedure context, from the viewpoint of a single UE. Therefore, in this case, i) whether the UE is to operate as an out-coverage UE, ii) whether the UE is to operate as an in-coverage UE, or iii) whether a new operation is to be defined should be considered.

First, the case where the UE operates as an out-coverage UE in a non-PCell according to a synchronization procedure that defines a network coverage state on a carrier basis (Option 1) will be described. In this case, the network does not have controllability on a D2D operation on the non-PCell, and it is very difficult for a WAN signal of the PCell and a D2D signal of a non-PCell to coexist. For example, if a UE (e.g., D2D UE #X) is synchronized with an SLSS from another out-coverage UE already existing in the non-PCell, the position of a D2D operation is not known (accurately) to the eNB. As a result, TDM between WAN TX and D2D TX in two carriers may be impossible. To avert this problem, D2D UE #X may be configured to indicate to the PCell at least one of i) resource configuration/position information about an SLSS/PSBCH, ii) resource configuration/position information about a PSSCH, iii) resource configuration/position information about a PSCCH, iv) resource configuration/position information about a PSDCH, or v) information about the time/frequency synchronization difference between PCell communication (e.g., D2D communication or WAN communication) and out-coverage D2D communication (non-PCell) for use in D2D communication with an out-coverage D2D UE (non-PCell) (acquired/discovered by D2D UE #X), through a predefined channel (or resource).

In the case where the network still has controllability on a D2D operation in a non-PCell (Option 2), the network may configure resources and a sequence for transmission of an SLSS on the non-PCell by signaling on a PCell. By this control, the network may determine the location of the D2D operation on the non-PCell and enable efficient coexistence with WAN communication. For synchronized transmission, i) when a UE transmits an in-coverage synchronization signal (e.g., an SLSS sequence) (as an in-coverage UE), the UE may assume(/determine) that the synchronization signal has priority over an SLSS transmitted by another out-coverage UE on in a non-PCell carrier. In another example, for synchronized transmission, ii) the UE may transmit a synchronization signal (e.g., an SLSS sequence) (as an out-coverage UE), ignoring an SLSS transmitted by another out-coverage UE in a non-PCell carrier.

The above-described operations (i.e., Option 1 and Option 2) may be applied simultaneously (or co-exist). For example, if synchronization resources are not configured in a non-PCell, Option 1 may be applied, whereas if synchronization resources are configured in a non-PCell, Option 2 may be applied.

Now, reception in a non-PCell will be described. For an RX pool configured in the non-PCell, a reference cell should also be considered. SFN #0 of a cell that provides a signal in relation to discovery is a reference for all SF bitmaps for resource pool configuration.

A synchronization window (w1 or w2) may be signaled for each pool. Therefore, a UE may be synchronized with a resource pool, assuming that a timing error (with respect to a signaling cell) is limited to within the indicated synchronization window.

To reuse a resource pool structure for an RX operation in a non-PCell, an RX reference cell should be determined. A PCell (i.e., a signaling cell) or a cell of a non-PCell may be a reception reference cell.

In a network with dual connectivity, the PCell may not be synchronized with the cell of the non-PCell. If the PCell is used as a reception reference cell of the non-PCell, it may be indicated that all RX pools have a large synchronization window (i.e., w1) irrespective of synchronization states with respect to the cell of the non-PCell.

As a result, if additional information is not provided, a UE should repeat RX pool timing detection. This unnecessary operation may be prevented by allowing additional information by which to consider that cells sharing the same SLSS ID are time-synchronized, or providing a time-synchronized cell list. Alternatively, a cell or a set of synchronized cells in a non-PCell carrier may become a reception reference cell. After receiving a resource configuration in the PCell, the UE may perform an operation other than indication of a cell operating as a reference instead of the PCell.

UE TX/RX capabilities will further be described below.

If a UE does not have a D2D-specific TX/RX circuit, the UE should switch a circuit for WAN to serve a D2D purpose. This switching is based on an FDD PCell (i.e., the UE switches a WAN receiver from a DL carrier to a UL carrier in order to receive a discovery signal). Therefore, additional UE capability signaling may be configured to accurately indicate the UE's simultaneous TX/RX capabilities in multiple carriers to the network, in consideration of UE complexity.

That is, according to the present disclosure, since a UE having a D2D-specific TX/RX circuit is not defined, UE capability signaling should be defined to indicate accurate multiple carriers-related simultaneous TX/RX capabilities to the network.

Further, [Table 19] describes a configuration of WAN and D2D carriers, in the case where a UE-related TX/RX limit is exceeded.

TABLE 19

A proper solution is needed to handle the case where the configuration of carriers for WAN and D2D exceeds the limitation in TX and RX of the UE. In Rel-12, the concept of "ProSe gap" was agreed in RAN1 but not included in the final specification due to the lack of time to resolve the related issues. By the following ProSe gap, a UE can stop receiving WAN in a carrier (DL carrier in the agreement) during the gap and switch the receiver to another carrier (UL carrier in the agreement) for discovery reception.
For FDD carriers:
  At least for UEs with a single Rx chain (FFS subject to the UE capability discussion whether this also applies for UEs with a shared D2D/cellular Rx chain), a UE that is receiving D2D discovery signals on an UL carrier is not expected to read DL signals on the DL carrier paired to such UL carrier during the subframes belonging to the D2D discovery pools on that UL carrier as well as one subframe preceding and following these subframes
    The discovery pools are configured by the eNB by broadcast or UE-specific signaling
      FFS: For RRC_CONNECTED UEs, 1 bit may be signalled using RRC signaling indicating whether this rule applies or not (on a per UE basis)
  Cellular measurement gaps subframes are excluded from this rule
  Paging reception is prioritized over D2D reception The present disclosure proposes a ProSe gap for efficient TDM between WAN and D2D discovery for a UE having a limited RF capability, based on the configuration described in [Table 19].

The UE discontinues monitoring of WAN DL reception and starts to receive a discovery signal in another carrier (a related UL carrier or an unrelated carrier), in a ProSe gap. The ProSe gap is required for a carrier switching time and a discovery reception operation including SLSS reception.

The ProSe gap is also required when the UE switches a single TX circuit between WAN UL TX on a PCell and discovery TX on a non-PCell. That is, it may be determined that a DL reception linked to a UL SF included in the ProSe gap for Tx is disabled.

For example, a (UL) gap attributed to D2D TX (non-PCell) may not be configured/allowed in a WAN UL (TX) SF (PCell) linked to a DL SF(s) (PCell) carrying a (DL) signal/channel/data for a predefined usage (e.g., paging, RAR, SIB, PSS?SSS, or PSBCH). Herein, 'a DL SF(s) linked to a WAN UL (TX) SF' may be interpreted as a DL SF(s) carrying a PUSCH transmission-related UL grant (and/or a PHICH) (according to a predefined or signaled UL HARQ timeline).

For example, if this rule/configuration is applied, it may be interpreted that the WAN UL (TX) SF linked to the DL SF(s) (PCell) carrying the (DL) signal/channel/data for the predefined usage is not (virtually) deactivated because a (UL) gap is not configured.

In another example, if a D2D TX-related (UL) gap is configured in a WAN UL (TX) SF, a linked DL SF(s) may be deactivated (virtually). If the DL SF(s) carries a (DL) signal/channel/data for a predefined usage (e.g., paging, RAR, SIB, PSS/SSS, or PSBCH), (a part or all of) the D2D RX-related (UL) gap configuration may be nullified or considered to be mis-configured. In other words, if WAN UL TX is discontinued in SF #n+4 in FDD, it is meaningless because a PUSCH/PUCCH corresponding to a UL grant or a DL allocation in SF #n cannot occur.

Therefore, it is preferred that the eNB has controllability on the afore-described ProSe gap. For example, the eNB may turn on/off the ProSe gap for each pool by UE-specific signaling, in consideration of impact on discovery performance and a WAN operation.

Accordingly, a UE may be allowed to discontinue transmission or reception of a WAN channel/signal in the ProSe gap, and may perform a discovery operation including discovery and SLSS TX/RX, like switching between carriers according to the present disclosure.

In order to efficiently support D2D discovery in a multi-carrier situation or D2D discovery on a carrier other than a PCell, if the eNB (or PCell) configures a (UL) gap in some UL SF(s) of a PCell UL CC, and a D2D TX UE performs a D2D (discovery) TX operation in another carrier (a non-PCell, a non-serving cell, or an SCell) by switching its TX chain during the (UL) gap in the foregoing method, the D2D TX UE may be defined to follow at least a part (i.e., a part or all) of rules/configurations in the following Example 9-1 or Example 9-2. The (part or all) of the rules/configurations may also be extended to D2D communication TX and/or SLSS/PSBCH TX (on another carrier, a non-PCell, or an SCell). The (part or all) of the rules/configurations may also be applied restrictively to a D2D (TX) UE having a limited TX chain capability relative to the number of carriers in which a simultaneous transmission is configured.

Example 9-1

If a D2D TX UE performs a type-1 discovery TX operation in another carrier (non-PCell or SCell) by switching its TX chain during a (UL) gap, the D2D TX UE may be configured to select/determine type-1 discovery TX resources (based on a random or preset probability), only in consideration of resources within the (UL) gap in a type-1 D2D signal resource pool. In the case where this rule is applied, if the (UL) gap is smaller than a type-1 D2D signal resource pool (in size/period), it may be interpreted that the type-1 D2D signal resource pool is virtually redefined/configured (restrictively) with resources of the (UL) gap.

Example 9-2

In the case where the D2D TX UE performs a type-1 discovery TX operation in another carrier (non-PCell or SCell) by switching its TX chain during a (UL) gap, if type-1 discovery TX resources that the D2D TX UE selects from a (total) type-1 D2D signal resource pool (based on a random or preset probability) are outside the (UL) gap, the D2D TX UE may be configured i) to omit the type-1 discovery TX, ii) to reselect resources (repeatedly) until the type-1 discovery TX resources that the D2D TX UE selects from the (total) type-1 D2D signal resource pool (based on the random or preset probability) fall within the (UL) gap, or ii) to apply Example 9-1.

Application of this rule may be interpreted as meaning that the D2D TX UE selects (initial) type-1 discovery TX resources based on a random or preset probability with no regard to the (UL) gap, assuming that the resources of the total type-1 D2D signal resource pool are available. In another example, if type-1 discovery TX resources that the D2D TX UE selects from the (total) type-1 D2D signal resource pool (based on the random or preset probability) are within the (UL) gap, the D2D TX UE performs a type-1 discovery Tx operation in the resources.

In another example, if the D2D TX UE should perform a type-2B/2A discovery TX operation based on resources indicated directly by an eNB (or PCell) in another carrier (non-PCell, non-serving cell, or SCell) by switching its TX chain, the eNB (or PCell) has accurate knowledge of time/frequency resources in which the D2D TX UE performs the type-2B/2A discovery TX operation, (compared to type-1 discovery Tx). Therefore, it may be defined that i) the time/frequency resources (e.g., SF), or ii) the time/frequency resources and only K (e.g., 1) SF(s) before and/after the time/frequency resources are configured/assumed to be a (UL) gap (selectively). K may be received from the eNB (or PCell) by predefined signaling (e.g., SIB, or (dedicated) RRC signaling), or may be fixed to a predetermined value (e.g., 1).

If the D2D TX UE performs the type-2B/2A discovery TX operation based on the resources indicated (directly) by the eNB (or PCell) in another carrier (non-PCell, non-serving cell, or SCell) by switching its TX chain, this may be interpreted as meaning that resource information related to the type-2B/2A discovery TX operation in another carrier (non-PCell, non-serving cell, or SCell) is configured in a cross-cell manner from the PCell (e.g., especially when it is determined that another carrier (non-PCell, non-serving cell, or SCell) is out-of-coverage from the view point of the D2D TX UE).

In another example, in the case where the D2D TX UE should perform a D2D discovery TX operation in another carrier (non-PCell, non-serving cell, or SCell) (hereinafter, referred to "OT_carrier") by switching its TX chain, if K D2D discovery TX repetitions are configured within a D2D discovery period, i) it is assumed/defined that the eNB (or PCell) does not schedule a (PCell) WAN UL TX overlapped in the time domain at least partially (i.e., partially or fully) with the K D2D discovery repetitions within the D2D discovery period, or ii) the D2D TX UE may be configured to discard scheduling information about a (PCell) WAN UL TX overlapped in the time domain (i.e., partially or fully) with the K D2D discovery repetitions within the D2D discovery period, or to consider the scheduling information to be invalid.

The former i) may be applied or valid in the case where the PCell (or eNB) knows i) D2D discovery TX time/frequency resource information (or D2D discovery TX resource pool information) and/or ii) time/frequency synchronization information, on OT_carrier related to the D2D TX UE.

On the other hand, the latter ii) may be applied or valid in the case where the PCell (or eNB) has difficulty in acquiring i) D2D discovery TX time/frequency resource information (or D2D discovery TX resource pool information) and/or ii) time/frequency synchronization information, on OT_carrier related to the D2D TX UE (e.g., in the case where OT_carrier is configured (along with the PCell), for dual connectivity, and/or OT_carrier is an inter-PLMN carrier (with respect to the PCell)).

For example, in the case where the D2D TX UE should perform a D2D discovery TX operation on OT_carrier by switching its TX chain, if K D2D discovery TX repetitions are configured within a D2D discovery period, the D2D TX UE may be configured to select resources (based on a random or preset probability), only in consideration of resources which are at once i) resources within a preset or signaled (UL) gap period (PCell) in a discovery resource pool (OT_carrier) and ii) resources allowing (supporting) all of the K D2D discovery repetitions.

In another example, in the case where the D2D TX UE should repeatedly perform K D2D discovery TX operations on OT_carrier by switching its TX chain, if at least a part (i.e., a part or all) of K D2D discovery TX resources that the D2D TX UE selects from a (total) D2D discovery resource pool (based on a random or preset probability) are outside a (UL) gap, the D2D TX UE may be configured i) to drop the total D2D discovery TX, ii) to reselect resources repeatedly until K D2D discovery TX resources that the D2D TX UE selects from the (total) D2D discovery resource pool (based on a random or preset probability) fall within the (UL) gap, or iii) to select resources (based on a random or preset probability), only in consideration of resources which are at once resources within a preset or signaled (UL) gap period (PCell) in a discovery resource pool (OT_carrier) and resources allowing (supporting) all of the K D2D discovery repetitions.

In another example, if a type-2B discovery TX on OT_carrier can be indicated (by the PCell), it may be configured that a (UL) gap (PCell) is implicitly considered/assumed to hop according to a type-2B discovery time hopping pattern (OT_carrier), or a PCell UL SF corresponding to the type-2B discovery time hopping pattern (OT_carrier), and K (e.g., 1) PCell UL SFs before and/or after the PCell UL SF are also considered/assumed to be a (UL) gap (PCell). K may be received from the eNB (or PCell) by predefined signaling (e.g., an SIB or (dedicated) RRC signaling) or preset to a specific value (e.g., 1).

In another example, a (serving) network (or (serving) eNB) may not have accurate information about a D2D ((TX/RX) resource) configuration on an inter-PLMN (non-primary or non-serving) carrier under an uncoordinated inter-PLMN scenario (i.e., refer to [Table 3.14]). In this case, collision(s) (or overlap) may occur between a preset (or signaled) D2D (TX/RX) resource(s)" or "WAN UL TX" on a "primary carrier" of the (serving) network (or (serving) eNB) and a "D2D (TX/RX) resource(s) in an inter-PLMN (non-primary or non-serving) carrier", which degrades inter-PLMN D2D performance. To mitigate this problem, for example, a preset (or signaled) partial (or whole) ProSe gap (configuration information about the ProSe gap) may be configured to be randomized in time (in the time domain) according to a specific (pseudo) function (Rule #Q). Herein, for example, the ProSe gap may be interpreted as a resource area in which the (serving) network (or (serving) eNB)) allows an inter-PLMN D2D (TX/RX) operation for a (serving) D2D UE. For the convenience of description, for example, it is assumed that the ProSe gap configuration information includes offset information (i.e., referred to as "GAP_OFFSET") (applied with respect to SFN #0 of a serving carrier or a primary carrier), information about a "bitmap for a ProSe gap resource pool) (i.e., referred to as GAP_RSCBITMAP"), and information about a period (referred to as "GAP_PERIOD"). In a specific example, a (pseudo) function that randomizes part (or all) of the ProSe gap information (e.g., GAP_OFFSET (i.e., the position of the ProSe gap is time-shifted periodically), GAP_RSCBITMAP (i.e., the size of the ProSe gap resource pool is changed periodically), GAP_PERIOD (i.e., the frequency of configuring the ProSe gap is changed (periodically)) in time (in the time domain) (or on the basis of GAP_PERIOD (or a preset number of GAP_PERIODs)) may have the followings as an input value(s).

(intra- or inter-) PLMN ID
(intra-PLMN or inter-PLMN) (D2D) carrier frequency
(primary (or serving) or non-primary) (virtual/physical) cell ID
(primary (or serving) carrier) SFN (or subframe index or slot index)
(primary (or serving) carrier) DFN (D2D (sub)frame number))
UE ID or pre-signaled (or preset) random seed value
pre-signaled (or preset) GAP_OFFSET OR GAP_PERIOD (or GAP_RSCBITMAP (size))

In another example, it may be regulated that the preset (or signaled) ProSe gap hops between carriers in time (in the time domain), and the (pseudo) function that determines a hopping pattern has (a part or all of) the foregoing parameter(s) (i.e., RULE #Q) as an input value(s). For example, (part or all of) the ProSe gap configuration information applied to a carrier hopping operation may be further randomized according to RULE #Q.

Example 10

Moreover, in the present invention, i) a PCELL/WLAN associated problem of interruption time/subframe generation or a WAN UL A/N (TX) missing problem, which is caused when D2D UE performs D2D RECEIVER SPARE CHAIN SWITCHING ON/OFF operation, and ii) a method of adjusting a timing/count of performing D2D RECEIVER SPARE CHAIN SWITCHING ON/OFF to mitigate such a problem are described as follows.

Currently, with respect to LTE/LTE-A, a discussion about ProSe is in progress, which can be classified into D2D discovery and D2D communication. Moreover, in case of D2D communication, it can be classified into in-coverage and out-of-coverage.

In the following description, WAN interruption in case of RRC connection (RRC-Connected) to FDD system is checked. Particularly, a case of interruption in RRC reconfiguration and a case of interruption in progress of performing discovery are examined with respect to D2D discovery and a case of interruption in progress of RRC reconfiguration is examined with respect to D2D communication.

To this end, for D2D discovery, a discovery pool is defined. And, it is necessary to clarify an interruption subframe on a synchronous network and an interruption subframe on an asynchronous network. Moreover, it is necessary to consider a UE RD structure supportive of D2D discovery.

In case of a single RF (radio frequency) chain, WAN interruptions due to D2D RX do not occur in RRC_connected state. Namely, the number of missed ACK/NACK is 0. Yet, regarding a spare RF chain for D2D RX, WAN interruptions may occur due to On/Off of a switching D2D RX spare chain in RRC_connected state. In the following description, a pool related parameter is assumed as Table 20.

And, the following description is mainly made centering on D2D discovery related to a spare RF chain.

TABLE 20 discoverySubframeBitmap = 11111111_00000000_00000000_00000000
numRepetition = 1
discoveryOffsetIndicator = 160 ms
discovery period = 320 ms
SyncOffsetIndicator = 20 ms(for only Asynchronous network)
PDSCH scheduling in DL
  Option 1: eNB is assumed not to schedule PDSCH in DL subframe related to UL ACK/NACK subframe which corresponds to SLSS and discovery including searching window.
  Option 2: eNB is assumed to schedule PDSCH in all DL subframes Namely, regarding PDSCH scheduling in Table 20, in case of Option 1, an eNB does not receive PDSCH in a downlink subframe (DL SF) associated with a searching window specific UL ACK/NAK subframe (e.g., corresponding to SLSS (SideLink Synchronization Signals) and a discovery signal. On the contrary, in case of Option 2. Assume that an eNB schedules PDSCH for all DL subframes.

Based on the parameters of Table 20, a D2D discovery operation on a synchronous network is described as follows.

Assuming parameters like table 20, FIG. 17 and FIG. 18 show the relations among eNB WAN DL, UE WAN UL and UE D2D RX according to one embodiment of the present invention. FIG. 17 and FIG. 18 illustrate the number of WAN UL interruptions according to a location of D2D RX spare chain switching On/Off depending on the PDSCH scheduling option 1 or 2 (in Table 20).

Synchronization-scheme 1 (Sync-Alt1): BeforeAfter "discoverySubframeBitmap×numRepetition"
Synchronization-scheme 2 (Sync-Alt2): Within "discoverySubframeBitmap×numRepetition", before first "discoverySubframeBitmap of 1" and after last "discoverySubframeBitmap of 1"

Figure 17A:
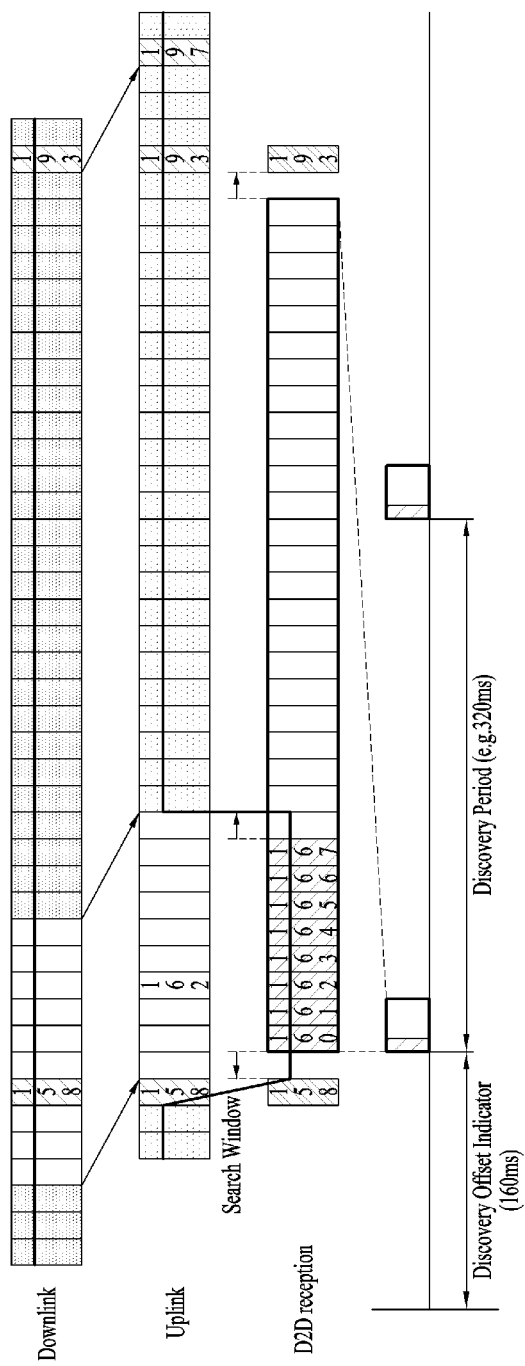
FIG. 17a shows the relations among eNB WAN DL, UE WAN UL and UE D2D RX according to one embodiment of the present invention.

In FIG. 17a, according to synchronization-scheme 1, D2D RX spare chain switching On/Off occurs at '158, 193'. UL ACK/NACK SF '197' corresponding to '193' among subframes is interrupted due to the D2D RX spare chain switching On/Off. All UL interruption SFs are '158, 193, 197', and the number of interrupted SFs is 3 per 320 ms. Here, UE's operation between D2D RX and WAN UL TX is similar to TDD operation of SFs '168, 169'. Such an operation does not cause any problems. This is because a punctured D2D last symbol is similar to a gap of a TDD special SF (subframe).

Figure 17B:
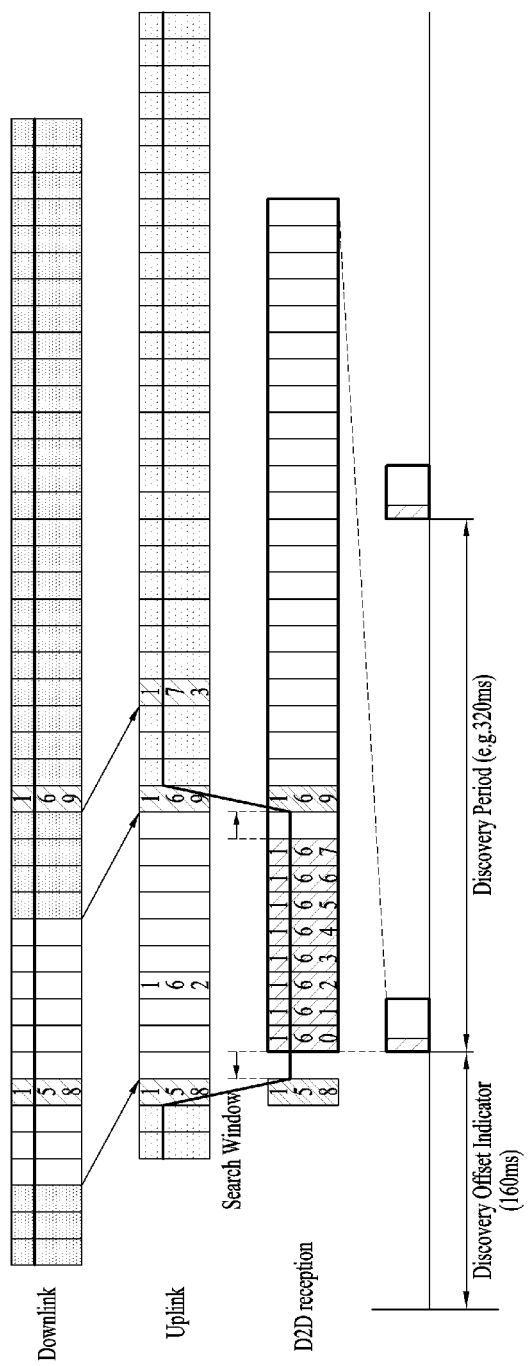
FIG. 17b shows the relations among eNB WAN DL, UE WAN UL and UE D2D RX according to one embodiment of the present invention.

In FIG. 17b, according to synchronization-scheme 2, D2D RX spare chain switching On/Off occurs at '158, 169'. UL ACK/NACK SF '173' corresponding to DL SF '169' among SFs is interrupted due to the D2D RX spare chain switching On/Off. All UL interruption SFs are '158, 169, 173', and the number of interrupted SFs is 3 per 320 ms. Such a difference in FIG. 17 (b) is generated because the D2D RX spare chain switching OFF occurs early by 24 SFs, which is effective to UE's power saving.

Moreover, in FIG. 17a and FIG. 17b, the number of missed ACK/NACK is 3 during 320 ms.

Figure 18B:
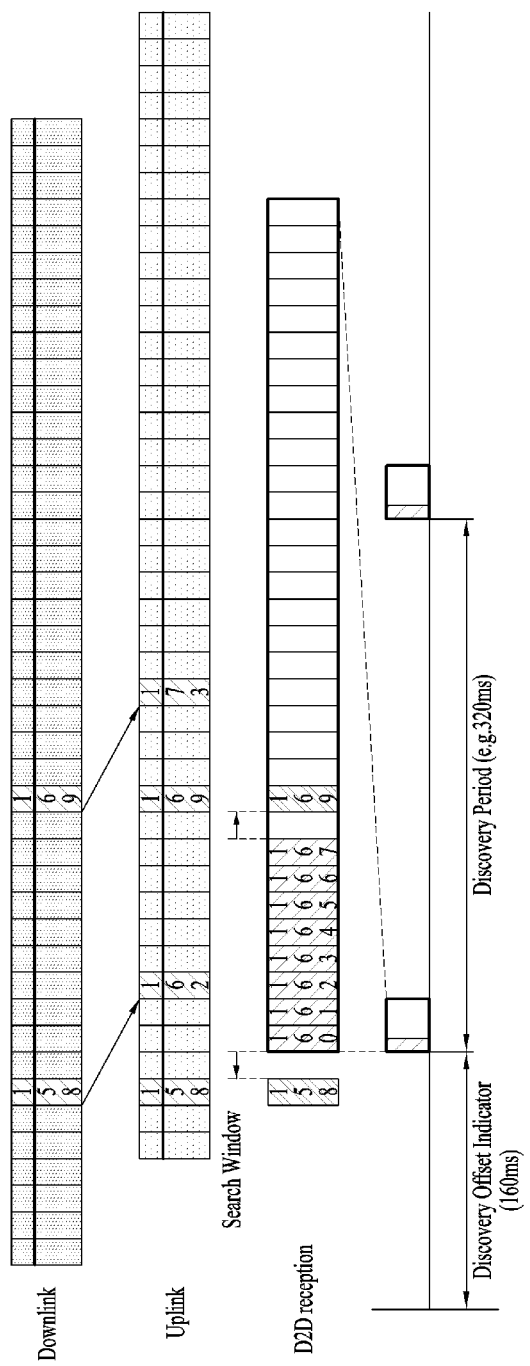
FIG. 18b show the relations among eNB WAN DL, UE WAN UL and UE D2D RX according to one embodiment of the present invention.

Regarding the PDSCH scheduling option 2 of Table 20, although it is impossible to receive D2D discovery, it shows a case that the number of missed ACK/NAC due to interruption in D2D discovery is 4. In FIG. 18a, the D2D RX spare chain switching OFF occurs at DL SF '193'. In FIG. 18b, the D2D RX spare chain switching OFF occurs at DL SF '169'. The difference in FIG. 18a and FIG. 18b is generated because the D2D RX spare chain switching OFF occurs early by 24 SFs, which is effective to UE's power saving.

In brief, according to subframes attributed to the switching to D2D RX spare chain On/Off, as shown in Table 21, the number of missed ACK/NACK and the number of power saved subframes are illustrated.

TABLE 21

| PDSCH scheduling | Option 1 | | Option 2 | |
|---|---|---|---|---|
| Switching On/Off method of D2D Rx spare chain | Sync-Alt1 | Sync-Alt2 | Sync-Alt1 | Sync-Alt2 |
| # of missed Ack/Nack | 3 | 3 | 4 | 4 |
| # of scheduled PDSCH | 310 | 310 | 320 | 320 |
| Rate of missed Ack/Nack(%) | 0.97 | 0.97 | 1.25 | 1.25 |
| # of D2D Rx power On subframe | 35 | 11 | 35 | 11 |

A D2D discovery operation is described centering on an asynchronous network as follows.

Likewise, if parameters are assumed like table 20, FIG. 19 and FIG. 20 show the relations among eNB WAN DL, UE WAN UL and UE D2D RX according to one embodiment of the present invention. In FIG. 19 and FIG. 20, it is able to compare the number of WAN UL interruptions according to a location for switching a D2D RX spare chain to On/Off for each of the PDSCH scheduling options 1 and 2 (in Table 20).

Asynchronous-scheme 1 (Async-Alt1): Before & after of "SLSS" and before & after of "discoverySubframeBitmap×numRepetition"

Asynchronous-scheme 2 (Async-Alt2): Before & after "SLSS" and within "discoverySubframeBitmap×numRepetition", front of first "discoverySubframeBitmap of 1" and rear of last "discoverySubframeBitmap of 1"

Asynchronous-scheme 3 (Async-Alt3): Before "SLSS" and after "discoverySubframeBitmap×numRepetition"

Asynchronous-scheme 4 (Async-Alt4): Before "SLSS" and within "discoverySubframeBitmap×numRepetition", after last "discoverySubframeBitmap of 1"

Figure 19A:
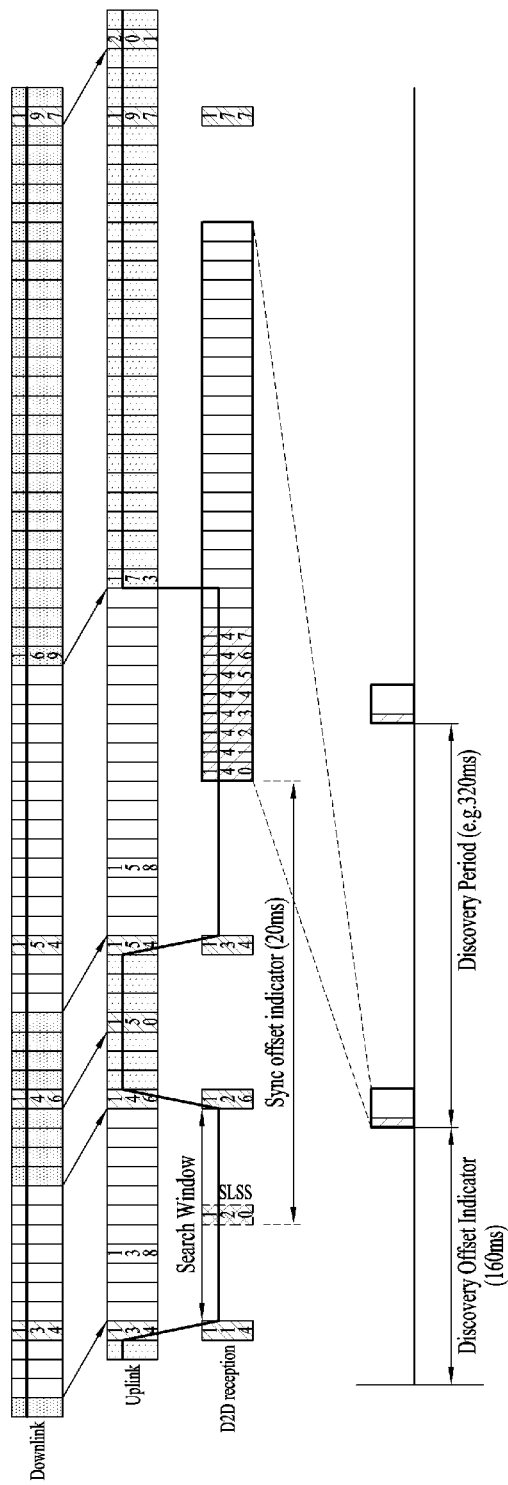
FIG. 19a shows the relations among eNB WAN DL, UE WAN UL and UE D2D RX according to one embodiment of the present invention.

In FIG. 19*a*, according to an asynchronous-scheme 1, D2D RX spare chain switching On/Off occurs at '134, 146, 154, 197'. UL ACK/NACK SFs '150, 201' corresponding to DL SFs '146, 197' among SFs are interrupted due to the D2D RX spare chain switching On/Off. All UL interrupted SFs are '134, 146, 150, 154, 197, 201', and the number of the interrupted SFs is 6 per 320 ms.

Figure 19B:
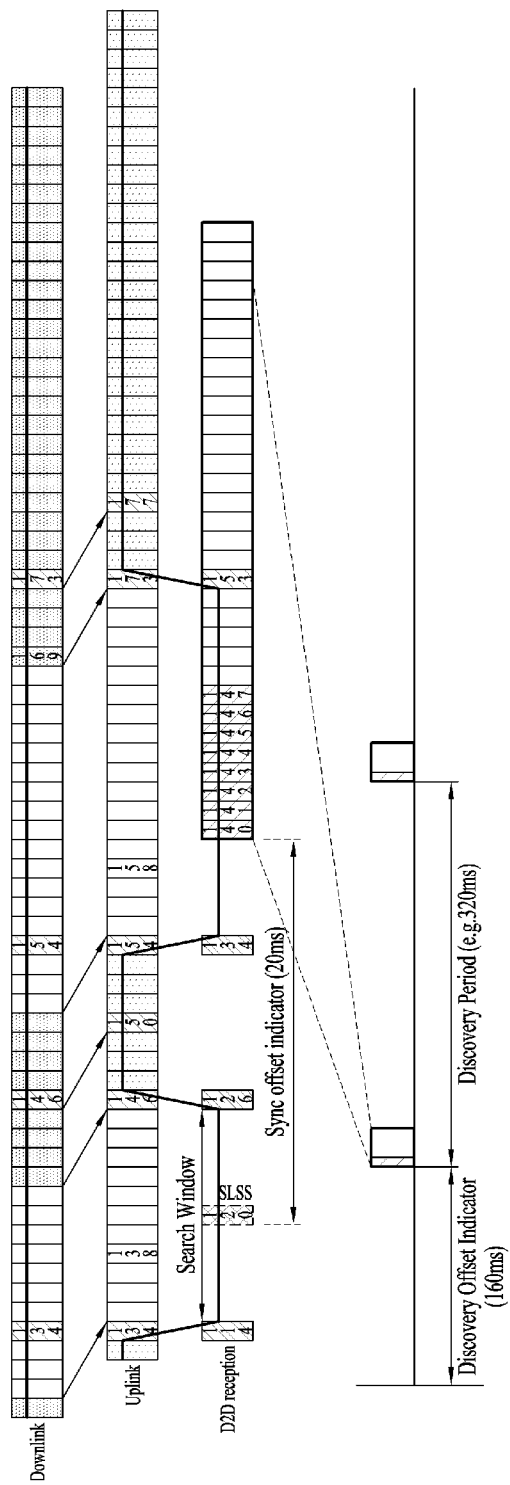
FIG. 19b shows the relations among eNB WAN DL, UE WAN UL and UE D2D RX according to one embodiment of the present invention.

In FIG. 19*b*, according to an asynchronous-scheme 2, D2D Rx spare chain switching On/Off occurs at '134, 146, 154, 173'. UL ACK/NACK SFs '150, 177' corresponding to DL SFs '146, 173' among SFs are interrupted due to the D2D RX spare chain switching On/Off. All UL interrupted SFs are '134, 146, 150, 154, 173, 177', and the number of the interrupted SFs is 6 per 320 ms. The D2D RX spare chain switching Off in FIG. 19*b* occurs earlier than that in FIG. 19*a* by 24 SFs (subframes).

Figure 19C:
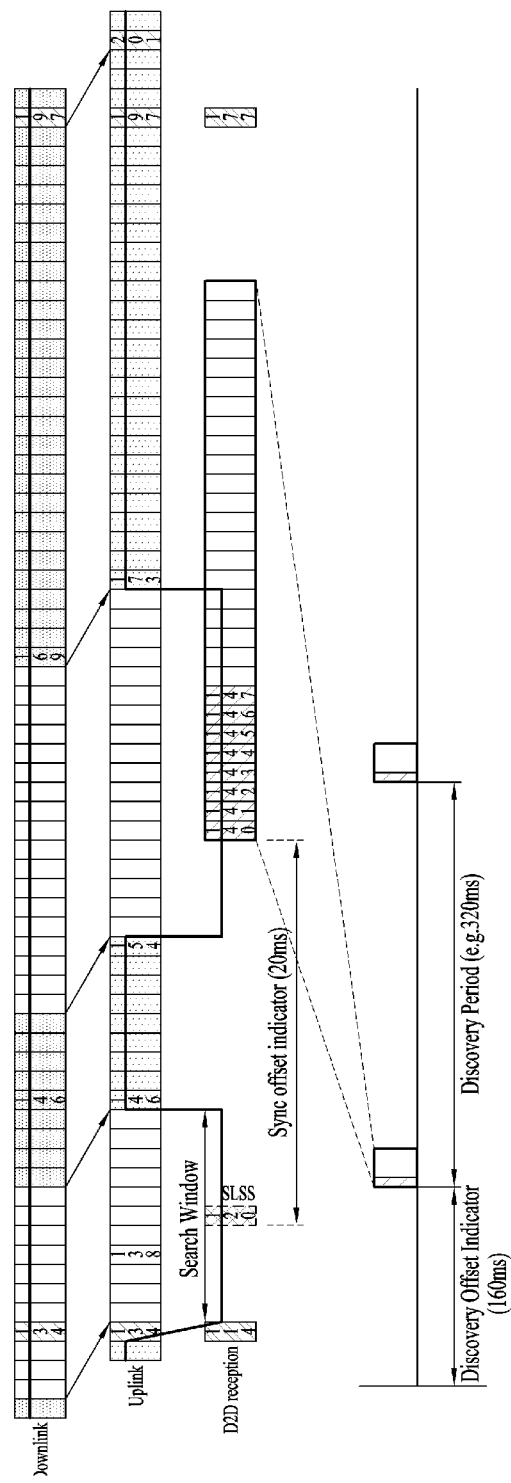
FIG. 19c shows the relations among eNB WAN DL, UE WAN UL and UE D2D RX according to one embodiment of the present invention.

In FIG. 19*c*, according to an asynchronous-scheme 3, D2D R spare chain switching On/Off occurs at '134, 146, 134, 197'. UL ACK/NACK SF '201' corresponding to DL SF '197' among SFs is interrupted due to the D2D RX spare chain switching On/Off. All UL interrupted SFs are '134, 197, 201', and the number of the interrupted SFs is 3 per 320 ms.

Figure 19D:
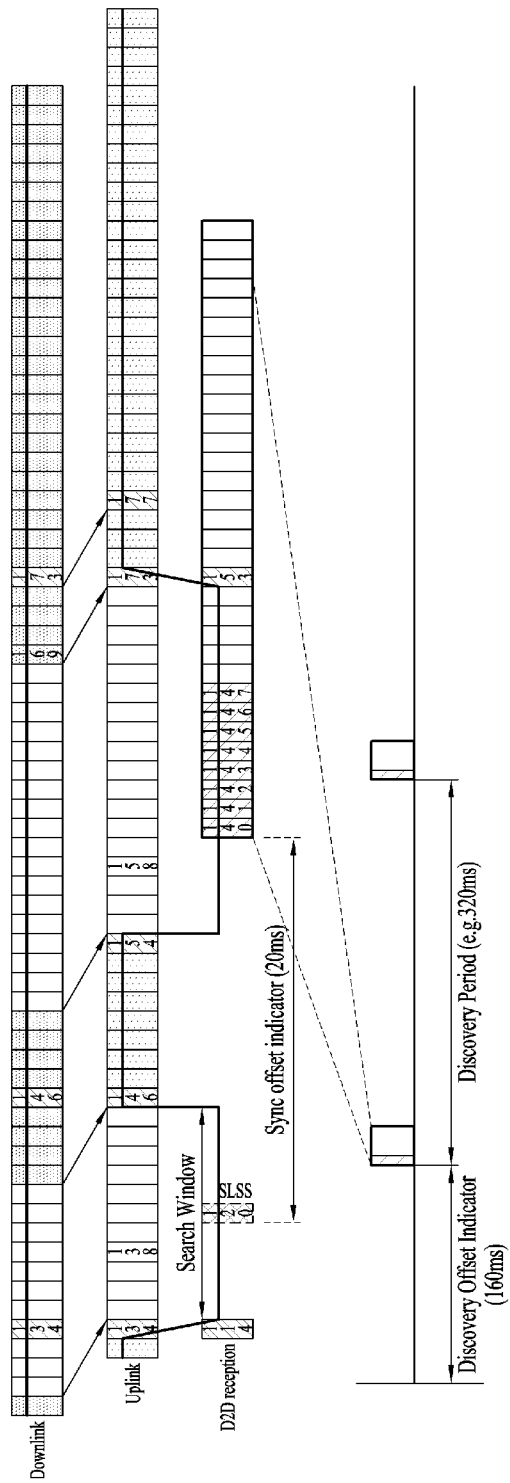
FIG. 19d shows the relations among eNB WAN DL, UE WAN UL and UE D2D RX according to one embodiment of the present invention.

In FIG. 19*d*, according to an asynchronous-scheme 4, D2D RX spare chain switching On/Off occurs at '134, 173'. UL ACK/NACK SF '177' corresponding to DL SF '173' among SFs is interrupted due to the D2D Rx spare chain switching On/Off. All UL interrupted SFs are '134, 173, 177', and the number of the interrupted SFs is 3 per 320 ms. The D2D RX spare chain switching Off in FIG. 19*d* occurs earlier than that in FIG. 19*c* by 24 SFs (subframes).

Figure 20A:
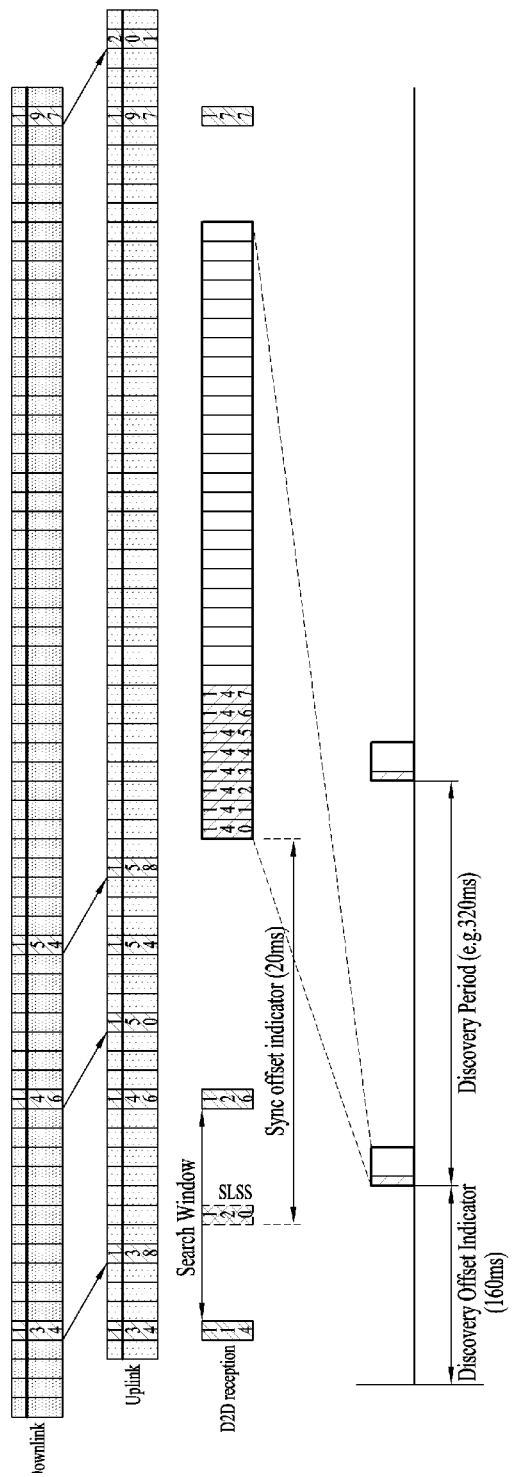
FIG. 20a shows the relations among eNB WAN DL, UE WAN UL and UE D2D RX according to one embodiment of the present invention.
Figure 20B:
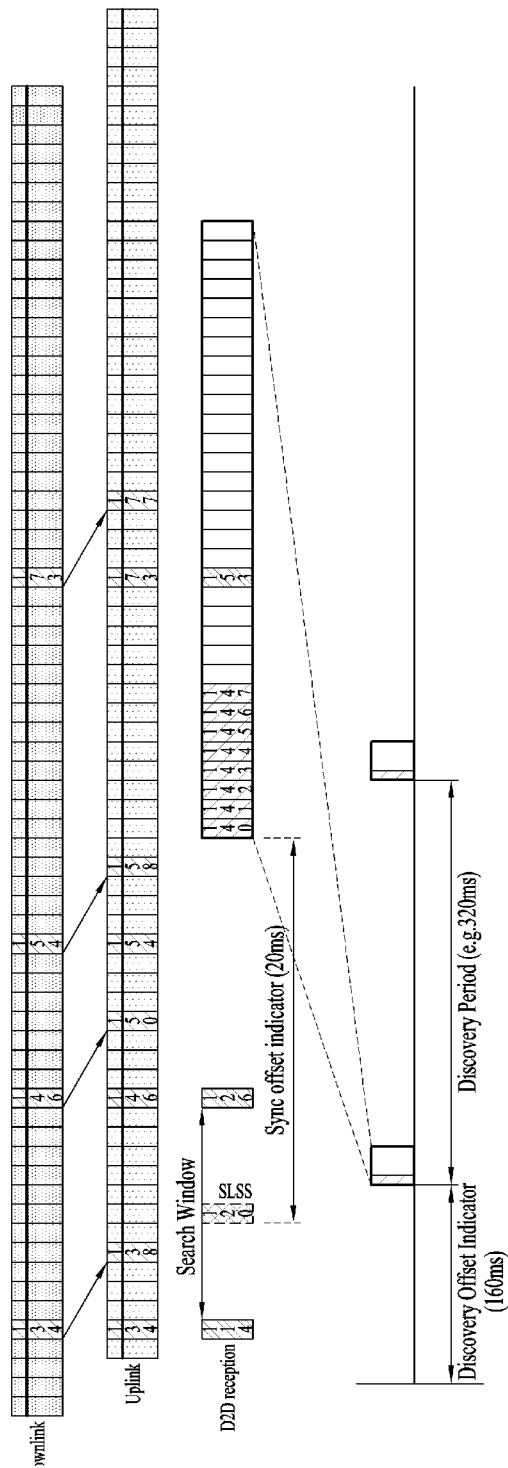
FIG. 20b shows the relations among eNB WAN DL, UE WAN UL and UE D2D RX according to one embodiment of the present invention.
Figure 20C:
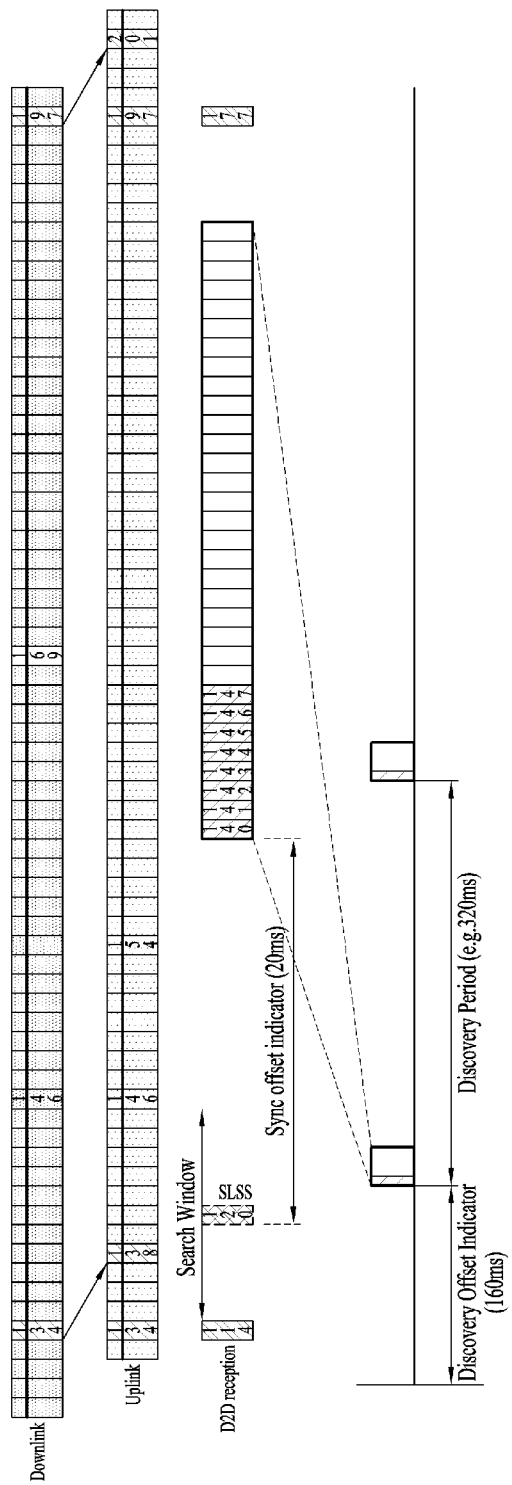
FIG. 20c shows the relations among eNB WAN DL, UE WAN UL and UE D2D RX according to one embodiment of the present invention.
Figure 20D:
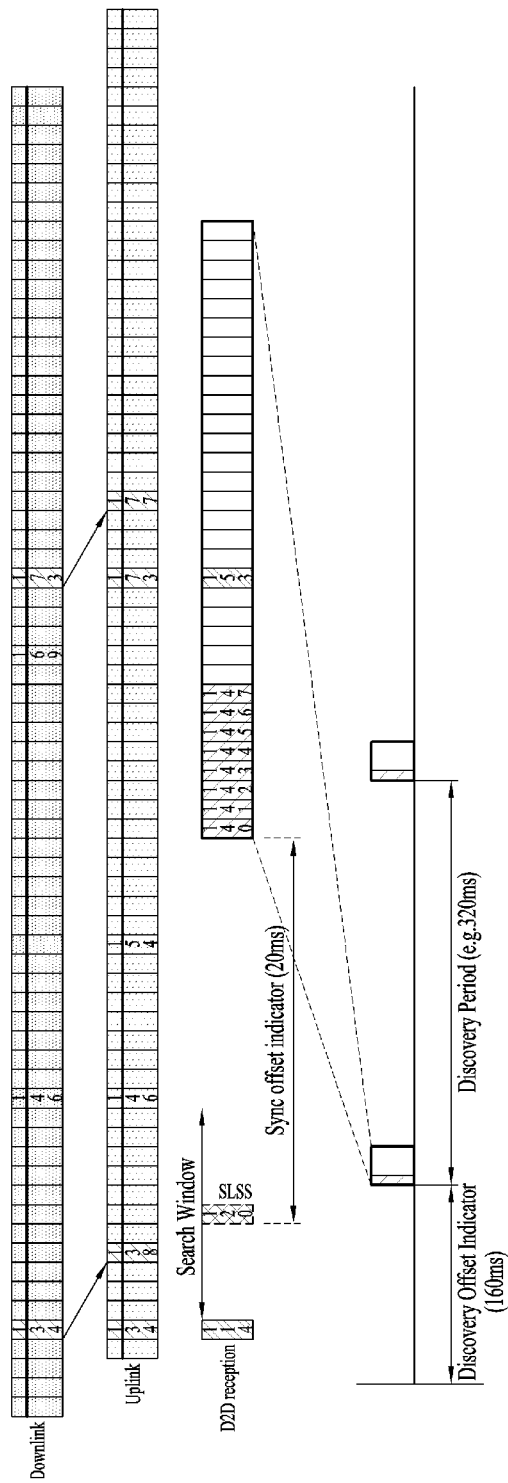
FIG. 20d shows the relations among eNB WAN DL, UE WAN UL and UE D2D RX according to one embodiment of the present invention.

Regarding the PDSCH scheduling option 2 of Table 20, although it impossible to receive D2D discovery, the number of the missed ACK/NACK due to interruption in 202D discovery is 8 in the cases of FIG. 20*a* and FIG. 20*b* or 4 in the cases of FIG. 20*c* and FIG. 20*d*. The D2D RX spare chain switching Off in FIG. 20*d* occurs earlier than that in FIG. 20*c* by 24 SFs (subframes), which is effective to UE's power saving.

In brief, Table 22 shows the number of missed ACK/NACK and the number of power saved subframes according to the switched D2D RX spare chain On/Off SF.

TABLE 22

| PDSCH scheduling | Option 1 | | | | Option 2 | | | |
|---|---|---|---|---|---|---|---|---|
| Switching On/Off method of D2D Rx spare chain | Async-Alt 1 | Async-Alt 2 | Async-Alt 3 | Async-Alt 4 | Async-Alt 1 | Async-Alt 2 | Async-Alt 3 | Async-Alt 4 |
| # of missed Ack/Nack | 6 | 6 | 3 | 3 | 8 | 8 | 4 | 4 |
| # of scheduled PDSCH | 291 | 291 | 291 | 291 | 320 | 320 | 320 | 320 |
| Rate of missed Ack/Nack (%) | 2.06 | 2.06 | 1.03 | 1.03 | 2.5 | 2.5 | 1.25 | 1.25 |
| # of D2D Rx power On subframe | 55 | 31 | 63 | 39 | 55 | 31 | 63 | 39 |

Referring to Table 21 and Table 22, 5 results can be confirmed as follows.

Result 1: On a synchronous network, in aspect of the total number of scheduled PDSCHs, for 320 ms, the scheduling option 1 is less than the scheduling option 2 by 10. If a D2D RX spare chain switching On/Off method is the same, a rate difference of missed ACK/NACK is very small.

Result 1: On a synchronous network, in aspect of the total number of scheduled PDSCHs, for 320 ms, the scheduling option 1 is less than the scheduling option 2 by 10. If a D2D RX spare chain switching On/Off method is the same, a rate difference of missed ACK/NACK is very small.

Result 2: On a synchronous network, when D2D RX spare chain switching On/Off is performed, the synchronous-scheme 2 (Sync-Alt2) has a power saving effect more than that of the synchronous-scheme 1 (Sync-Alt1) in aspect of D2D Rx power.

Result 3: On an asynchronous network, in aspect of the total number of scheduled PDSCHs, for 320 ms, the scheduling option 1 is less than the scheduling option 2 by 29. If a D2D RX spare chain switching On/Off method is the same, a rate difference of missed ACK/NACK is very small.

Result 4: On an asynchronous network, when D2D RX spare chain switching On/Off is performed, the asynchronous-scheme 2 (Async-Alt2) and the asynchronous-scheme 4 (Async-Alt4) have the power saving effects more than that of the asynchronous-scheme 1 (Async-Alt1) and the asynchronous-scheme 3 (Async-Alt3) in aspect of D2D Rx power.

Result 5: Regarding a single RC chain, in case that both a synchronous network and an asynchronous network are in RRC connected state (RRC_Connected), the number of the missed ACK/NACK is 0.

In brief, according to the tenth embodiment of the present invention, Table 20 can be summarized into Table 23.

TABLE 23 discoverySubframeBitmap = 11111111_00000000_00000000_00000000
numRepetition = 1
discoveryOffsetIndicator = 160ms
discovery period = 320ms
SyncOffsetIndicator = 20ms(for only Asynchronous network)
PDSCH scheduling in DL
  Option 1 : eNB is assumed not to schedule PDSCH in DL subframe related to UL
ACK/NACK subframe which corresponds to SLSS and discovery including searching
window.
  Option 2 : eNB is assumed to schedule PDSCH in all DL subframes
Switching On/Off method of D2D Rx spare chain
    For Synchronous network: our preference is Sync-Alt2
    Sync-Alt1 : before and after "discoverySubframeBitmap × numRepetition"
    Sync-Alt2 : before first "discoverySubframeBitmap of 1" and after last
    "discoverySubframeBitmap of 1" in "discoverySubframeBitmap ×
    numRepetition"
    For Asynchronous network : our preference is Async-Alt4
    Async-Alt1 : before and after "SLSS" & before and after
    "discoverySubframeBitmap × numRepetition"
    Async-Alt2 : before and after "SLSS" & before first
    "discoverySubframeBitmap of 1" and after last "discoverySubframeBitmap of
    1" in "discoverySubframeBitmap × numRepetition"
    Async-Alt3 : before "SLSS" and after "discoverySubframeBitmap ×
    numRepetition"
    Async-Alt4 : before "SLSS" and after last "discoverySubframeBitmap of 1"
    in "discoverySubframeBitmap × numRepetition"

According to the tenth embodiment of the present invention, the number of the reported ACK/NACK in a single RF chain should be 0. Moreover, in IDLE state or RRC_Connected state, since interruption for WAN does not occur, with respect to ProSe direct discovery (cf. 3GPP TS 36.133 Section 7.16.3.3), a part associated with the interruption of the single RF chain should not be considered.

Examples for the aforementioned proposed scheme can be included as one of the implementing methods of the present invention, they can be apparently regarded as a sort of proposed schemes. Moreover, although the aforementioned proposed schemes can be independently implemented, some of them can be implemented in a combined/merged form.

The aforementioned proposed schemes may be configured to be limitedly applicable in an environment of FDD and/or TDD system only.

The aforementioned proposed schemes may be configured to be limitedly applicable only to MODE 2 COMMUNICATION and/or TYPE 1 DISCOVERY (and/or MODE 1 COMMUNICATION and/or TYPE 2 DISCOVERY).

The aforementioned proposed schemes may be configured to be limitedly applicable only to a case that D2D RX UE receives NEIGHBOR CELL related synchronization error information of 'INTER-CELL DISCOVERY SIGNAL' (and/or 'NEIGHBOR CELL DISCOERY SIGANL') RX related w1.

The aforementioned proposed schemes may be configured to be limitedly applicable only to at least one of IN-COVERAGE D@D UE, OUT-COVERAGE D2D UE, RRC_CONNECTED D2D UE and RRC_IDLE D2D UE.

The aforementioned proposed schemes may be configured to be limitedly applicable only to a D2D UE performing a D2D discovery (TX/RX) operation only (and/or a D2D UE performing D2D communication (TX/RX) operation only).

The aforementioned proposed schemes may be configured to be limitedly applicable only to a scenario for which D2D discovery is supported/configured only (and/or a scenario for which D2D communication is supported/configured only).

In the aforementioned proposed schemes, CEILING (X) function (i.e., a function of deriving a minimum integer equal to or greater than X) may be substituted with FLOOR (X) function (i.e., a function of deriving a maximum integer equal to or smaller than X).

The aforementioned proposed schemes may be configured to be limitedly applicable only to SHRXCH_D2D RX UE (and/or SRXCH_D2D RX UE).

The aforementioned proposed schemes may be configured to be limitedly applicable only to a situation to which CA (carrier aggregation) is applied or a situation to which CA is not applied.

And, the aforementioned proposed schemes may be configured to be limitedly applicable only to a case of performing a D2D discovery SIGANL RX operation on different (UL) CARRIER of INTER-FREQUENCY and/or a case of performing D@D discovery SIGANL RX operation on INTER-PLMN based different PLMN (UL) CARRIER.

Figure 21:
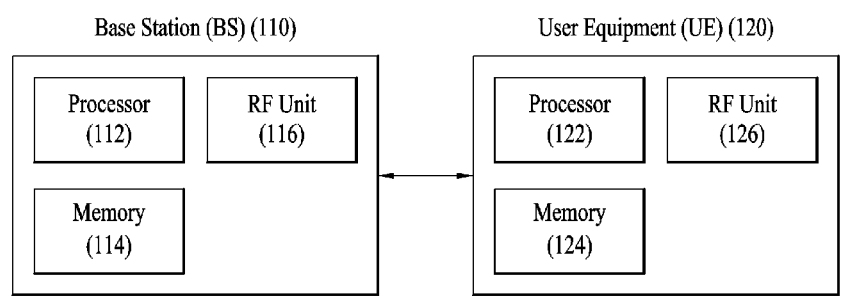
FIG. 21 shows a base station and a user equipment applicable to one embodiment of the present invention.

FIG. 21 shows one example of a base station and a user equipment (UE) applicable to one embodiment of the present invention.

If a relay is included in a wireless communication system, a communication in backhaul link is performed between a base station and a relay. And, a communication in access link is performed between a relay and a user equipment. Hence, the base station or user equipment shown in the drawing can be substituted with a relay in some cases.

Referring to FIG. 21, a wireless communication system includes a base station (BS) 110 and a user equipment (UE) 120. The baser station 110 includes a processor 112, a memory 114, and a Radio Frequency (RF) unit 116. The processor 112 may be configured to perform the proposed procedures and/or methods according to the present invention. The memory 114 is connected to the processor 112 and stores various types of informations related to operations of the processor 112. The RF unit 116 is connected to the processor 112 and transmits and/or receives radio signals. The user equipment 120 includes a processor 122, a memory 124, and an RF unit 126. The processor 122 may be configured to implement the proposed procedures and/or methods according to the present invention. The memory 124 is connected to the processor 122 and stores various information related to operations of the processor 122. The RF unit 126 is connected to the processor 122 and transmits and/or receives radio signals. The baser station 110 and/or the user equipment 120 may have a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The memory unit is provided within or outside the processor to exchange data with the processor through the various means known to the public.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of transmitting/receiving a D2D signal in a wireless communication system and apparatus therefor are described mainly with reference to examples applied to 3GPP LTE system, the present invention is applicable to various kinds of wireless communication systems as well as to the 3GPP LTE system.

What is claimed is:

1. A method of receiving signals by a first device to device (D2D) user equipment (UE) in a wireless communication system, the method comprising:
configuring discontinuous reception (DRX) cycle based on a higher layer signal;
receiving physical downlink control channel (PDCCH) in a duration based on the configured DRX cycle from a base station using a first carrier, wherein a timer for the duration is counted based on consecutive PDCCH subframes, and the PDCCH is monitored in the consecutive PDCCH subframes;
communicating with the base station using the first carrier based on the configured DRX cycle; and
communicating with a second D2D UE using a second carrier, wherein the first D2D UE includes a D2D dedicated radio frequency chain,
wherein the D2D dedicated radio frequency chain is turned on on a first subframe included in the consecutive PDCCH subframes, and is turned off on a second subframe included in the consecutive PDCCH subframes for communicating with the second D2D UE, and
wherein the first subframe and the second subframe are excluded from the consecutive PDCCH subframes of the timer for the duration, and the PDCCH is monitored in the consecutive PDCCH subframes except for the first subframe and the second subframe.

2. The method of claim 1, wherein a paging signal and a system information block are received on a subframe excluding the first subframe and the second subframe.

3. The method of claim 1, wherein the first subframe and the second subframe are measurement gaps.

4. The method of claim 1, wherein a dedicated D2D receiver spare chain receives a D2D discovery signal in a dedicated manner.

5. The method of claim 1, wherein the first carrier is different from the second carrier.

6. The method of claim 1, wherein the first UE receives D2D signal from the second UE using the second carrier in a period between the first subframe and the second subframe.

7. A first device to device (D2D) user equipment (UE) in a wireless communication system, the first D2D user equipment comprising:
a radio frequency unit; and
a processor configured to:
configure discontinuous reception (DRX) cycle based on a higher layer signal,
receive physical downlink control channel (PDCCH) in a duration based on the configured DRX cycle from a base station using a first carrier, wherein a timer for the duration is counted based on PDCCH consecutive subframes, and the PDCCH is monitored in the consecutive PDCCH subframes,
communicate with the base station using the first carrier based on the configured DRX cycle, and
communicate with a second D2D UE using a second carrier, wherein the first D2D UE includes a D2D dedicated radio frequency chain,
wherein the D2D dedicated radio frequency chain is turned on on a first subframe included in the consecutive PDCCH subframes, and is turned off on a second subframe included in the consecutive PDCCH subframes for communicating with the second D2D UE, and
wherein the first subframe and the second subframe are excluded from the consecutive subframes of the timer for the duration, and the PDCCH is monitored in the consecutive PDCCH subframes except for the first subframe and the second subframe.

8. The D2D user equipment of claim 7, wherein a paging signal and a system information block are received on a subframe excluding the first subframe and the second subframe.

9. The D2D user equipment of claim 7, wherein the first subframe and the second subframe are measurement gaps.

10. The D2D user equipment of claim 7, wherein a dedicated D2D receiver spare chain receives a D2D discovery signal in a dedicated manner.

11. The D2D user equipment of claim 7, wherein the first carrier is different from the second carrier.

12. The D2D user equipment of claim 7, wherein the first UE receives D2D signal from the second UE using the second carrier in a period between the first subframe and the second subframe.

* * * * *